United States Patent
Walsh et al.

(10) Patent No.: US 7,246,144 B2
(45) Date of Patent: *Jul. 17, 2007

(54) METHOD AND SYSTEM FOR MANAGING A PLURALITY OF ENTERPRISE BUSINESS SYSTEMS

(75) Inventors: John G Walsh, Silver Spring, MD (US); Jeremy Walsh, Silver Spring, MD (US)

(73) Assignee: Data Quality Solutions, Silver Springs, MD (US)

( * ) Notice: Subject to any disclaimer, the term of this patent is extended or adjusted under 35 U.S.C. 154(b) by 240 days.

This patent is subject to a terminal disclaimer.

(21) Appl. No.: 10/922,162

(22) Filed: Aug. 20, 2004

(65) Prior Publication Data
US 2005/0114201 A1 May 26, 2005

Related U.S. Application Data

(63) Continuation-in-part of application No. 10/396,134, filed on Mar. 25, 2003, now Pat. No. 6,920,474.

(60) Provisional application No. 60/496,924, filed on Aug. 22, 2003, provisional application No. 60/366,547, filed on Mar. 25, 2002.

(51) Int. Cl.
G06F 15/16 (2006.01)
(52) U.S. Cl. .......................................... 709/200; 705/7
(58) Field of Classification Search ................ 709/200, 709/217, 223; 705/26, 7, 30, 35
See application file for complete search history.

(56) References Cited

U.S. PATENT DOCUMENTS

| | | | |
|---|---|---|---|
| 5,689,641 A | 11/1997 | Ludwig et al. | |
| 6,023,586 A | 2/2000 | Gaisford et al. | |
| 6,237,025 B1 | 5/2001 | Ludwig et al. | |
| 6,389,429 B1 * | 5/2002 | Kane et al. | 707/200 |
| 6,513,019 B2 * | 1/2003 | Lewis | 705/35 |
| 6,621,505 B1 | 9/2003 | Beauchamp et al. | |
| 6,654,747 B1 * | 11/2003 | Van Huben et al. | 707/10 |
| 6,684,222 B1 * | 1/2004 | Cornelius et al. | 707/104.1 |
| 6,704,015 B1 * | 3/2004 | Bovarnick et al. | 345/440.2 |
| 6,883,000 B1 * | 4/2005 | Gropper | 707/10 |
| 7,003,578 B2 * | 2/2006 | Kanada et al. | 709/230 |
| 7,043,549 B2 | 5/2006 | Breese et al. | |
| 7,047,291 B2 | 5/2006 | Breese et al. | |
| 7,107,338 B1 * | 9/2006 | Nareddy et al. | 709/224 |
| 2003/0171947 A1 | 9/2003 | Ledford et al. | |

* cited by examiner

Primary Examiner—David Y. Eng
(74) Attorney, Agent, or Firm—Barnes & Thornburg LLP

(57) ABSTRACT

An enterprise business process management system and method for definition and execution of business processes formed from portions of one or more business applications present in an enterprise. The enterprise business process management system includes a server, a router, and an interface for defining and executing such business processes. A data quality business process detects, corrects, analyzes, and reports quantitative and qualitative characteristics of application data and transactional data present in the enterprise. An interface module is provided by which a user may select and define function definition information for a business process.

19 Claims, 45 Drawing Sheets

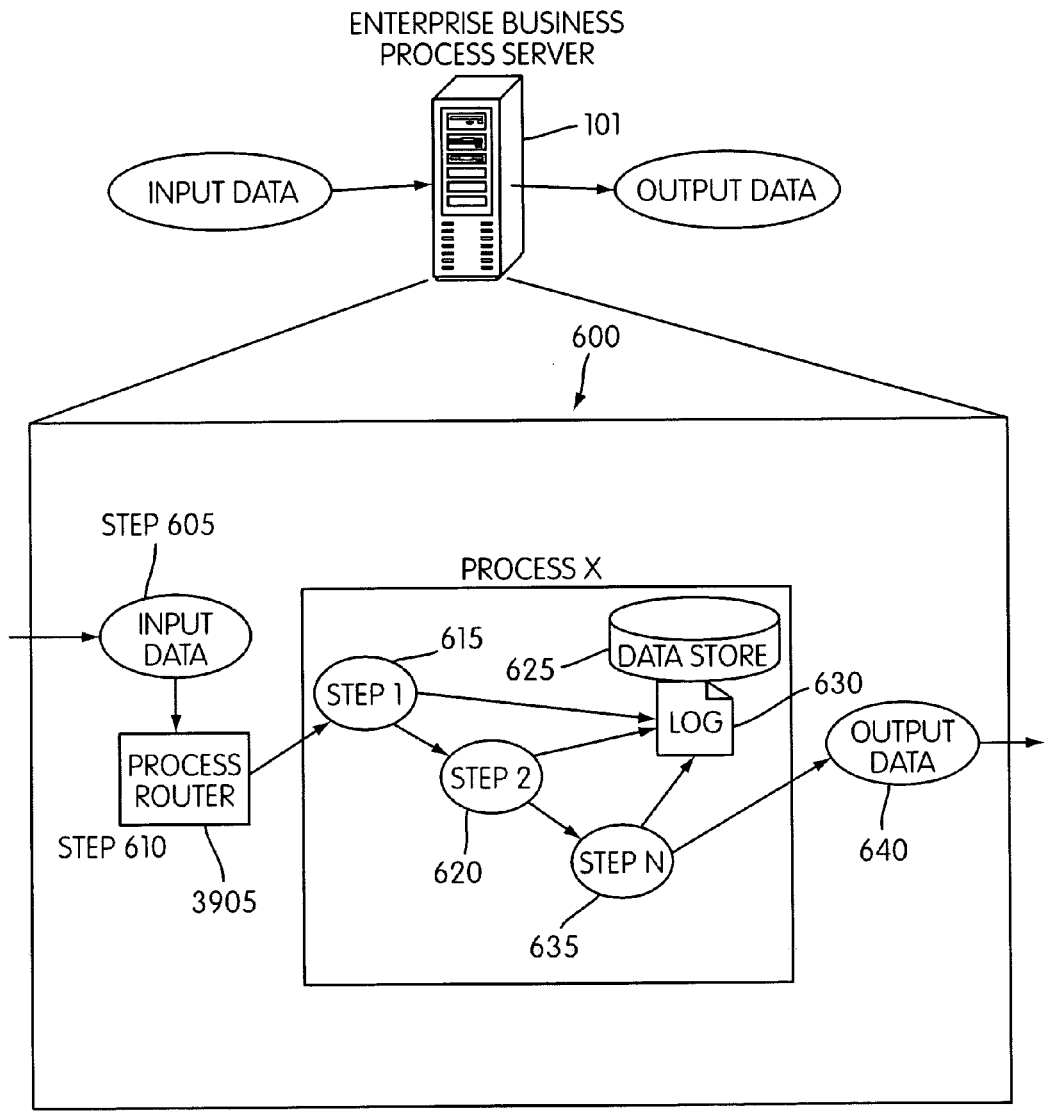

1) Input Data is received by the Enterprise Business Process Server
2) Input Data is passed to the Process Router
3) Based upon the Process Id # the Process Router directs the input data to the correct process
4) Process X receives the input and passes it to each step in the process
5) After each step in a process the results of that step are logged and the data is passed to the next step
6) After the final step is complete the data is passed to the Output data structure
7) The output data is then sent to a data destination

FIG. 6

Processes

What are Processes? How are they used?

Creating a Process

Creating a Process Name & Selecting a Data Source

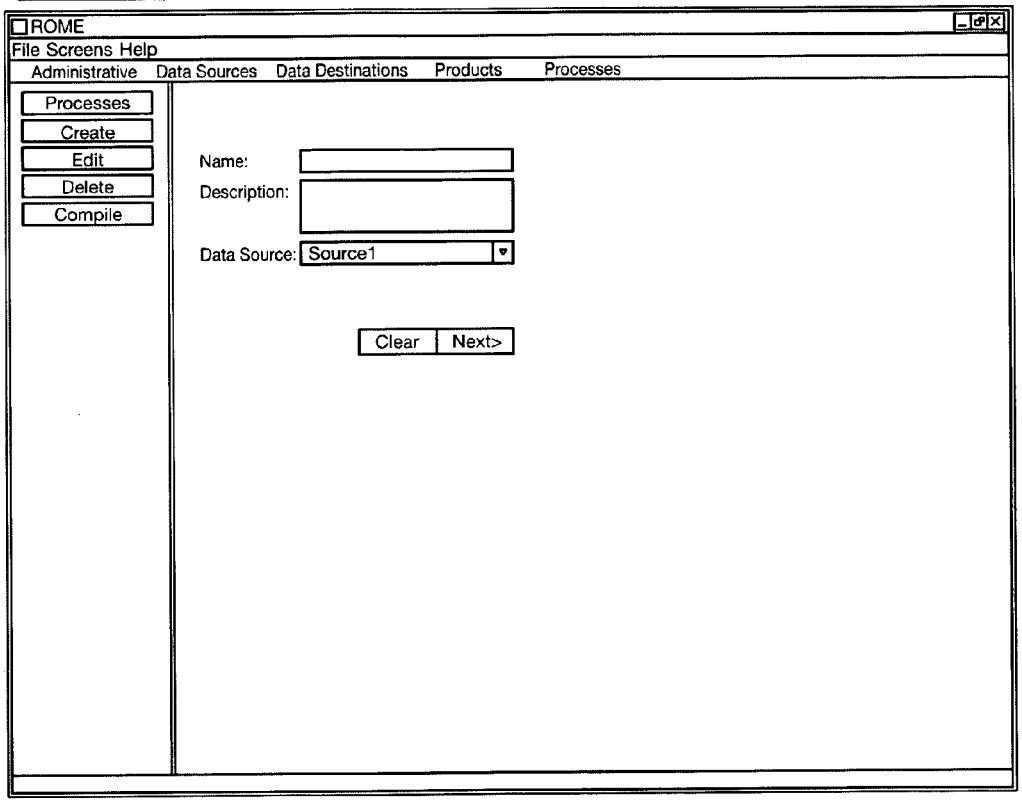

Data Quality Solutions, Inc. All rights reserved.

Steps to Create a Process
1. Select Processes -> Create from the Menu Bar
2. Create a Process Name (Required)
3. Create a Description for this Process (Optional)
4. Select a Data Source for this Process (Required)
5. Click Next to continue or Clear to Reset

FIG. 12

Data Sources

Description of Data Sources

A Data Source can be Database, Application, etc.

Adding a Data Source

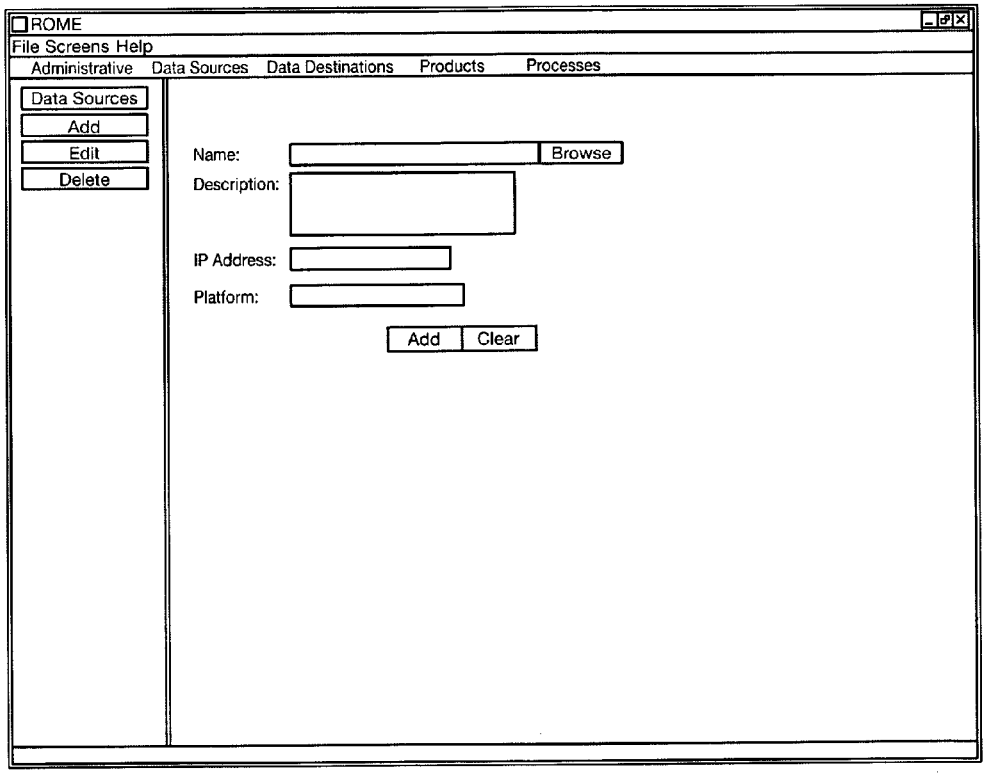

Data Quality Solutions, Inc. All rights reserved.

Steps to Create a Data Source
    1. Select Data Sources -> Add
    2. Create a Name for Data Source (Required)
    3. Add a Description for the Data Source (Optional)
    4. Input the IP Address of the Data Source (Required)
    5. Add the Platform type of the Data Source (Required)
    6. Click Add to add the Data Source to Enterprise Business Process Server

FIG. 13

Creating an Input Packet

What is an Input Packet?

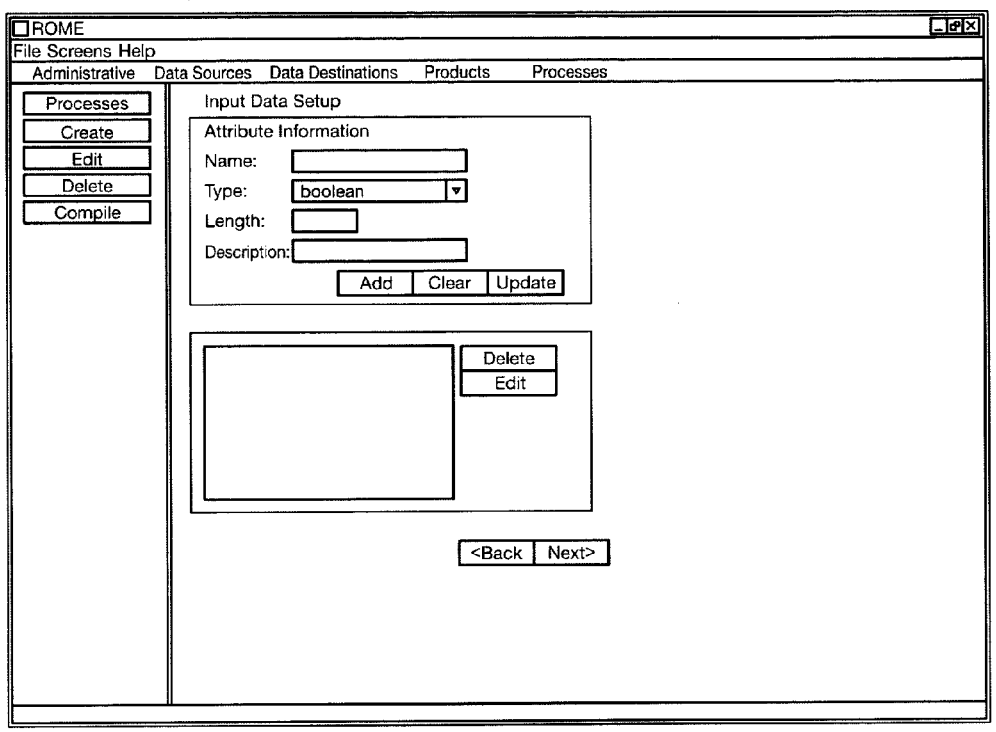

Data Quality Solutions, Inc. All rights reserved.

To create an Input Packet for a Process, take the following steps:
1. Make a Name for a component of the packet. All spaces are replaced with a "_" (underscore).
2. Select the Data Type for this component. The available Data Types are
   - boolean
   - char
   - double
   - float
   - int
   - long
   - short
3. Add a length for the component. Numerical values are only accepted.
4. An optional Description field is provided for comments
5. Click Add to add the component to the Input Packet After you have created all the components for the Input Packet click Next to continue.

FIG. 14

Creating an Output Packet

What is an Output Packet?

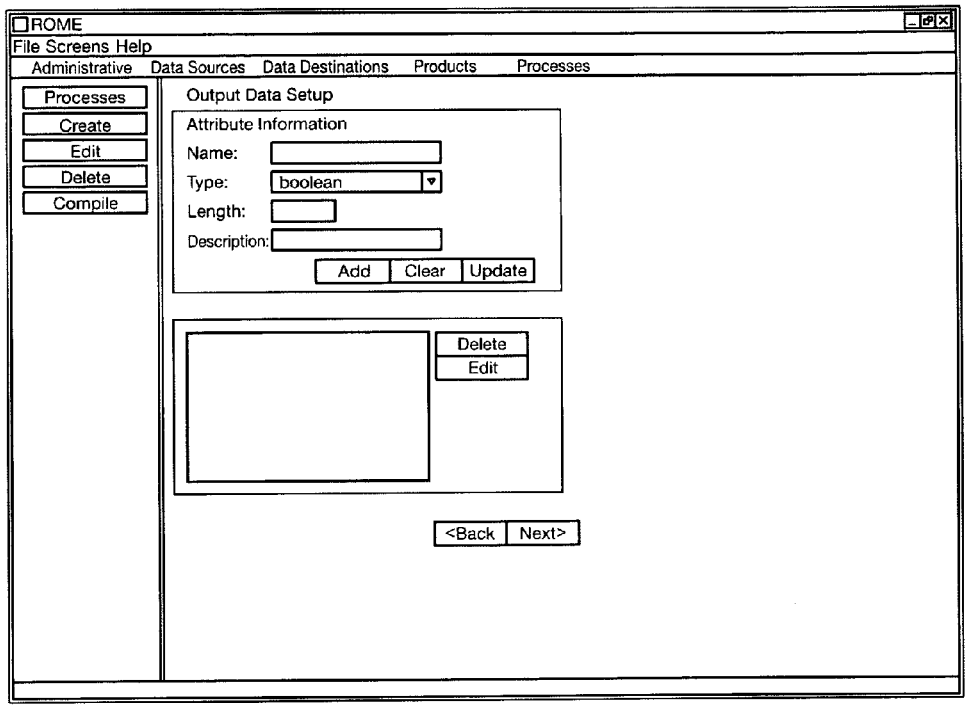

Data Quality Solutions, Inc. All rights reserved.

To create an Output Packet for a Process, take the following steps:
1. Make a Name for a component of the packet. All spaces are replaced with a "_" (underscore).
2. Select the Data Type for this component. The available Data Types are
   - boolean
   - char
   - double
   - float
   - int
   - long
   - short
3. Add a length for the component. Numerical values are only accepted.
4. An optional Description field is provided for comments
5. Click Add to add the component to the Output Packet After you have created all the components for the Output Packet click Next to continue.

FIG. 15

Selecting the Products

Data Quality Solutions, Inc. All rights reserved.

To add Products to a Process take the following steps:
1. Select a Product from the list (Required)
2. Add a Description of what the Product does (Optional)
3. Click Add to add the Product the Process
4. Repeat Steps 1-3 until you are finished
5. Click Next to Continue or Back to Return to Output Packet Creation Products Description of a Product Adding a Product

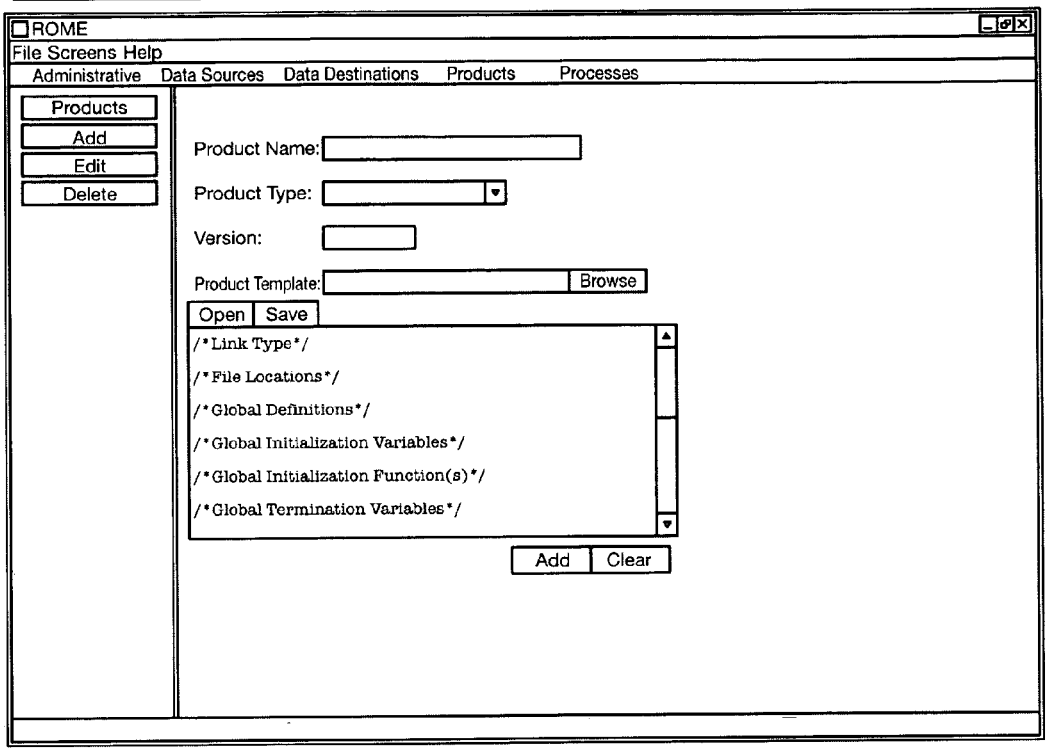

Data Quality Solutions, Inc. All rights reserved.

Steps to Add a Product
1. Select Products ->Add from the Menu Bars
2. Create a Product Name (Required)
3. Select or Create a Product Type if it already exists (Required)
4. Input Version Information (Optional)
5. If you have already created a Product Template then simply click Open and select the Product Template file. If you have not created the Product Template file then edit the Product Template window and click Save to save the Product Template information to a file. (Required)
6. Click Add to add the Product to Enterprise Business Process Server

FIG. 17

Selecting the Data Destinations

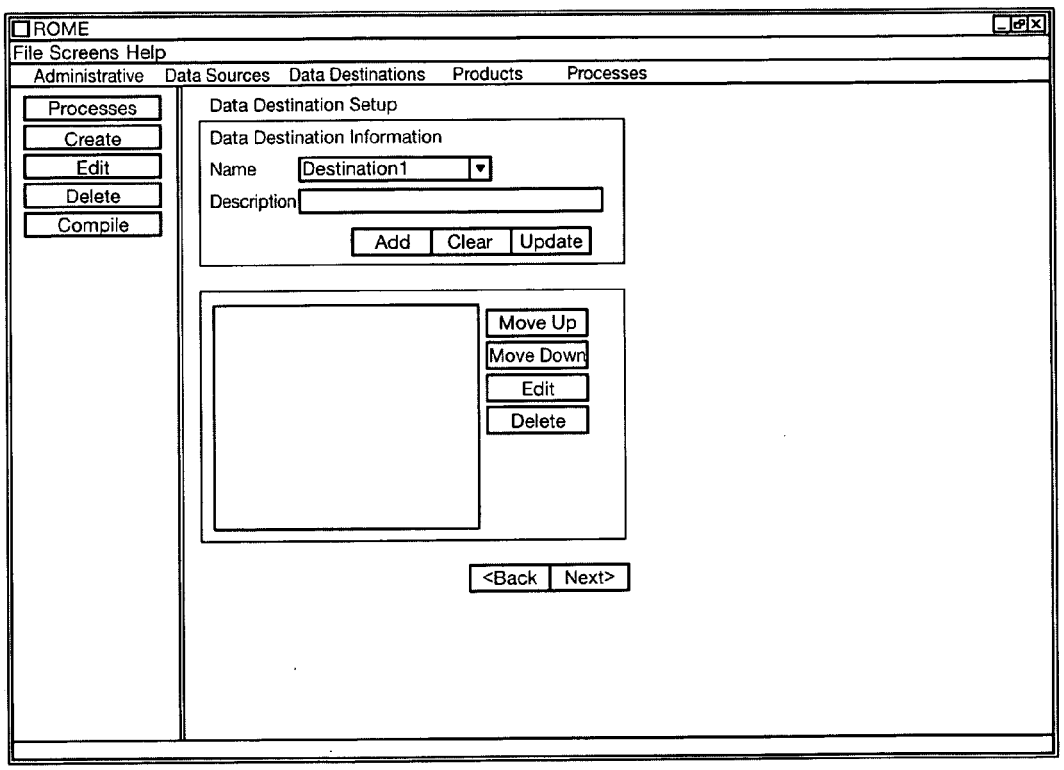

Data Quality Solutions, Inc. All rights reserved.

To add a Data Destination to the Process, take the following steps:
1. Select the Data Destination from the list (Required)
2. Add a Description of the Data Destination (Optional)
3. Click Add to add the Data Destination to the Process
4. Repeat steps 1-3 until you are finished
5. Click Next to Continue or Back to Return to Products

FIG. 18

Creating the Process

Data Quality Solutions, Inc. All rights reserved.

Review the Process to verify that the Process that you are about to create is correct. Once you have verified that the Process you are going to create is correct click Create Process.

FUNCTION OVERVIEW PAGE

2500

| ID | Name | Type | Created Date | Modified Date |
|---|---|---|---|---|
| 1 | ValidateSS | Validation | 4/02 8:51:27 PM | 4/02 8:51:27 PM |
| 2 | ValidateDOB | Validation | 4/02 8:52:04 PM | 4/02 8:52:04 PM |
| 3 | ValidateSecurityLevel | Validation | 4/02 8:52:54 PM | 4/02 8:52:54 PM |
| 4 | ValidateATMAccount | Validation | 4/02 8:54:30 PM | 4/02 8:54:30 PM |
| 5 | ATMTransaction | Business Rules | 4/02 8:55:45 PM | 4/02 8:55:45 PM |
| 6 | Attention Level | Business Rules | 4/02 8:56:41 PM | 4/02 8:56:41 PM |
| 7 | Is Qualified for Promotion | Business Rules | 4/02 8:57:46 PM | 4/02 8:57:46 PM |

[ New ] [ Save ] [ Edit ] [ Cancel ]

ID#: [        ]  Created Date: [10/4/2002 8:51:27 PM]
Product Name: [Dqs Functions]  Modified Date: [10/4/2002 8:51:27 PM]
Function Name: [ValidateSS]
Function Type: [Validation]
Description: [This function validates a Social Security Number]

[ Function Wizard ]                               [<Return to Product]

Data Quality Solutions, Inc. All rights reserved.

FIG. 25

CONDITION DEFINITION PAGE PORTION

FIG. 29

Data Quality Solutions, Inc. All rights reserved.

PRODUCTS DEFINITION PAGE

3000

| ID | Name | Version | Type |
|---|---|---|---|
| 1 | Product1 | 1 | Enhancer/Parser |
| 4 | Dqs Functions | 1 | Dqs Functions |
| 3 | Product3 | 1 | Address Coder and Parser |
| 2 | Product2 | 1 | Matcher |

[ New ] [ Save ] [ Edit ] [ Cancel ]

ID#: [ 1 ]
Product Name: [ Product1 ]    Create Date: [ 8/21/2002 3:49:19PM ]
Product Type: [ ▾ ]    Modified Date: [ 8/21/2002 3:49:19PM ]
Version: [ 1 ]
Description: [ This product enhances and parces Name and Address data ]

[ Edit Product Template ]    [ Create Functions > ]

Data Quality Solutions, Inc. All rights reserved.

FIG. 30

DATA DESTINATION DEFINITION PAGE

3100

| ID | Name | IP Address | Platform |
|----|------|------------|----------|
| 3 | Forrest Green Corporation | 192.168.1.11 | |
| 1 | PDCAppserver | 192.168.1.1 | Windows |
| 4 | asd | 1.1.1.1 | as |
| 5 | asdf | 1.2.3.1 | sd |
| 2 | sdf | 123.23.12.42 | fg |

| New | Save | Edit | Cancel |

ID#: 3
Name: Forrest Green Corporation
IP Address: 192.168.1.11
Port #: 94
Platform:
Description:

Create Date: 10/16/2002 3:56:16PM
Modified Date: 10/17/2002 11:00:27AM

Data Quality Solutions, Inc. All rights reserved.

FIG. 31

PRODUCTS SELECTION PAGE 3200

| ID | Name | IP Address | Platform |
|----|------|------------|----------|
| 3 | Forrest Green Company | 192.168.0.11 | |
| 1 | PCAppserver | 192.168.1.1 | Windows |
| 2 | asd | 12.1.1.1 | dfg |

[ New ] [ Save ] [ Edit ] [ Cancel ]

ID#: 3
Name: Forrest Green Company
IP Address: 192.168.0.11
Platform:
Description:

Create Date: 10/16/2002 4:01:40PM
Modified Date: 10/16/2002 4:01:40AM

Data Quality Solutions, Inc. All rights reserved.

CONNECTION DEFINITION PAGE

3700

| ID | Name | DataSource |
|----|------|------------|

ID#:
Process: New | Save | Edit | Cancel
Road Type: New1
Road Name:
Data Source:
Platform:
Data Destination(s):

Create Date
Modified Date

Description

Data Quality Solutions, Inc. All rights reserved.

METHOD AND SYSTEM FOR MANAGING A PLURALITY OF ENTERPRISE BUSINESS SYSTEMS

CROSS-REFERENCE TO RELATED APPLICATIONS

This application relies for priority on U.S. Provisional Patent Application No. 60/496,924, entitled "METHOD AND SYSTEM FOR MANAGING A PLURALITY OF ENTERPRISE BUSINESS SYSTEMS," which was filed on Aug. 22, 2003, the entire contents of which are incorporated herein by reference.

This application is a continuation-in-part application of U.S. Non-Provisional patent application Ser. No. 10/396,134, filed on Mar. 25, 2003 now U.S. Pat. No. 6,920,474, entitled "Method and System for Enterprise Business Process Management," which claims priority to U.S. Provisional Patent Application Ser. No. 60/366,547, filed on Mar. 25, 2002, entitled "Method and System for Enterprise Data Quality Management." The contents of both of these related applications is incorporated herein by reference.

This disclosure contains information subject to copyright protection. The copyright owner has no objection to the facsimile reproduction by anyone of the patent disclosure or the patent as it appears in the U.S. Patent and Trademark Office files or records. However, the owner reserves all remaining copyrights associated with the invention described herein, including all copyrights in the screen displays provided herein to facilitate an understanding of the invention.

BACKGROUND OF THE INVENTION

1. Field of the Invention

Embodiments of the present invention relate generally to business process management and, more particularly, to methods and systems for computer-based business process management.

2. General Background and Description of Related Art

The automated processing of information has been an enormous benefit to businesses because it has greatly reduced the cost of certain tasks. Every enterprise regardless of whether it is a government, commercial business or not-for-profit organization has the operational necessity to manage information.

This information is used to acquire customers, input orders, ship product, bill customers, collect invoices, pay employees and vendors, order product, audit inventory and maintain records of transactions between employees, customers and suppliers, for example, in the case of a commercial business.

In the normal course of events, information is acquired, processed and consolidated utilizing software, computer hardware and digital networks in accordance with each organization's internal operational model.

Unfortunately, the automated processing of information has also created several problems for businesses, especially where the information in the company's data store is incorrect. Automated processing of incorrect information carries a high cost for businesses in and of itself. In addition, the time, effort, and expense required to correct the undesired results can significantly impact an organization's resources.

Typical examples of the impact of errors on an organization include:

(1) Recipients receive multiple copies of the same offers in the mail, which may result in: (a) the sender wasting postage and printing, and (b) the recipient being negatively affected by waste and, as a result, not ordering products;

(2) Postal systems and other message and package shippers are unable to deliver a significant percentage of their material to the intended recipients, which may have the result that: (a) the product is not delivered on time and returned to shipper due to inaccurate address, (b) costly efforts being made to determine the correct address and repack and reship the product, (c) the invoices are returned and not paid on time or at all, (d) costly efforts are made to determine correct address and resend invoice, (e) clients become annoyed by poor service and, as a result, switch to another vendor, if possible, and (f) customer service, billing, collections, shipping all require additional resources to perform their functions;

(3) Individual operational units contain inaccurate information on clients as well, which may have the result that: (a) enterprise efforts at consolidating information are incomplete, costly and prolonged, and (b) errors in individual operational units, when consolidated, compound the overall error rates and impair the ability for meaningful analysis;

(4) Incomplete and inaccurate information is consolidated in data warehouses, data marts, operational data stores, customer information files and centralized data stores for CRM, ERP, SCM and other centralized processes, which may result in: (a) marketing not being unable to accurately forecast the value and potential of individual clients and client segments and losing valuable market opportunity, (b) customer service not being able to provide the proper service and, as a result, losing clients due to dissatisfaction with service, and (c) fraud not being detected in a timely fashion, resulting in the enterprise being defrauded of large amounts of money;

(5) Operational units are unable to determine the correct tax jurisdiction and tax assignment, which may result in: (a) the enterprises not charging the right tax to the client and paying the right amount to the right authority, (b) taxing authorities not collecting all the proper taxes due them, (c) consumers paying more taxes than they should, and (d) corporations suffering liabilities with tax jurisdictions and clients; and (6) Customers are unhappy and move to a competitive service.

The impact of erroneous information on a company's revenue is easily explained using a typical mass mailing as an example. Naturally, this is but one example, as the list presented above identifies a number of other potential impacts on a company's revenue.

Companies generate customer lists in a variety of ways. Information collected by one part of an enterprise is often used by other parts of an organization to perform their functions. If the company has a retail component and a catalog component, customer information may be entered into the company's data store at the retail location, at the catalog location, or even through the Internet. Each of these three entry positions presents a location where the information may be erroneous or duplicative of pre-existing information. Any error in the accuracy of information as it is collected, processed and consolidated can impact the effectiveness of multiple functions within an enterprise.

It is possible that a customer may have customer information entered correctly at the retail level. Subsequently, the customer may make a purchase through the catalog division. At that time, the data entry specialist may, for example, enter the customer's name into the data store incorrectly (e.g., by misspelling the person's last name). On still another occasion, the same customer may make a purchase through the Internet. At that time, the customer will be required to supply his or her information for a third time. In this situation, assume that the customer typed his or her last name incorrectly. Therefore, in this scenario, the customer information has been entered three times, two of which were incorrect.

Relying on its stored data, the company then prints and sends an updated copy of its catalog to its customers. Since the customer described has three separate entries in the business's data store, the customer receives three copies of the same catalog. As is easily understood, the cost to the company of printing and mailing the catalog has been tripled simply because of errors in the company's data store.

The problem of data quality exists with many businesses. In the prior art, there have been several approaches offered to minimize the data quality problem.

Previous approaches to data quality include providing a variety of vendor-specific or application-specific functions to the business. The data quality functions are designed specifically to automatically review a company's data, identify errors, in some cases, and correct those errors. To do this in such a way that is flexible to different businesses, the data quality functions typically provide several settings that may be adjusted by businesses to meet their individual needs.

Typically, businesses select a standardized set of settings for a particular data quality function that the business finds most beneficial. The settings may, for example, remove the errors in a data store to "clean" the data store to a point where the data is 95% accurate (which is considered to be a very good result).

The problem of data quality is compounded when a company includes multiple units, each of which have separate data stores that contain overlapping information, and the company tries to create a consolidated data store.

In the example presented above, the company had three business components, a retail component, a catalog component, and an Internet component, each of which contained a separate customer information data store. Typically, if each component wished to "clean" up its data, each component would purchase a data quality solution and apply that solution internally. If each component were to produce a data store that was 95% accurate, the result would be considered quite good.

If the company then tries to create a consolidated data store, a problem arises in that the errors in each data store compound one another. In the case presented, each data store has the same error. The combined data store will have an error rate of 0.95×0.95×0.95=0.857375. This means that the resulting data store has an error rate of about 15%, three times higher than each of the data stores that were combined. As may be appreciated, this problem is particularly pronounced when four or more data stores are combined together.

Furthermore, because the vendor-specific and application-specific data quality functions have unique strengths and weaknesses in detecting and/or correcting errors, the errors may be inadvertently propagated throughout the enterprise as applications pass data back and forth. This may have the undesirable result of causing a multiplicative increase in the overall error rate for the enterprise as a whole.

While data quality solutions are beneficial to the operation of businesses, they are limited in their ability, especially in cases where companies try to create centralized data stores for multiple business entities in an enterprise or group of entities.

Moreover, when a business desires to develop a program to "clean up" its centralized data store, current doctrine dictates that the business retain a firm to develop the appropriate software. The development of software follows what is commonly referred to as the Software Development Life Cycle (SDLC).

The known SDLC adhered to by developers of business processes, such as, for example, data quality processes, results in a time and resource costly lock-step sequential phase approach. For example, a known SDLC includes the following phases which are performed sequentially: requirements definition, general design, detailed design, development, testing, quality assurance checking, trial, implementation, and maintenance/modification. In addition, different personnel or service providers with different skill sets may be required as the project moves from phase to phase. For example, a systems engineer or business analyst may be required during the requirements analysis/definition and test phases, but a software engineer may be required for the design phases. Project handoff between phases introduces errors into the final product and adds cost due to increased project time, increased overhead, and higher project headcount.

Still further, because the requirements definition phase may be arbitrarily halted (i.e., requirements "frozen") in order to permit design activities to begin, the known SDLC is inflexible and unaccommodating to the evolving needs of customers for software products.

The failings identified above with respect to the prior art cry out for a solution.

SUMMARY OF THE INVENTION

It is, therefore, one aspect of the present invention to provide a business process management system and method that resolves many of the deficiencies in the prior art.

An enterprise business process management system may include an enterprise business process server coupled to one or more clients, a router, and an interface module. In particular, at least one embodiment of an enterprise business process management system in accordance with the present invention may include an enterprise business process server capable of receiving data from at least one client, at least one router accessible by the enterprise business process server, and at least one business process accessible by the at least one router. The enterprise business process server may be configured to access the at least one business process via the router, to execute the at least one business process on at least a portion of the client data, and to generate business process output data as a function of the at least one business process. The enterprise business process management system may further include an interface accessible by the enterprise business process server which operates with the enterprise business process server to output a process designer interactive page. The process designer interactive page may be configured to accept instructions concerning the at least one business process, to generate process information data, and to provide the process information data to the enterprise business process server. Furthermore, the enterprise business process server may build an instruction set for the business process based upon the process information data.

In accordance with at least one embodiment of the invention, an enterprise data quality management system and method are provided that determine, analyze, enhance, and report qualitative and quantitative aspects of application data and transactional data present in the enterprise.

In accordance with other aspects of the present invention, error reports may be provided at various levels of data processing to identify where data errors are made.

The system and method also provides for a variety of graphical views to present information concerning where errors are made so that businesses may avoid and correct (or at least minimize) those errors in the future.

Furthermore, embodiments of the present invention may provide for a shortened SDLC in which several of the known SDLC steps are combined such that project development time is shortened and the process simplified, resulting in significant time and cost savings.

For example, in one embodiment, the requirements definition, general design, detailed design, and development phases may be accomplished simultaneously in a single phase utilizing an interactive process designer.

Moreover, in one embodiment of the invention, by applying test data to the business processes defined and implemented as described herein, the known SDLC test, quality assurance, and trial phases may be accomplished in a single phase.

In addition, in an embodiment of the invention, each of the SDLC activities may be accomplished through user interaction with one process designer interface provided by a single product.

Furthermore, in an embodiment of the invention, a software engineer may not be required for coding during the project.

Still further, embodiments of the present invention may allow for the reuse of functions from multiple software applications, as well as providing the capability for the user to define a new or modified function of a business process. In at least one embodiment, each such function may be maintained in a function registry or function library and made available to a business process server for subsequent use in defining additional business processes or modified business processes.

Still further, embodiments of the present invention may provide an enterprise to use "best of breed" business processes in combination to achieve increased effectiveness for the overall process. Portions of multiple different business applications may be combined to form a new or modified business process in which the portions are chosen for a particular effect or other such criteria resulting in increased overall effectiveness. For example, several data quality processes, each of which may be obtained from the same or multiple different business applications, may be defined to comprise a single data quality business process that achieves a higher overall data accuracy percentage than would be possible applying each of the multiple data quality business applications alone.

Still other aspects of the invention will be made apparent from the description that follows and the drawings appended hereto.

BRIEF DESCRIPTION OF THE DRAWINGS

The benefits of the present invention will be readily appreciated and understood from consideration of the following detailed description of at least one exemplary embodiment of this invention, when taken with the accompanying drawings, in which:

FIG. 6 is a flow chart illustrating a method used by the enterprise business process management system in accordance with at least one exemplary embodiment of the invention;

FIG. 12 is an exemplary user interaction page of a graphical user interface for creating a business process in accordance with at least one embodiment of the invention;

FIG. 13 is an exemplary user interaction page of a graphical user interface for adding a data source for a process in accordance with at least one embodiment of the invention;

FIG. 14 is an exemplary user interaction page of a graphical user interface for defining an input packet for a process in accordance with at least one embodiment of the invention;

FIG. 15 is an exemplary user interaction page of a graphical user interface for defining an output packet for a process in accordance with at least one embodiment of the invention;

FIG. 17 is an exemplary user interaction page of a graphical user interface for adding a product for use with a process in accordance with at least one embodiment of the invention;

FIG. 18 is an exemplary user interaction page of a graphical user interface for selecting a data destination for a process in accordance with at least one embodiment of the invention;

FIG. 25 shows an example of a functions overview interactive page provided in an embodiment of the invention;

FIG. 29 shows an example interactive page portion by which a conditional statement may be defined for an element of a process step according to at least one embodiment of the invention;

FIG. 30 shows an example of a products definition interactive page provided in an embodiment of the invention;

FIG. 31 shows an example of a data destination definition interactive page provided in an embodiment of the invention;

FIG. 32 shows an example of a products selection interactive page provided in an embodiment of the invention;

FIG. 34 shows an example of a function settings interactive page provided in an embodiment of the invention;

FIG. 37 shows an example of a connection definition interactive page according to at least one embodiment of the invention;

DETAILED DESCRIPTION OF THE INVENTION

While the present invention will be described in connection with exemplary embodiments thereof, the exemplary embodiments are not intended to be limiting of the invention. On the contrary, alternatives, modifications and equivalents of the described examples are also intended to be included within the spirit and scope of the invention, which is defined in part by the claims appended hereto.

In accordance with at least one embodiment of the invention, an enterprise business process management system and method are provided. Although at least one embodiment is presented herein in the form of an embodiment of an enterprise data quality management system, it is to be understood that the teachings herein may be applied more generally to any enterprise business process management system, including or in addition to those business processes involved in data quality management. The system and method may utilize a server and an interchangeable router for defining, building and executing steps in business processes, including, for example, steps for detecting, correcting and reporting data errors present in various applications throughout an enterprise. An enterprise may include multiple computing nodes located in different geographic or physical locations that comprise a business organization. The various computing nodes may be interconnected for inter-node communication throughout the enterprise using a network such as, but not limited to, an intranet, the Internet, leased telephone or data lines, a wireless network, or any combination of these. Connected in any of these manners, among others, users associated with the enterprise may obtain transparent, virtual access to enterprise applications, processes, and functions regardless of the physical location of the node or nodes where the applications, processes, and functions reside.

Figure 1:
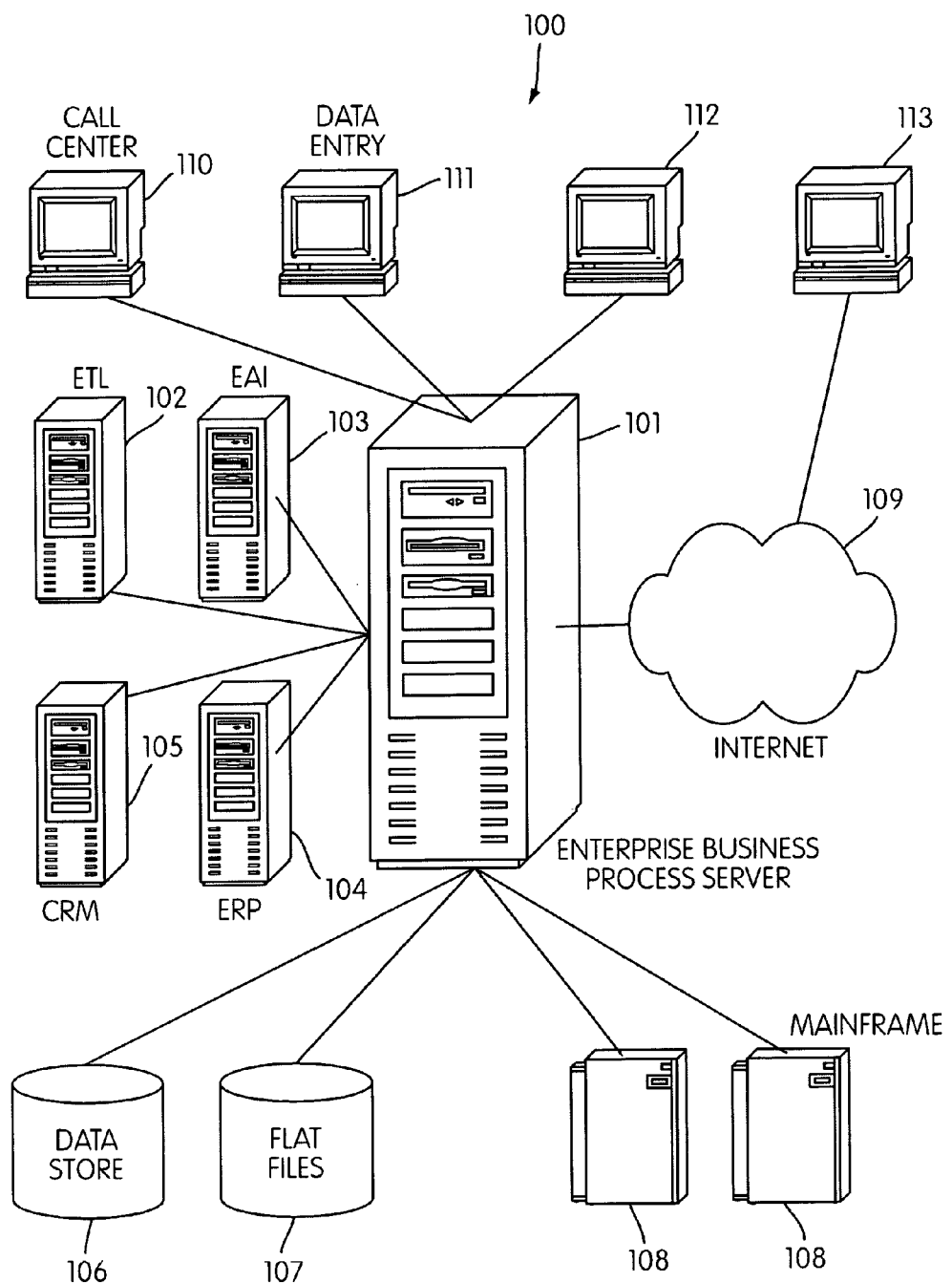
FIG. 1 is an illustrative diagram of a system implementing or employed by the enterprise business process management system in accordance with at least one exemplary embodiment of the invention.

FIG. 1 is an illustrative diagram of a system implementing or employed by the enterprise business process management system in accordance with at least one exemplary embodiment of the invention. Referring to FIG. 1, an enterprise business process management system 100 may include an enterprise business process server 101 coupled to one or more additional clients such as, but not limited to, an Extract, Transform and Load (ETL) client 102, an Enterprise Application Integration (EAI) client 103, an Enterprise Resource Planning (ERP) client 104, and a Customer Relationship Management (CRM) client 105. The enterprise business process server 101 may also be coupled to further additional clients such as a Supply Chain Manager (SCM) client (not shown). Each of the additional clients may include at least one business application. Furthermore, the enterprise business process server 101 may also be coupled to an information data store 106 and a flat files data store 107, one or more mainframes 108, and the Internet 109. In at least one embodiment, the enterprise business process server 101 may also be coupled to one or more terminals such as a call center terminal(s) 110, data entry terminals 111, local user terminal(s) 112, and remote user terminal(s) 113. In at least one embodiment, the enterprise business process server 101 may be an enterprise data quality server or an enterprise business process server configured to allow for the definition and execution of enterprise data quality management.

The enterprise business process server 101 may communicate with enterprise nodes including the additional clients 102–105, the data stores 106 and 107, mainframes 108, Internet 109 and terminals 110–113 using a variety of communications networks including, but not limited to, a network of interconnected networks such as the Internet, a Local Area Network (LAN), a Wide Area Network (WAN), an intranet including any of these, and/or the PSTN, a wireless network, or any combination thereof. In at least one embodiment, the enterprise business process server 101 may communicate with one or more of these enterprise nodes for receiving and transmitting transaction related data as well as error reports, at a minimum.

Generally, the clients 102–105 may be any data source that can send or receive data such as, but not limited to, a server, or a client portion of a client-server application. A client may host one or more business applications processes, or functions of the enterprise, for example. Clients may be located internal or external to an enterprise firewall.

The ETL client 102 may be configured to enable an organization to extract data sets from one data source, map the data to another data source, transform the data if necessary, consolidate data sources, and load the data into the destination source or sources. Such an ETL client 102 may be primarily batch processing oriented and utilize a hub architecture in which the transformations and mappings are performed as the data is passed from its source to its destination.

The EAI client 103 may be configured to enable enterprise transactions to pass from one application to another within an organization/enterprise and from one organization to a partner organization that exists on an EAI network. Such an EAI client 103 may use a hub architecture and include capabilities for mapping and transforming data associated with the enterprise transactions.

The ERP client 104 may be configured to integrate multiple facets of the business or enterprise, including planning, manufacturing, sales, and marketing activities. Such an ERP client 104 may use a hub architecture and include capabilities for mapping and transforming data associated with these activities.

The CRM client 105 may be configured to manage multiple aspects of interaction between the organization/entity and its customers using a variety of electronic-based tools, including help-desk software, sales, marketing, e-mail organizers and Web development applications. Such a CRM client 104 may use a hub architecture and include capabilities for mapping and transforming data associated therewith.

The additional enterprise clients, including the ETL client 102, EAI client 103, ERP client 104, and CRM client 105, may each include vendor-specific application quality checking processes that operate internally to each of the respective server applications. In at least one embodiment, the enterprise business process server 101 may include a Transmission Control Protocol/Internet Protocol (TCP/IP) interface for exchange of information with additional enterprise servers including the ETL client 102, EAI client 103, ERP client 104, and CRM client 105. Information exchanged between the enterprise business process server 101 and the additional clients may include commands or requests from the enterprise business process server 101 to perform one or more particular processes or functions of a process (or processes) such as, for example, processes to check data quality. The exchanged information may also include data output by application quality checking processes or functions. The TCP/IP communication interface may allow the enterprise business process server 101 to connect directly to any application on the enterprise network. Alternatively, the TCP/IP communication interface may allow the enterprise business process server to connect to external applications using, for example, the Internet.

In at least one embodiment, the enterprise business process server 101 may obtain information from the information data store 106 and the flat files data store 107. In particular, the enterprise business process server 101 may include application instructions such as data store scripts for accessing, storing, or selectively retrieving information contained in the information data store 106 and the flat files data store 107. The data store scripts may be implemented in the form of programming statements provided in accordance with, for example, SQL version 7.0 data store management system query language, as well as Transact® SQL (in accordance with the ColdFusion® data store management system). Other data store implementations are possible, including, but not limited to, those available from Oracles® or IBM DB2®.

In an alternative embodiment, the enterprise business process management system 100 may include an enterprise database server (not shown) coupled to the enterprise business process server 101 and the information data store 106 and the flat files data store 107 for the purpose of accessing information stored therein. The information data store 106 may include enterprise application or transactional data arranged in accordance with a hierarchical data store management system format such as, for example, SQL. The flat files data store 107 may include enterprise application or transactional non-hierarchical data.

The enterprise business process server 101 may also be coupled to one or more mainframes 108 in the enterprise. The mainframe(s) 108 may include organization or enterprise applications such as, for example, legacy payroll or accounting systems. In at least one embodiment, the enterprise business process server 101 may communicate with the mainframe(s) 108 using a Local Area Network (LAN), a Wide Area Network (WAN), dedicated landlines, or a combination thereof, among others.

Furthermore, in at least one embodiment the enterprise business process server 101 may also be coupled to one or more terminals such as a call center terminal(s) 110, data entry terminals 111, local user terminal(s) 112, and remote user terminal(s) 113 via LAN, WAN, dedicated landlines, an intranet, the Internet, a wireless network, or a combination thereof. The enterprise business process server 101 may thereby receive transactional data from one or more of the terminals 110–113.

In addition, the enterprise business process server 101 may communicate with users at one or more remote terminals 113 using, for example, the Internet 109. In at least one embodiment, the enterprise business process server 101 may further include a web browser or thin client for this purpose. The web browser displays data and is capable of communicating with other computers via a network such as, for example, the Internet or an intranet. The web browser may provide a user with a way to navigate, via, for example, hyperlinks which are selected by a pointing device (such as a computer mouse) or typed in by the user. The web browser may use a protocol such as, for example, HyperText Transfer Protocol (HTTP) or File Transfer Protocol (FTP), to transmit data of various content such as, for example, HTML formatted documents, plain text documents, graphic images, and XML documents for presentation to a user via a display.

Figure 2:
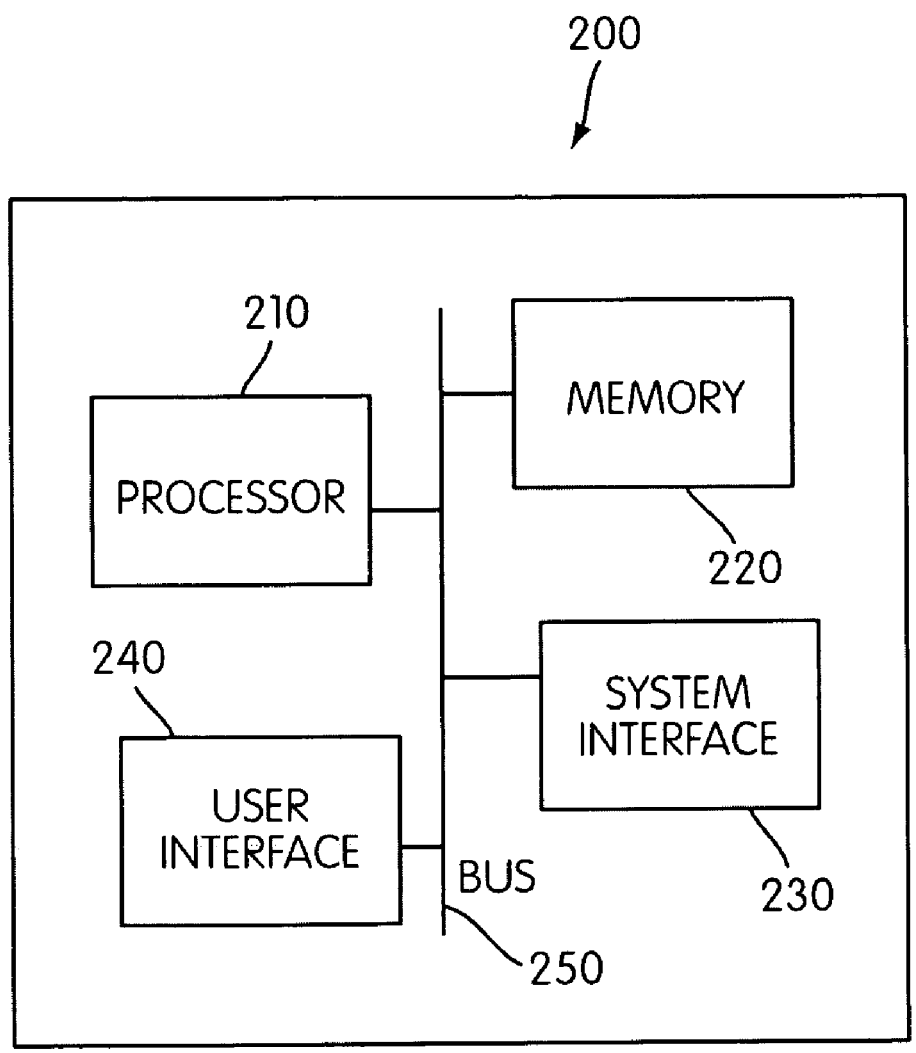
FIG. 2 is a schematic block diagram of equipment that may be used to implement a server designed in accordance with at least one embodiment of the invention.

FIG. 2 illustrates a computing platform that may be used to implement the enterprise business process server 101 in accordance with at least one embodiment of the invention. As shown in FIG. 2, the equipment 200 may include a processor 210, a memory 220, a system interface 230, a user interface 240 and a communication/data/control bus 250 that couples elements 210–240 together and allows for cooperation and communication between those elements.

The memory 220 may be implemented utilizing alternative configurations depending on the needs of a user or a system associated with the enterprise business process management system. The system interface 230 may include both hardware and software to allow the equipment 200 to communicate with components that provide data utilized by the enterprise business process management system, for example, transactional data feeds from the additional enterprise servers.

The processor 210 controls operation of the other elements 220–250, based on instructions fetched from the memory 220. The instructions may include or be implemented as software code that dictates some or all of the operations of the enterprise business process management system 100 and method explained herein. The memory 220 may include this code and may also include storage area for data utilized by or generated by the enterprise business process management system 100. The processor 210 may fetch the instructions, decode them, and act or instruct other elements 120–150 to, for example, transfer data to or from the memory 220 or to work in combination with the system interface 230 or the user interface 240 (for example, to input or output information), etc.

The processor 210 may actually be implemented as more than one processor. The processor 210 may, based on instructions fetched from the memory 220, operate to control operation of the other elements 220–250. It should be appreciated that control may be implemented with the processor 210, for example, in a central processing unit, or other similar device. Similarly, the processor 210 and the memory 220 may be implemented via one or more servers coupled to a network that allows the user interface 240 to be implemented at a user terminal, such as local terminal 112 and remote terminal 113, and include a Graphical User Interface (GUI) on a terminal screen.

The user interface 240 may include, for example, hardware and software for cooperating with a terminal display, a keyboard and mouse, printer, etc. Moreover, the user interface 240 may include a speaker and microphone, not shown, for outputting and inputting information to and from a user. The user interface 240 may operate in conjunction with the processor 210 to allow a user to interact with software programs stored in the memory 220 and used by the processor 210 so as to perform the operations explained below.

The enterprise business process server 101 can be implemented, for example, as portions of a suitably programmed general-purpose computer. The system may be implemented, for example, as physically distinct hardware circuits within an ASIC. Thus, it should be appreciated that the particular form of the system 100 may differ from the embodiment(s) explained herein. For example, although the enterprise business management system 100 has been described as being implementable on a general-purpose computer, for example, a personal computer, it is foreseeable that the system may be implemented in a network environment where the software implementing the system is stored on one or more servers. In at least one embodiment, the enterprise business process server 101 may allow a user (e.g., an administrative user) to add, modify, or delete business process processes or steps without taking down the server 101. Furthermore, the enterprise business process server 101 may be scalable in order to easily function within server array or cluster environments and for processing of large volumes of data. In at least one embodiment, the enterprise business process server 101 may include a Microsoft Windows™ NT enabled personal computing platform, for example.

Figure 3:
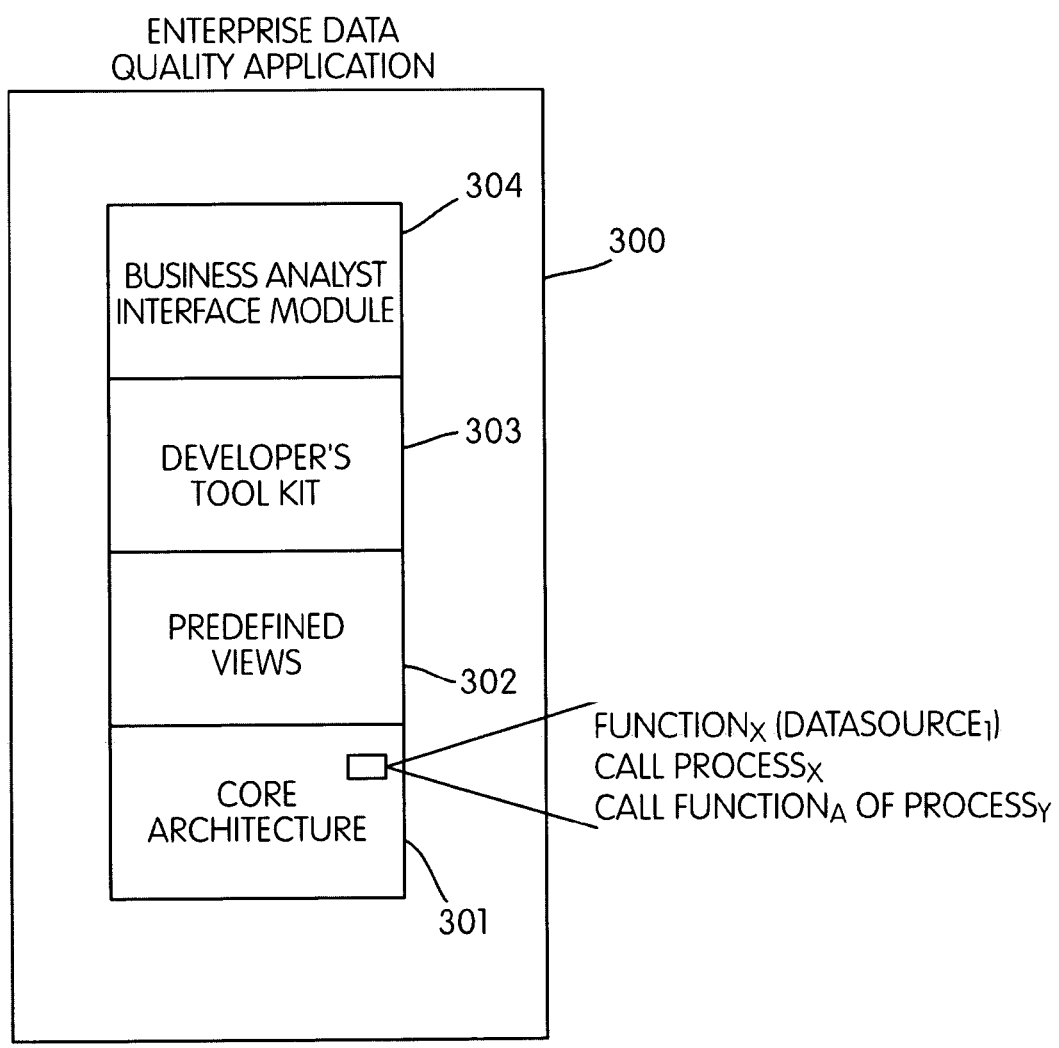
FIG. 3 illustrates a functional block diagram of an enterprise data quality application of the enterprise business process server in accordance with at least one embodiment of the invention.

In at least one embodiment, the enterprise business process server 101 may include one or more applications programs containing a series of programmed instructions that cause the enterprise business process server 101 to be configured to perform the business process operations as described herein. In particular, in at least one embodiment, FIG. 3 illustrates a functional block diagram of an enterprise data quality application 300 of the enterprise business process server 101. Referring to FIG. 3, the enterprise data quality application 300 may include a core architecture 301, a set of predefined view tools 302, a developer's kit 303, and an interface module 304, which may be a business analyst interface. The core architecture 301 may include a series of programmed instructions for obtaining application data or transactional data from one or more data sources, analyzing the obtained data for errors, logging detected errors, and generating at least one error report according to a particular requested view. The enterprise data quality application 300 may include one or more functions designed to analyze a particular type of application data, which may be obtained from one or more data sources, for occurrences of one or more types of errors present in the application data. In addition, the enterprise data quality application 300 may include instructions causing a request to be transmitted to one or more of the additional enterprise servers, including the ETL server 102, EAI server 103, ERP server 104, and CRM server 105, requesting execution of a particular application's internal quality checking processes or a particular set of functions of one or more of the application's internal processes. In at least one embodiment, the enterprise business process server 101 may transmit commands/requests (e.g., function calls or procedure calls/Remote Procedure Calls (RPCs)) and receive responses from the associated server via the TCP/IP interface. The core architecture 301 may include a multi-threaded management layer for automatically converting any legacy applications that are not multi-threaded to multi-threaded capabilities.

In an embodiment, the business analyst module 304 may include a sequence of programmed instructions to implement the interface module (e.g., business analyst interface or BAI) described herein. These instructions may, upon execution by the enterprise business process management server 101, cause the enterprise business process management server 101 to provide an interactive means to facilitate user interaction with the enterprise business process management system 100. In particular, the business analyst module 304 may include instructions operable to cause process steps to be represented graphically, for example, using a display, and indicative of a particular operation to be accomplished by the enterprise business process server when executing one or more process steps of a business process. As such, the business analyst module 304 may be an overlay application to the developer's kit 303. The business analyst module 304 may also include instructions operable to cause the enterprise business process server 101 to retrieve, build and compile from a data store such as, for example, the data store 106, a sequence of instructions implementing the business process defined by a user interacting with the interface module.

In at least one embodiment, the enterprise business process system 100 may output error information in the form of one or more error reports. Error reports may be presented in accordance with a variety of views. The predefined view tools 302 may include programming instructions associated with one or more error reports provided in accordance with a predefined set of views. For example, the predefined view tools may provide instructions that cause the enterprise business process server 101 to output an error report including a numeric count of errors for a data source for a manager's view. Further exemplary views and reports are described hereinbelow.

The developer's kit 303 may include an Application Programming Interface (API) useful for users of the enterprise business process system 100 or their designated third parties to create and use customized view tools for analyzing particular data, sources, error syndromes, or for providing customized reports over and above the set of predefined view tools 302. There is no limit on the number of views supported by the enterprise business process management system 100.

In at least one embodiment, the enterprise business process server 101 may be implemented in accordance with a client-server architecture. Programmed instructions, including the enterprise data quality application 300, may be implemented in portable source code such as, but not limited to, generic Microsoft® C. The enterprise business process server 101 may be implemented in accordance with an encapsulated server design in order to support clusters and server arrays. Furthermore, the enterprise business process server 101 may be implemented in accordance with a stateless architecture approach to allow use of third-party technology for load balancing and high availability, for purposes of providing reliability and scalability to handle huge volumes of data. In addition, the enterprise business process server 101 may utilize "sandbox technology" (i.e., use of a combination of process synchronization and isolation techniques such as, for example, handling each session via a separate thread) to allow legacy technology that was not multi-threaded, or even thread-safe, to be quickly and reliably added to the real-time, parallel processing environment.

Figure 4:
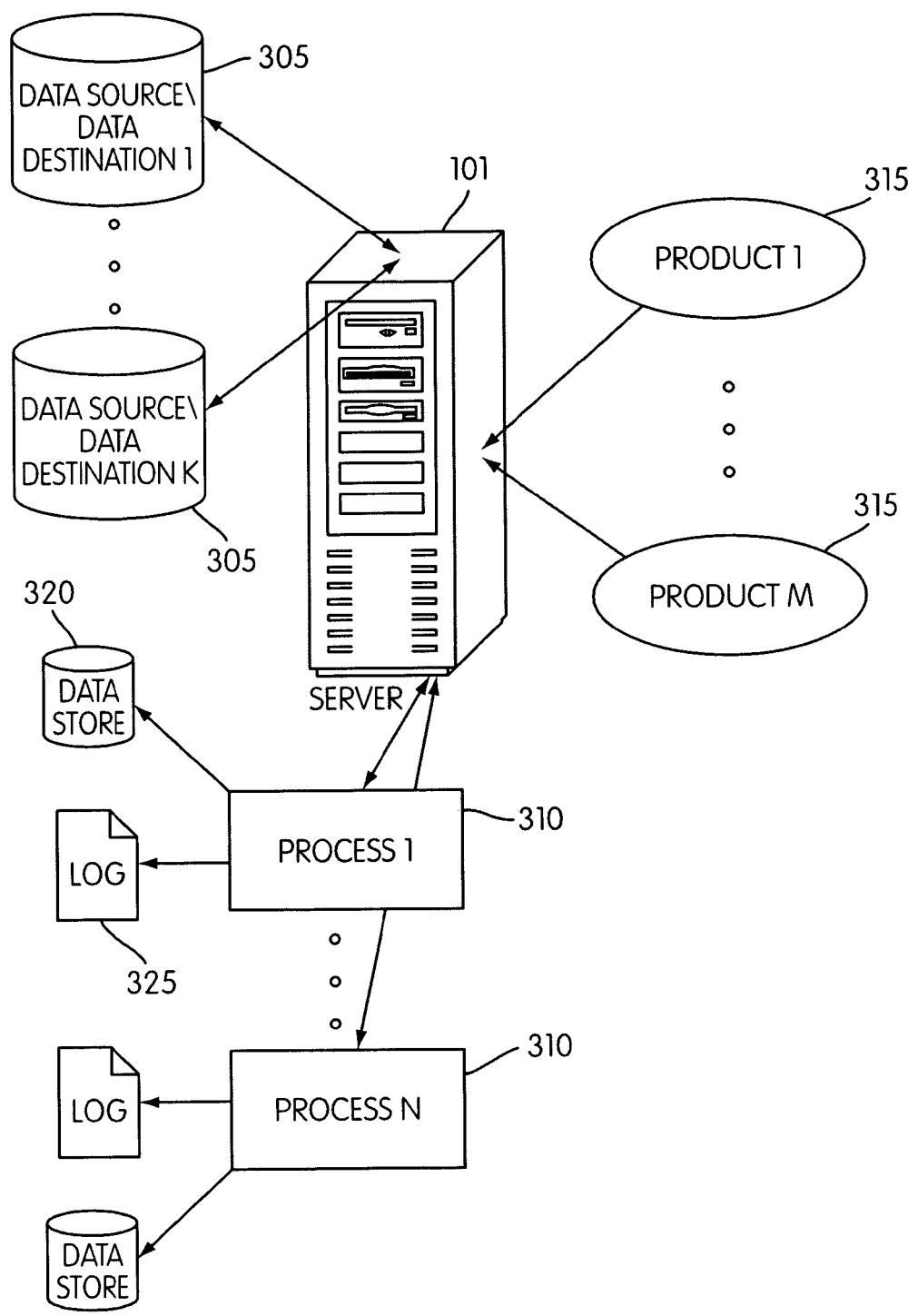
FIG. 4 is a functional block diagram illustrating the relationship among data sources/destinations, products, and processes in one embodiment of the invention.

FIG. 4 is a functional block diagram illustrating one contemplated relationship among data sources/destinations, products, and processes according to at least one embodiment of the invention. As shown in FIG. 4, the enterprise business process server 101 may receive enterprise application or transaction data from and transmit to one or more data sources/destinations 305. In at least one embodiment, the enterprise business process server 101 may provide corrected data following detection of an error to a data source/destination 305 (e.g., data source/destinations 1 through K). Furthermore, the enterprise business process server 101 may receive process input from one or more products 315 (e.g., Products 1 through M). A product 315 may include a function or set of functions. In at least one embodiment, a function may be a routine in a library that returns a value or set of values. In addition, the enterprise business process server 101 may include or access one or more processes 310 to perform, for example, the data quality assurance functions described herein (e.g., Processes 1 through N). In at least one embodiment, the enterprise business process server 101 may provide an individual error log 325 for each process 310. Results from each process 310, including any error log 325 generated, may be stored and maintained using a log data store 320 (which may be the data store 160 described with respect to FIG. 5).

The enterprise business process management system 100 may include an architecture designed to utilize an unlimited number of different vendors' products in a unique process for each application (data source) or data set within an application. In particular, the enterprise business process management system 100 may provide a framework for a unique process that creates, executes, manages and reports on individual process steps in a business process that utilizes different vendors' products on various platforms and enables these products to be used across the entire enterprise. The enterprise business process management system 100 may provide archiving or logging of the quality of the data being processed at each step in a multi-vendor environment. The enterprise business process management system 100 may allow for managing, tracking and reporting on the use of multiple vendors' products in a unique process for any application (data source) or data set within an application. The enterprise business process management system 100 may provide for the utilization of the same functions from the same or multiple vendors with different settings in a process. The enterprise business process management system 100 may provide different views on the performance of individuals, business units, or special constituencies within an organization and the enterprise in regard to particular aspects of the business process such as, for example, data quality. The enterprise business process management system 100 may provide for comparisons of the effectiveness of various functions and settings from different vendors for the selection of the most effective functions and settings to handle a specific enterprise issue, such as, for example, a data quality issue. The enterprise business process management system 100 may provide for the fast implementation of multi-vendor applications, such as data quality tools and data quality processes.

In particular, the enterprise business process server 101 may utilize a vendor independent architecture that allows for business process tools to be used either on their current computer platform or on the same platform that hosts the enterprise business process server 101. In at least one embodiment, the enterprise business process management system 100 provides for reuse of functions of multiple business applications in system 100 defined business processes.

Figure 5:
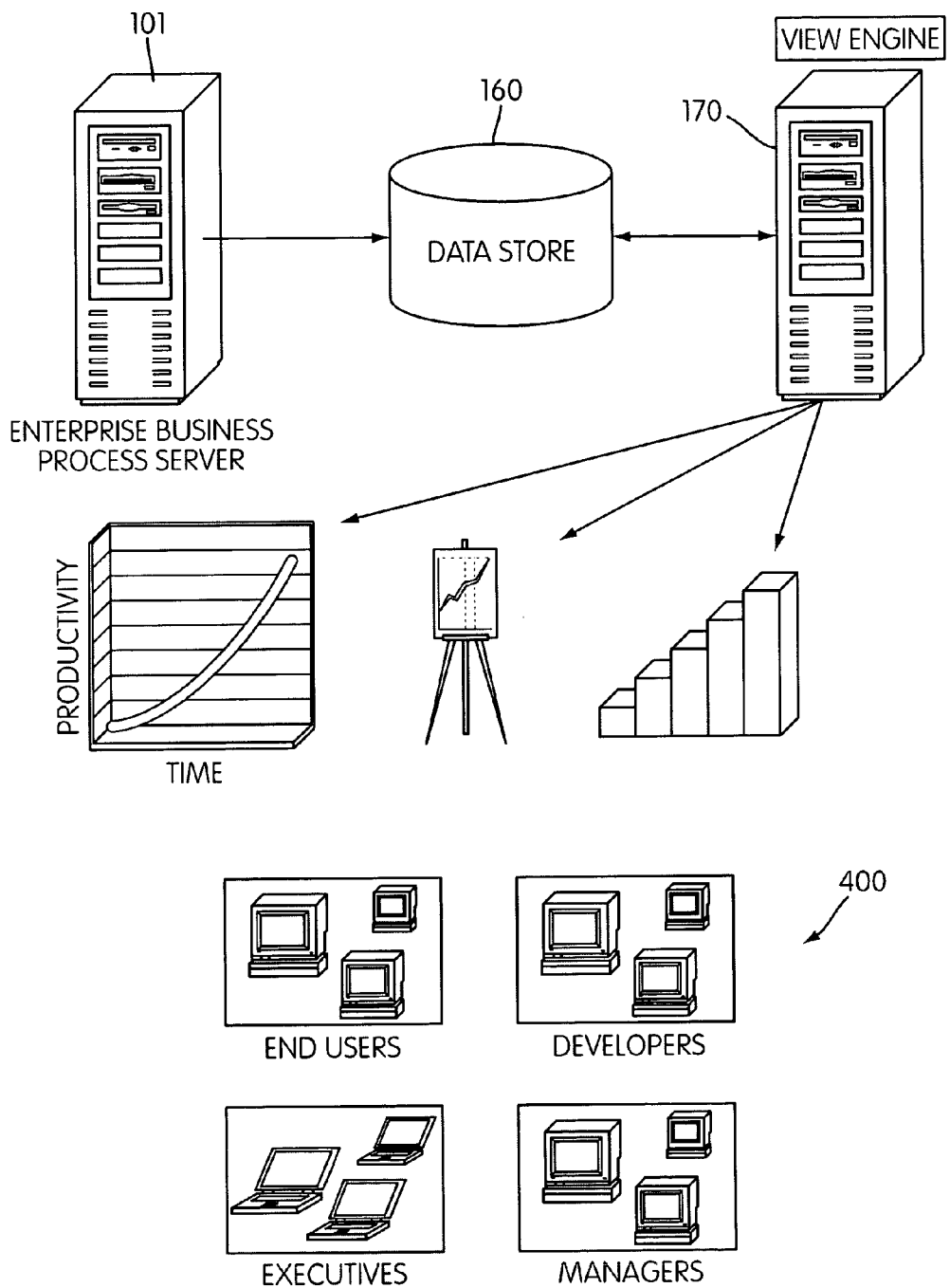
FIG. 5 is a functional block diagram illustrating equipment that may be used to implement a system in accordance with at least one embodiment of the invention.

FIG. 5 illustrates equipment that may be used to implement a system in accordance with at least one embodiment. In particular, the enterprise business process system 100 may include not only the enterprise business process server 101, but may also include a data store 160 and a view engine 170. The data store 160 need not be a single data store but may comprise several data stores together. For example, the data store 160 may be, but is not limited to, an OLAP (On-Line Analytical Processing Database) or a Summary Database. The data store 160 may include, but is not limited to, formatting instructions and rules used by the view engine 170 to produce an error report according to one of several views 400. For example, the view engine 170 may obtain from the data store 160 a sequence of formatting instructions and apply the thus-obtained instructions in generating an error report according to the associated view 400. In at least one embodiment, each view 400 may be associated with a particular set of formatting instructions. The formatting instructions may be implemented in the form of HyperText Markup Language (HTML) or Extensible Markup Language (XML) instructions designed to cause the view engine 170 to render an interactive page containing the requested error report according to the desired view. The interactive page may be, for example, a world wide web page, or a page capable of display at a terminal 112 or 113 using a web browser application.

As can be seen in FIG. 5, the enterprise business process management system 100 may provide several different views 400, including, but not limited to, an end user view, a developer view, a manager view, and an executive view. Exemplary views 400 are described in further detail with respect to FIGS. 7–10 below.

The enterprise business process management system 100 may provide the ability to create different views 400 of the results of each step in a process for different levels of an organization to permit the measurement and management of the effectiveness of the organization's business processes. The enterprise business process management system 100 may include visualization software that creates graphical information for the different views 400. This graphical information may include analytical tools, statistical information, data tracking, cost analysis and, in at least one embodiment, an indication of the impact of the results of the different levels of the organization in reducing the errors in data quality.

In order to support the generation of error reports in accordance with a variety of views 400, the data store 160 (which may be an online application processing database or summary database) may maintain error report information in accordance with a "single view" in which information contained in the data store 160 is formatted and arranged in a consistent manner equally accessible by the view engine 170 for the production of any view 400, regardless of the data source/destination 305, product 315, or process 310 from which the data was obtained.

The enterprise business process management system 100 may log the results of each step in a process from every data source. This log may provide information regarding who sent the data, what occurred during each step of the process, and where the data was sent after the process was completed. This log may feed directly into the view engine 170, which may be a graphical reporting system, for rendering of multiple views.

In at least one embodiment, view engine 170 may provide graphical reports to various users including executives, managers, end users, and process developers that convey information regarding how they, their department, organization or processes are performing. In particular, in at least one embodiment, view engine 170 may provide the following views 400, for example views for Executives, Managers, Users, and Developers. The Executive View provides graphical reports on the quality of data for the whole organization. Executives can drill down into the performance of every segment within the organization to compare performances and causes of data quality issues. Executives have access to Manager and User Reporting modules as well. The Managers View provides graphical reports on the quality of data in the manager's organization(s) and department(s). Managers can drill down into the performances of their business units and departments and compare performances and causes of issues such as, for example, data quality. The Users View provides graphical reports on the quality of the data that has been entered by users into the system. Users can drill down on the specific problems and review the input and output data and result codes of each step in the process. The Developers View provides graphical reports on the results of all processes and steps so that developers may analyze the results and make changes to the process to improve the results. Developers can readjust the sequences of functions, eliminate functions, utilize functions from other vendors, add new functions from different vendors and create new functions themselves.

The view engine 170 may include statistical modeling packages that can be used to add the financial impact of data that is validated/corrected and not validated/corrected. In at least one embodiment, the view engine 170 may be implemented using graphical modeling technology available from, for example, Illumitek™ Corp. of Dulles, Va.

FIG. 6 provides further details concerning implementation of the analysis that may be performed by the enterprise business process management system 100. The enterprise data quality management system 100 may provide for the creation of a unique process for each application or data set from that application using all or a subset of the functions and settings available within all the business process products present in the enterprise network and externally available. Each application or data set within an application is capable of utilizing all the functions and settings in a sequence appropriate for meeting unique needs. Such business processes may be composed of an unlimited number of steps. Each step may correspond to a function and setting or a series of functions and settings from a particular vendor. The enterprise business process management system 100 may provide archiving and logging of the results of every step in a multi-vendor process. Log files may be automatically logged to a text file or a data store. In particular, errors may be determined and logged at the process level.

The enterprise business process management system 100 may include the ability to compare the strengths and weaknesses of each vendor's functions and settings in a multi-vendor, multi-step process. Furthermore, the enterprise business process management system 100 may provide a fast, easy to use methodology for installing products and functions from multiple vendors to expedite the implementation of business process projects. Thus, in at least one embodiment, the enterprise business process management system 100 may be vendor independent while allowing users access to all the functions included in additional enterprise servers or application, including existing business process vendor products, custom codes, or services. Through use of the function oriented approach as described herein, a user may sequence the business process functions, such as, for example, data quality functions, from different vendors in any order determined to fit the needs of each data set and data source. Furthermore, a user may establish unique processes 310 and steps for each data set within a data source as described with respect to FIG. 11.

A vendor may be a software company that provides functionality to, for example, identify and separate into distinct fields the elements of a business and consumer name; identify, separate, validate and correct each element of an address; identify, separate, validate, correct and transform non-name and address information for on-line transactions and batch processing; consolidate data from different records and different data sources; augment the original data with additional data; and create a single record or view of that individual or client.

The enterprise business process management system 100 may include a Graphical User Interface (GUI) capable of allowing a user to create a process for an application or data set from an application. The user may specify the format for the data, and may also create individual steps in a process by calling a specific function(s) and setting(s) from an available tool for each step. The GUI may be implemented using Java® instructions, for example. The user may repeat the exercise of creating steps until a business process is fully defined and completed. The process may be represented, viewed and navigated in a hierarchical fashion where a single step may represent a multi-step sub process. The process depiction and description may be presented on other output devices, such as printer. The process depiction and description may be exported for viewing and manipulation by external applications, such as a word processor, flow chart application, or web browser. The user may then identify the destination(s) for the results of the process and decide what information is to be sent to each destination. The results of each step within a Process may be logged to a text file or data store. The data that is stored in the text file or data store may used by a view engine, which may include visualization software, to create graphical reports, which contains analytical information, statistical information, data tracking, cost analysis, and the impact of data for the different levels within an organization. This information may be used to measure and monitor the effectiveness of an enterprise business process such as, for example, a data quality program.

Figure 39:
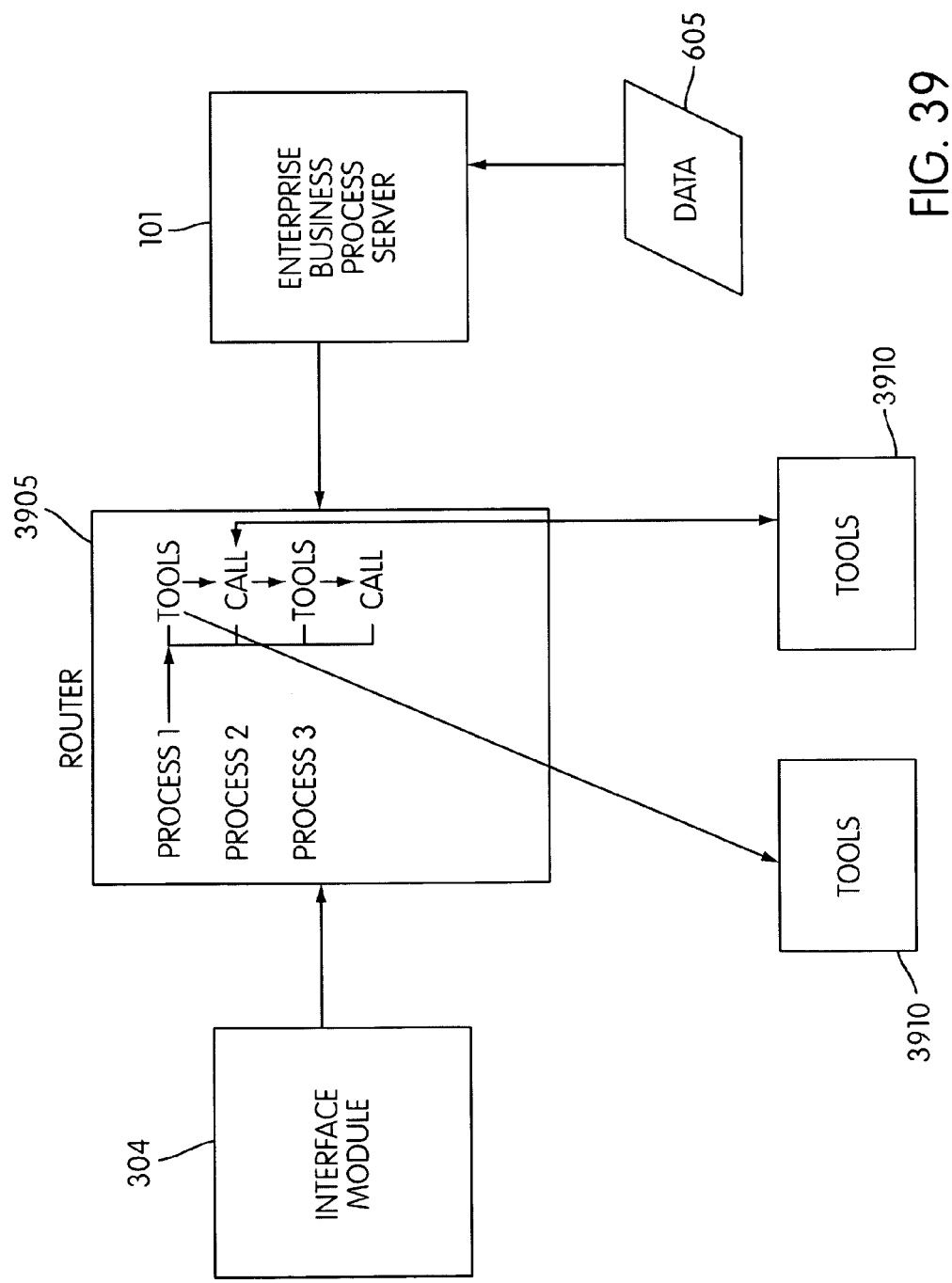
FIG. 39 shows the relationship between the interface module, enterprise business process server, and router in an embodiment of the invention.

FIG. 39 shows the relationship between the interface module 304, enterprise business process server 101, and router 3905 in an embodiment. Referring to FIG. 39, input data 605 from a data source such as, for example, a business application, may be received by the enterprise business process server 101. In an embodiment, the input data 605 may include a process identifier specifying a particular business process to which the input data 605 is to be applied. The enterprise business process server 101 may be configured to detect the input data 605 process identifier and provide the input data 605 to the specified business process of the router 3905. In an embodiment, the router 3905 may include an integrated instruction set embodying one or more business processes (e.g., processes 1, 2 and 3 are shown in FIG. 39). The instructions for each business process may include calls to tools 3910 (i.e., functions) residing external to the router 3905 for performing process steps, as well as tools 3910 obtained from business applications external to the router 3905 but residing on the router 3905.

In at least one embodiment, the router 3905 may be an interchangeable router in which new versions or loads for the router 3905 may replace the current router 3905 version, and be placed in service and handle data traffic, without the need to take the server 101 down (i.e, out of service). The router 3905 may include the instruction set for the currently active business processes provided by the enterprise business process management system 100. A new router 3905 version may be built and placed into service to begin data traffic handling according to a new or modified business process. In an embodiment, the interface module 304 may generate an instruction set embodying a new or modified business process in response to user entered function information. The user may enter the function information using, for example, a process designer interactive page provided by the interface module 304. Following replacement of the current router version with a new router version, input data 605 may be handled according to the new router version. Further details concerning the replacement of a current router version with a new router version are described with respect to FIGS. 23a–d herein.

Referring to FIG. 6, a method 600 may commence with the enterprise business process server 101 receiving input data at 605. The input data 605 may be received from a data source/destination 305.

Control may then proceed to 610 at which the input data may be passed to a process router. Based on a process identifier, the process router may direct the input data to a particular process 310 (e.g., Process X). In at least one embodiment, the process router may allow processes and steps to be easily and quickly modified without bringing down the server 101 (i.e., an interchangeable or hot swappable router).

Control may then proceed to 615, at which the process 310 (e.g., Process X) may receive the input data and pass it to each step in a multiple step process. An example of a business process is a data quality process such as an address validation operation in which transactional data (obtained from a data source/destination 305 associated with a particular enterprise application) is compared to a trusted source such as, for example, a United States Postal Service database. Control may then proceed to a second step at 620 and thereafter to subsequent steps (e.g., Step N) at 635. After each step in the process 310, the results of the step may be entered into a log 630, such as, for example, error log 315, and the data is passed to the next step. The results of each step of the process 310 and the error log 315 may be maintained in a data store 625, such as the data store 160. As mentioned above, the data store 625 (and the data store 160) may be, but is not limited to, an OLAP (On-Line Analytical Processing Database) or a Summary Database. Logging may include server Logging (e.g., logging of all transactions received by the server, logging of server statistics) as well as process logging (e.g., detailed logging of each step within a process that can be used for analysis on transaction data and product abilities).

After the final step in the process 310 has been completed, control may proceed to 640 at which the process results may be applied to an output data structure. The output data may then be provided to a data source/destination 305, following which processing may end for the method 600.

In at least one embodiment, a process 310 may include fields such as, but not limited to, ROME_ID, ROME_TIME, SECT_CODE, SOURCE_DEST, SUB_SOURCE_DEST, RETURN_CODE, and INPUT COMPONENT 1-N. Each step in a process 310 may include fields such as, but not limited to, ROME_UID, ROME_TIME, PRODUCT_ID, PRODUCT_RC, STEP_ID, and OUTPUT COMPONENT 1-M. Each data packet may have a unique identifier (e.g., "ROME_ID") that can be used to track the results of multiple submissions of the same data packet.

Figure 7:
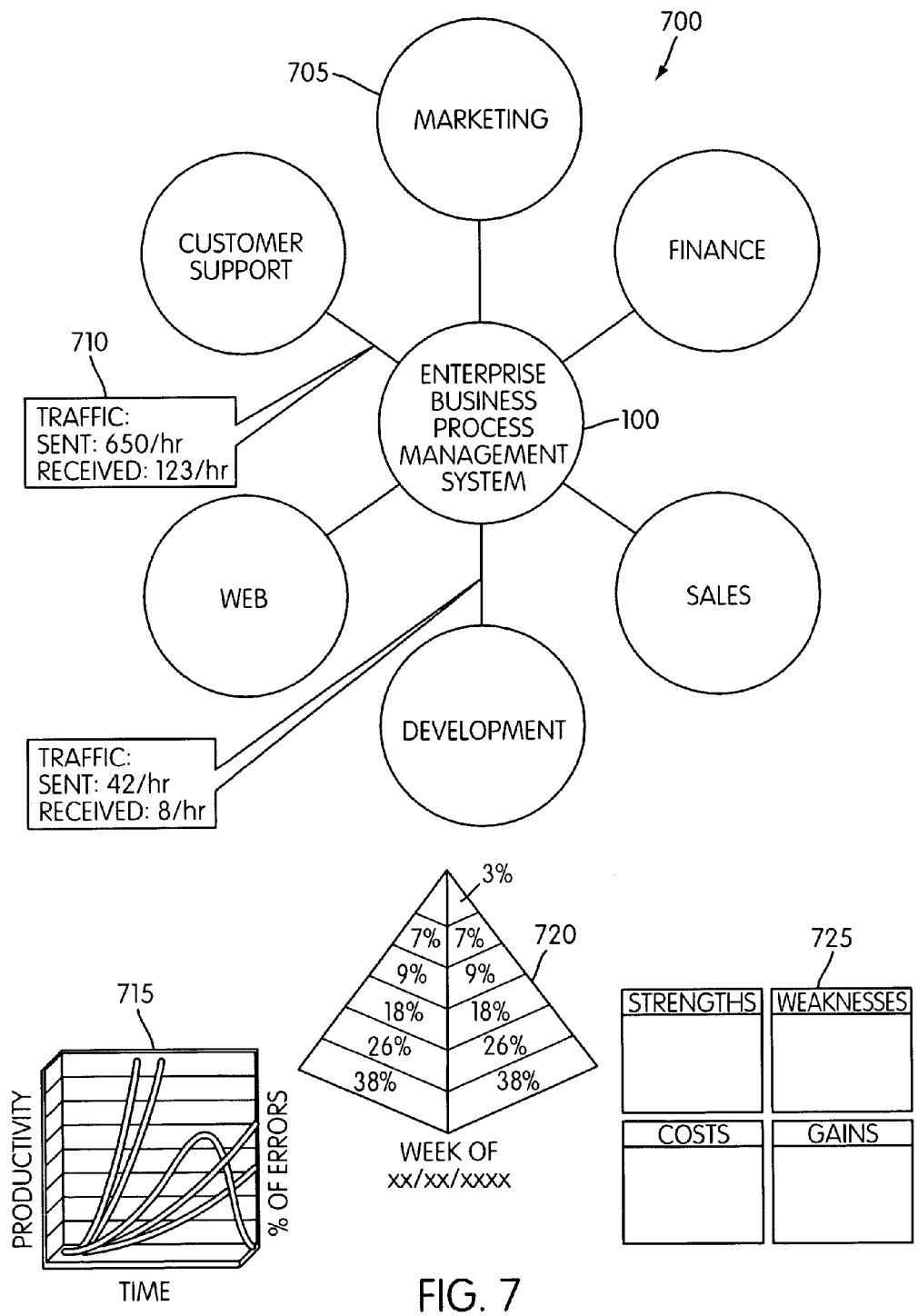
FIG. 7 is an example of an error report for an executive view according to at least one embodiment of the invention.

As described earlier herein with respect to FIG. 5, for example, in at least one embodiment, the enterprise business process server 101 may provide error reports in accordance with one or more views 400. FIG. 7 is an example of an error report for an executive view according to at least one embodiment of the invention. As shown in FIG. 7, an executive view 700 may include one or more error reports providing data error information for a variety of divisions 705 of an enterprise. For example, the exemplary executive view 700 shown in FIG. 7 may present an error report for divisions 705 including marketing, finance, sales, development, web, and customer support divisions, giving the requesting user (e.g., enterprise executive) visibility into aspects of the enterprise such as, for example, data quality, so that corrective action may be taken, for example. In at least one embodiment, incorrect or errored records may be marked to indicate that they were not corrected, and the reasons for such.

In particular, an error report may provide in numeric as well as graphical form, using tools such as charts 715 and 720, ranking or statistical analysis of the errors detected in a given set of enterprise application data or transactional data. For example, in at least one embodiment the enterprise business process management system 100 may perform analysis processes that provide information to the requesting user such as, but not limited to, a ranking of the data errors 720 detected for applications within different divisions 705, a traffic intensity indicator 710 for data transactions flowing into and out of a division 705, a productivity chart 715 showing the change in productivity for each division 705 over time, and a process error classification 725 of the strengths, weaknesses, costs, and gains associated with the data quality for the divisions 705.

Figure 8:
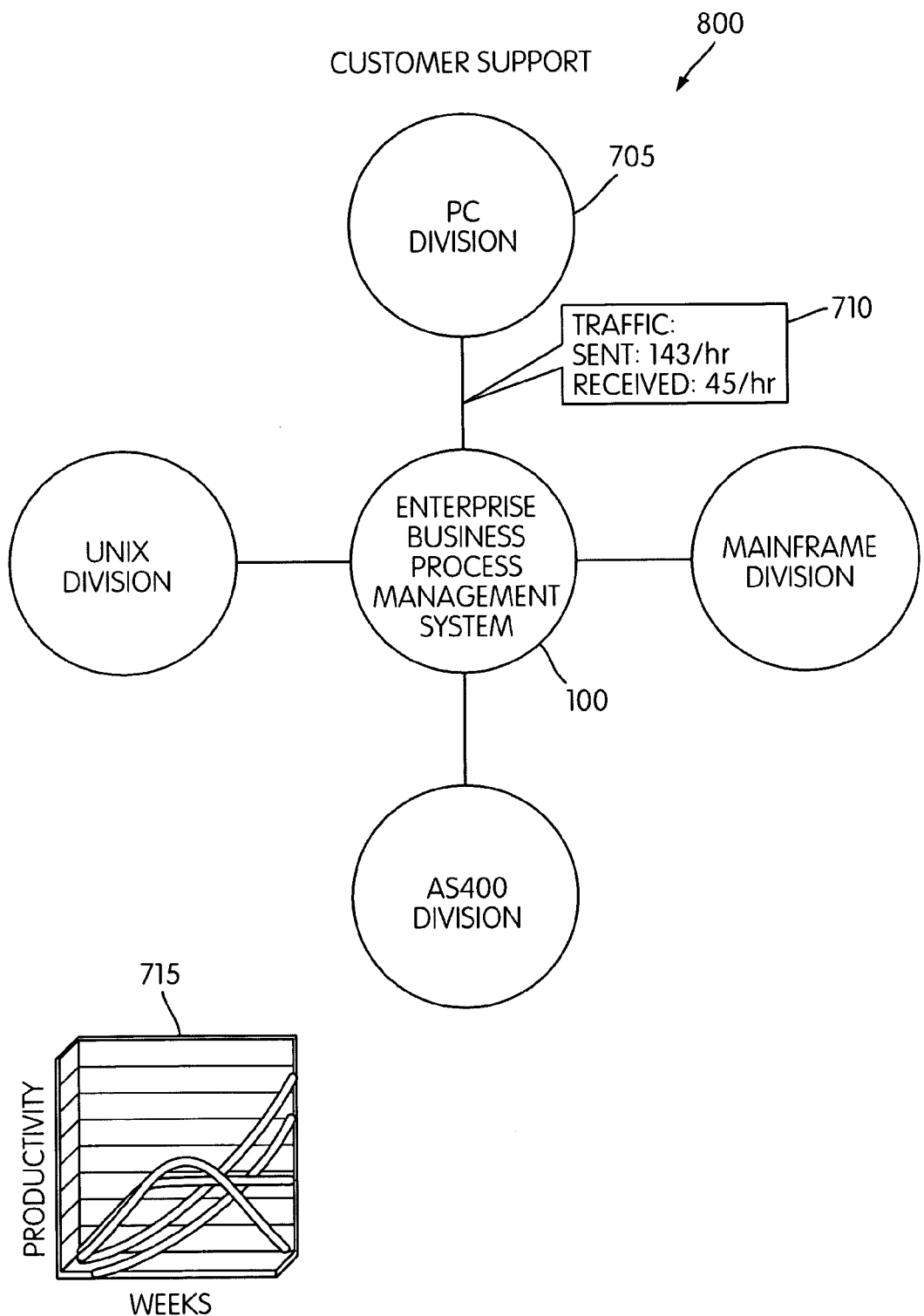
FIG. 8 is an example of an error report for a customer support view according to at least one embodiment of the invention.
Figure 9:
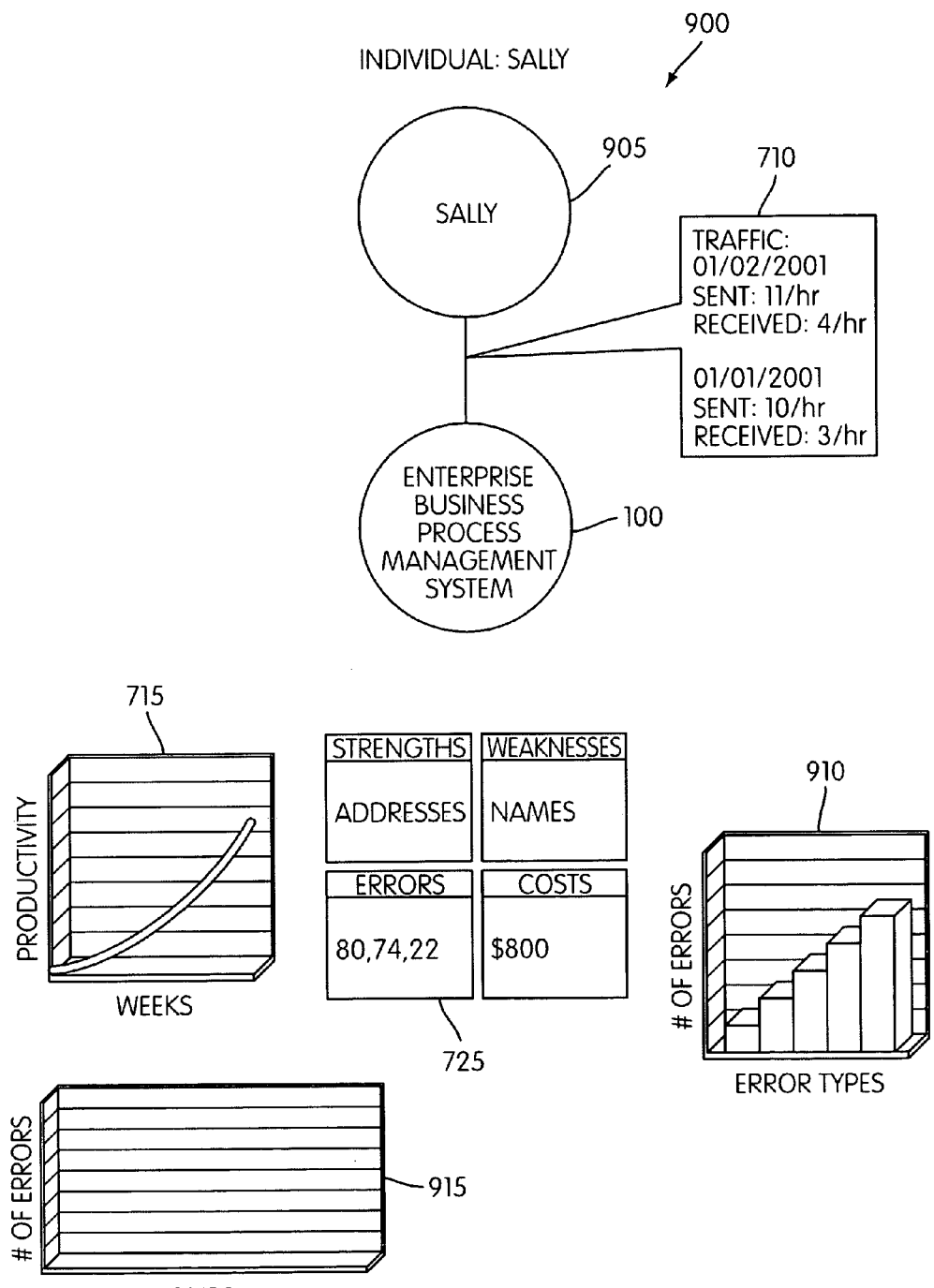
FIG. 9 is an example of an error report for an individual view according to at least one embodiment of the invention.
Figure 10:
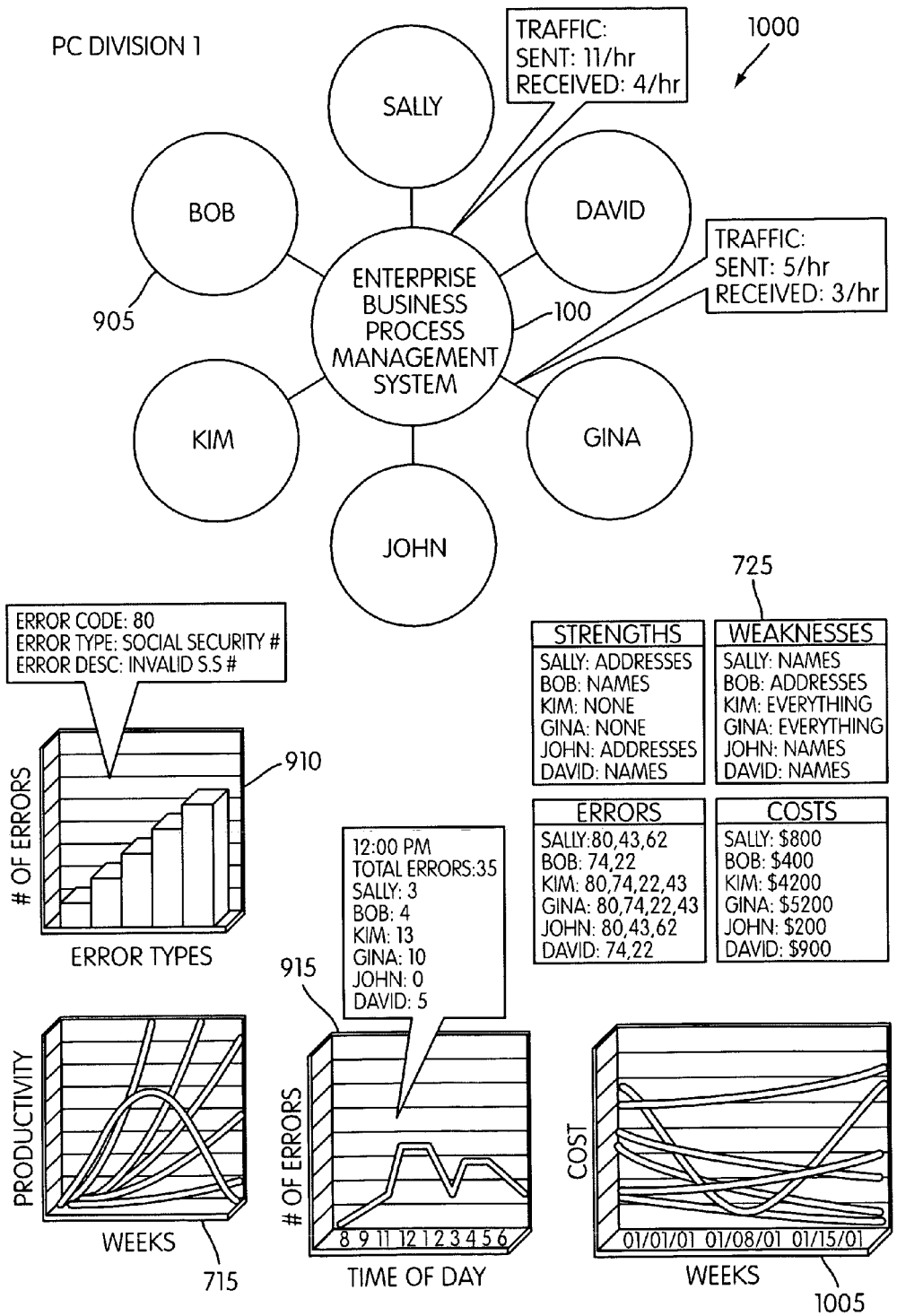
FIG. 10 is an example of an error report for a manager view according to at least one embodiment of the invention.

Similarly, FIGS. 8–10 are examples of an error report for a customer support view 800, an individual view 900, and a manager view 1000, respectively, according to at least one embodiment. Items including reference numbers identical to those appearing in FIG. 7 are as described earlier with respect thereto.

In particular, for individual view 900, the enterprise business process management system 100 may provide visibility to the requesting user into, for example, data errors attributable to a particular individual. For example, FIG. 9 shows a process error classification 725 of the strengths, weaknesses, costs, and gains associated with a particular individual 905, as well as the error types 910 committed by the individual 905 and the number of errors distributed over time 915 attributable to the individual 905. The example error classification 725 of the error report in FIG. 9 shows that the individual 905 is strong (i.e., few errors committed) in entering address information, is weak (i.e., many errors) in entering names, has committed 80, 74, and 22 errors in different time periods, and has cost the enterprise $800 as a result of the data errors.

Furthermore, for manager view 1000, the enterprise business process management system 100 may provide visibility to the requesting user (e.g., enterprise manager) into data errors attributable to particular individuals 905 and to the individuals as a group. For example, FIG. 10 shows a process error classification 725 of the strengths, weaknesses, costs, and gains associated with multiple individuals 905, as well as the error types 910 committed by each of the individuals 905 and the number of errors distributed over time 915 (e.g., time of day) attributable to the group. A cost per time period chart 1005 may also be provided indicating the daily cost incurred by the enterprise for the data errors attributed to each individual 905.

Figure 11:
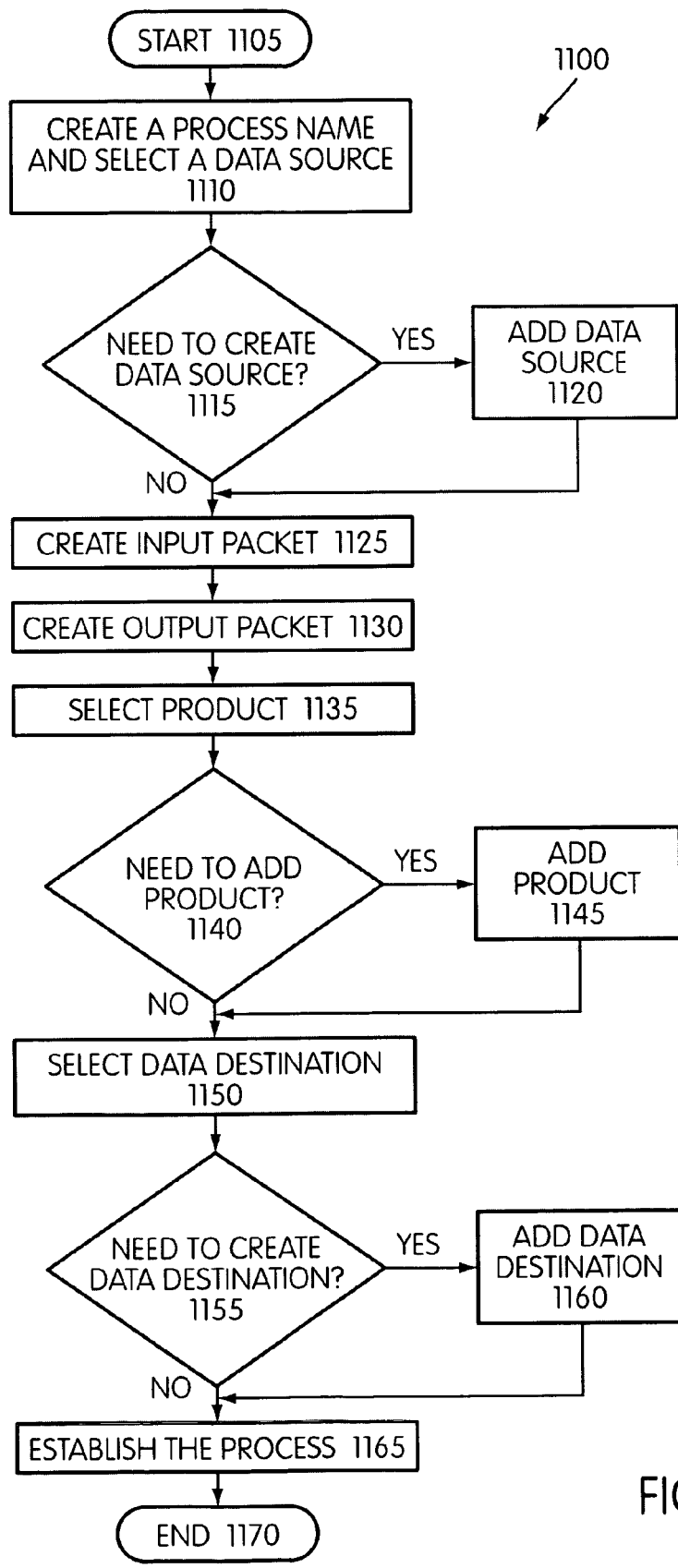
FIG. 11 is a flow chart of a method of establishing a business process for the enterprise business process management system in accordance with at least one exemplary embodiment of the invention.

In at least one embodiment, the enterprise business process management system 100 may provide the capability for a user (e.g., an administrative user) to create and establish business processes 310 for execution by the enterprise business process server 101. FIG. 11 is a flow chart of a method 1100 of establishing an exemplary data quality process for the enterprise business process management system 100 in accordance with at least one embodiment. The method 1100 may commence at 1105 upon the enterprise business process server 101 receiving a user request to create a process 310. A user may enter a request to create a process 310 by, for example, using a pointing device to select an associated hyperlink contained on an interactive page provided by a graphical user interface portion of the enterprise data quality application 300.

Control may then proceed to 1110, at which the enterprise business process server 101 may prompt the user to create a process name and select a data source for the process 310. FIG. 12 is an example of an interactive page 1200 provided by the enterprise business process server 101 in which a user may enter a process name, description, and associated data source 305.

Control may then proceed to 1115, at which the enterprise business process server 101 may prompt the user to enter a new data source 305, if necessary. If the user responds by requesting to add a new data source 305, control may proceed to 1120 at which the enterprise business process server 101 may generate and output an interactive page 1300 for a user to add a data source 305. FIG. 13 is an example of an interactive page 1300 provided by the enterprise business process server 101 in which a user may add a data source 305 by entering information such as, but not limited to, a data source name, description, IP address, Port Number, and platform identifier.

Control may then proceed to 1125, at which the enterprise business process server 101 may prompt the user to create an input packet for the process 310. FIG. 14 is an example of an interactive page 1400 provided by the enterprise business process server 101 in which a user may create an input packet by entering attribute information such as, but not limited to, an input element name, type, length, and description. The input element type may specify a data type for the input packet such as, but not limited to, boolean, character, double character, wide character (UNICODE), floating point decimal, integer, long integer, or short integer.

Control may then proceed to 1130, at which the enterprise business process server 101 may prompt the user to create an output packet for the process 310. FIG. 15 is an example of an interactive page 1500 provided by the enterprise business process server 101 in which a user may create an output packet by entering attribute information such as, but not limited to, an output element name, type, length, and description. The output element type may specify a data type for the output packet such as, but not limited to, boolean, character, double character, wide character (UNICODE), floating point decimal, integer, long integer, or short integer.

Figure 16:
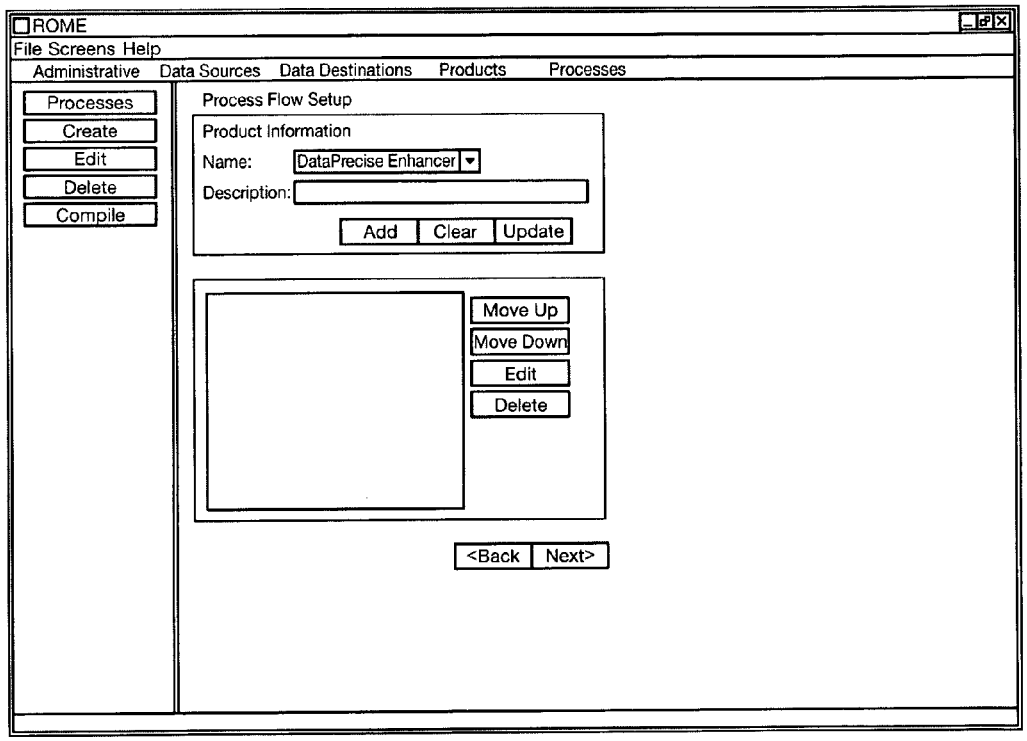
FIG. 16 is an exemplary user interaction page of a graphical user interface for selecting a product to a process in accordance with at least one embodiment of the invention.

Control may then proceed to 1135, at which the enterprise business process server 101 may prompt the user to select a product 315 (or function or set of functions, as the case may be) to be associated with the process 310. A product 315 may include a function or a set of functions. FIG. 16 is an example of an interactive page 1600 provided by the enterprise business process server 101 using which a user may select a product 315 by entering, as a minimum, a selection of a product 315 from a pull-down list, for example, and a product description.

Control may then proceed to 1140, at which the enterprise business process server 101 may prompt the user to add a product 315, if necessary. If the user responds by requesting to add a product 315, control may proceed to 1145 at which the enterprise business process server 101 may generate and output an interactive page 1700 for a user to add a product 315. FIG. 17 is an example of an interactive page 1700 provided by the enterprise business process server 101 in which a user may add a product 315 by entering information such as, but not limited to, a product name, product type, version, and product template. APPENDIX A hereto provides an exemplary sequence of pseudocode instructions for creating a product template.

Control may then proceed to 1150, at which the enterprise business process server 101 may prompt the user to select a data destination 305 for the process 310. FIG. 18 is an example of an interactive page 1800 provided by the enterprise business process server 101 in which a user may enter a data destination name and description.

Control may then proceed to 1155, at which the enterprise business process server 101 may prompt the user to enter a new data destination 305, if necessary. If the user responds by requesting to add a new data destination 305, control may proceed to 1160 at which the enterprise business process server 101 may generate and output an interactive page (not shown) for a user to add a data destination 305 by entering information such as, but not limited to, a data destination name, IP address, Port Number, and description. In at least one embodiment, all or a portion of data output by the enterprise business process server 101 may go to one or more data destinations 305.

Figure 19:
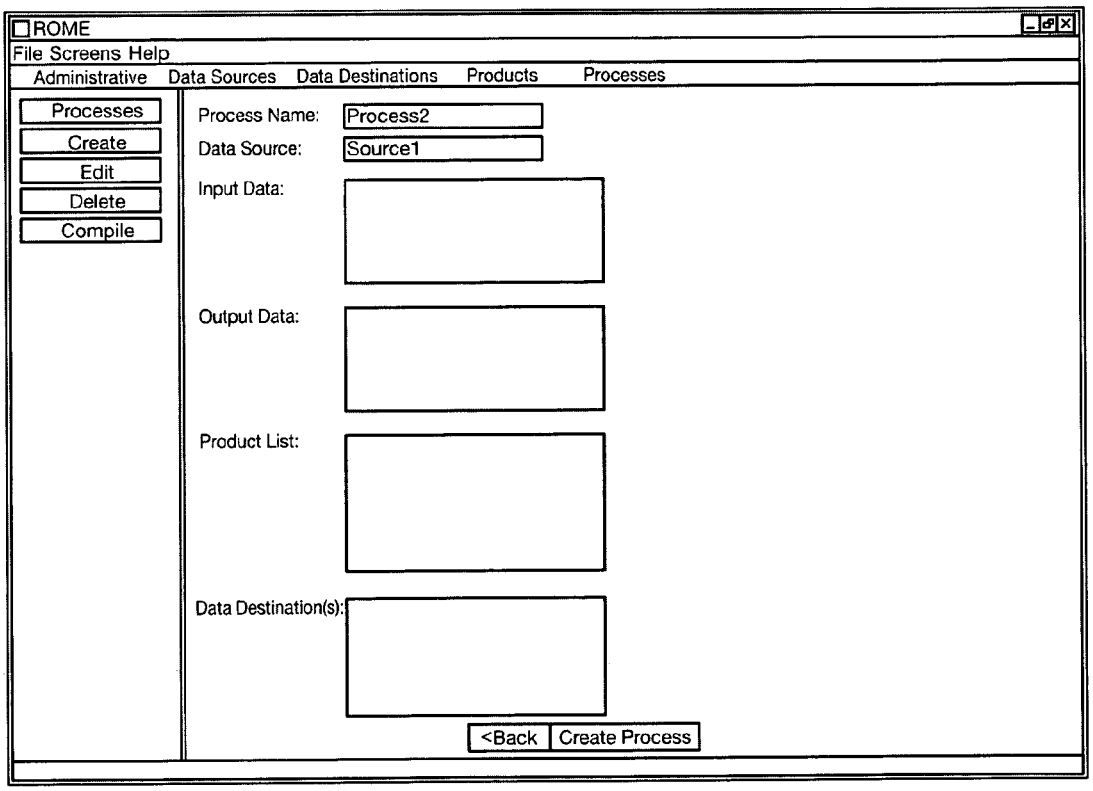
FIG. 19 is an exemplary user interaction page of a graphical user interface for establishing a process in accordance with at least one embodiment of the invention.

Control may then proceed to 1165, at which the enterprise business process server 101 may prompt the user to establish the process 310. FIG. 19 is an example of an interactive page 1900 provided by the enterprise business process server 101 in which a user may review and confirm information associated with the process 310 as described above. Summary process information provided by the page 1900 may include, but is not limited to, the process name, its data source 305, the input and output data specifications, the associated product 315 list, and the data destination(s) 305 for the process output. After a process 310 has been created, it may be edited (i.e., source code edit). Edited process instructions may be compiled into the process router. In at least one embodiment, the instructions may be source code instructions.

Processing for the method 1100 may end at 1170.

It should be noted that the data output from the system and method described may be provided in whole or in part to one or more destinations 305. In other words, all of the output data may be directed to a single destination 305. Alternatively, portions of the output data may be sent to multiple destinations 305.

Figure 24:
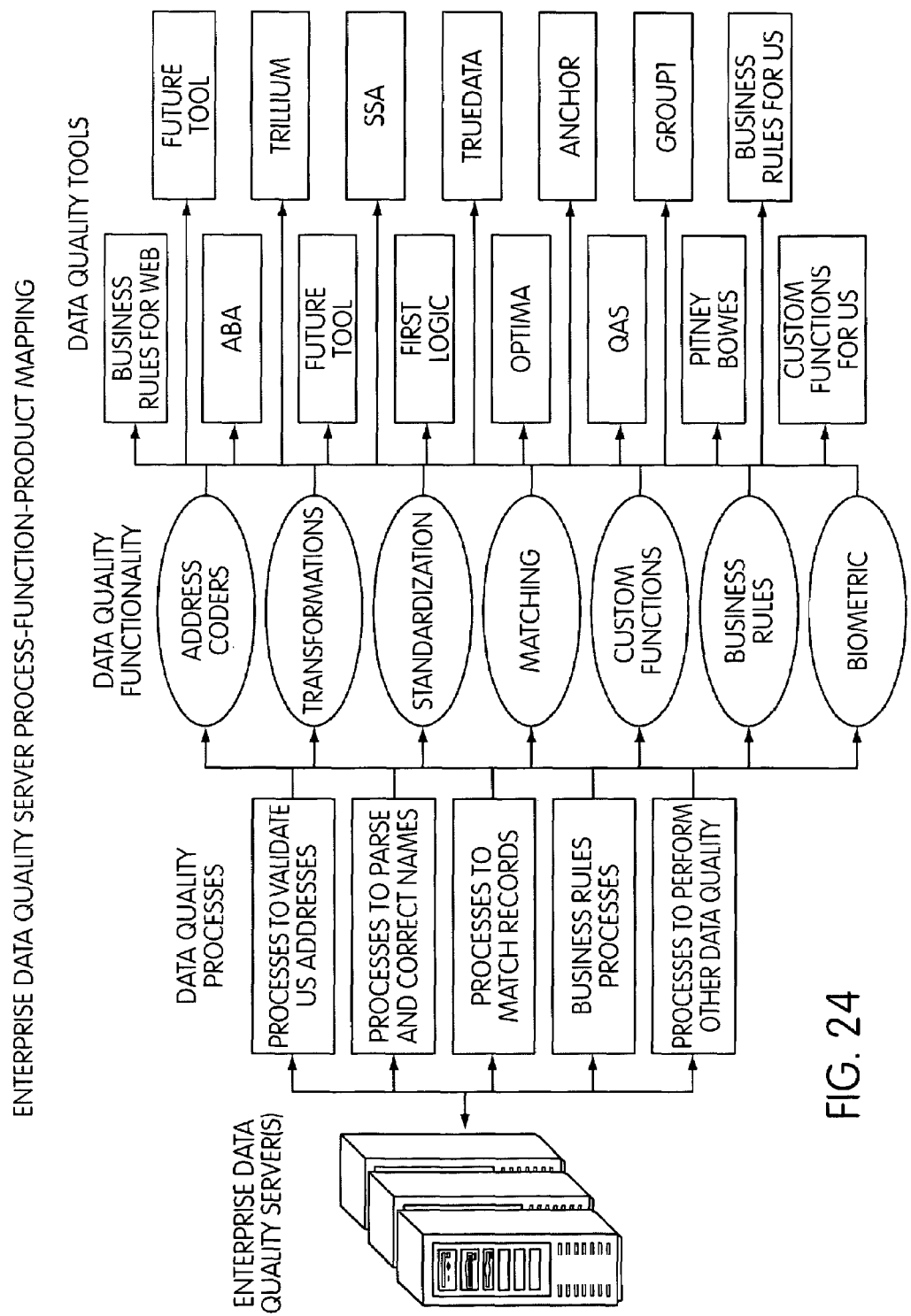
FIG. 24 provides a functional block diagram showing the relationship among functions, processes and products (e.g., tools) involved in the definition of business processes in an embodiment of the invention.

FIG. 24 provides a functional block diagram showing the relationship among fictions, processes and products (e.g., tools) involved in the definition of data quality business processes in an embodiment.

Figure 20:
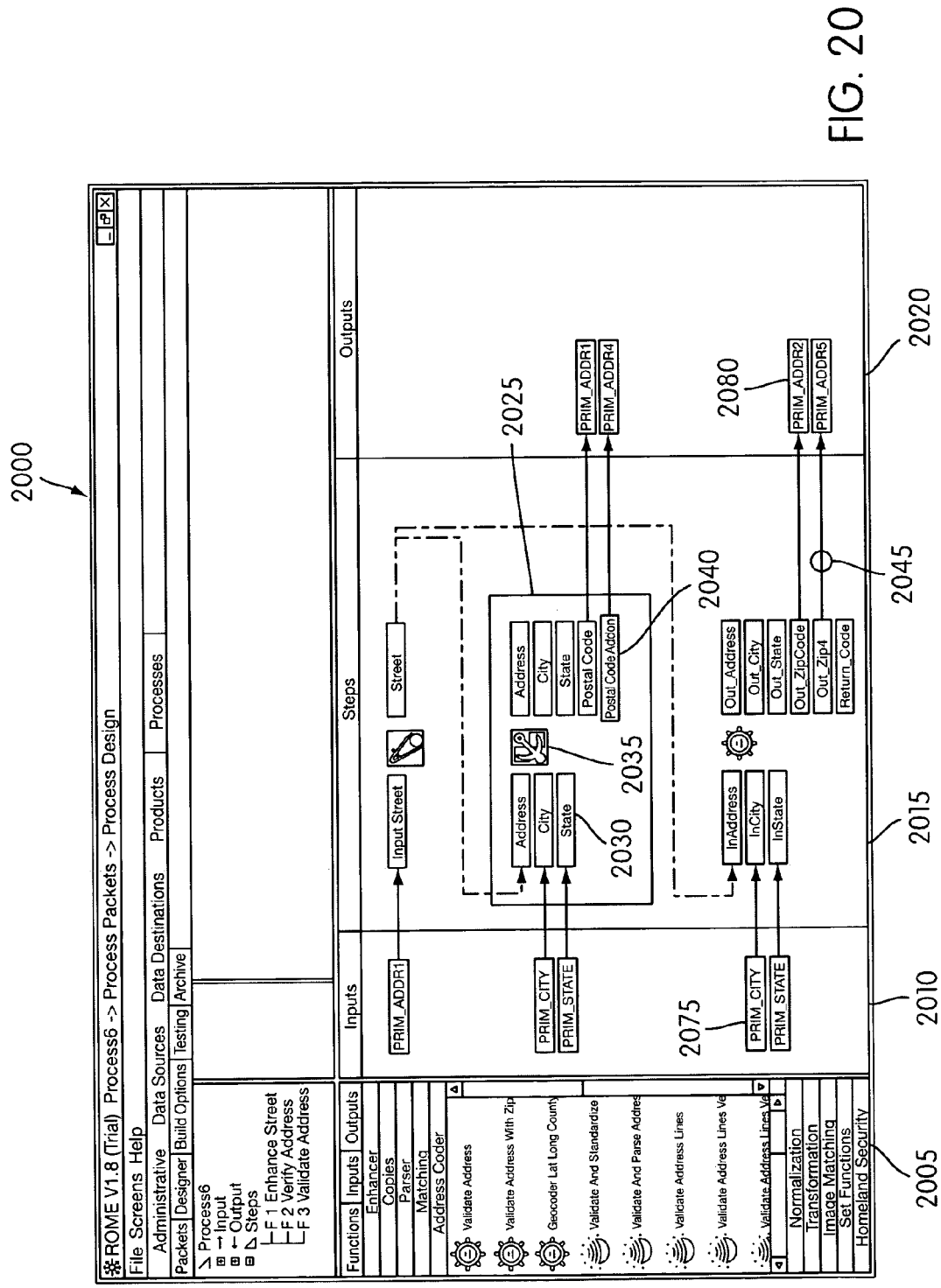
FIG. 20 shows an example process designer interface interactive display for a graphical user interface provided in accordance with at least one embodiment of the invention.

In at least one embodiment, the enterprise business process management system 100 may include an interface module, an example of which is described more particularly below. The interface module may also include aspects of the user interface described earlier herein. In an embodiment, the interface module 304 may be implemented as component of the enterprise data quality application 300 as shown in FIG. 3. The interface module may provide the capability for a user to define, create, modify, test and execute a sequence of function steps for a business process using the enterprise business process management system 100. In particular, the interface module may include an interactive graphically-oriented process specification tool that allows a user to define or modify a business process by, for example, selecting and moving (e.g., dragging and dropping) symbols relating to process functions to a display location representing a particular process step. Each process step may be represented, for example, as one or more function icons grouped together as shown generally in FIG. 20. FIG. 20 shows an example process designer interface interactive display 2000 provided in accordance with at least one embodiment. Thus, the interface module process designer may be used to define or specify a business process to be performed by the enterprise business process management system 100. As an overlay application to the developer's toolkit 303, the interface module 304 may provide interactive pages similar or in addition to FIGS. 12–19 described earlier herein.

A function may be a named section of a program that performs a specific task. In this sense, a function may be a type of procedure or routine. Some programming languages make a distinction between a function, which returns a value, and a procedure, which performs some operation but does not return a value. Most programming languages come with a prewritten set of functions that are kept in a library. Custom functions may also be developed that perform specialized tasks. For example, in the C language and certain other programming languages, a function is a named procedure that performs a distinct service. The language statement that requests the function is called a function call.

Referring to FIG. 20, the process designer interactive display 2000 may include a function library 2005, a process input area 2010, a process step definition area 2015, and a process output area 2020. Each process step 2025 may be represented, for example, as one or a group of function inputs 2030, function outputs 2040, and function identifiers 2035 within the process step definition area 2015. Each function input 2030 may be (or may not be) linked to an input element 2075 within the process input area 2010 using, for example, a link 2045. A link 2045 is also referred to as a connection or "road." Similarly, the each function output 2040 may be (or may not be) linked to an output element 2080 within the process output area 2020 using, for example, a link 2045. In an embodiment, links 2045 may be used to represent the directional flow of information from source to destination such as, for example, from an input element 2075 to a function input 2030. The flow of information may be controlled by at least one router that uses packet header information and a routing table to determine the destination or target. Furthermore, process steps 2025 may be linked to form, for example, a chain of successive process steps 2025 to be sequentially accomplished in a business process.

FIG. 25 shows an example of a functions overview interactive page provided in an embodiment. Referring to FIG. 25, a functions overview page 2500 may provide a listing of all functions currently included in the function library 2005. Functions therein may be ordered according to a variety of criteria such as, for example, chronologically by order of creation.

Figure 26:
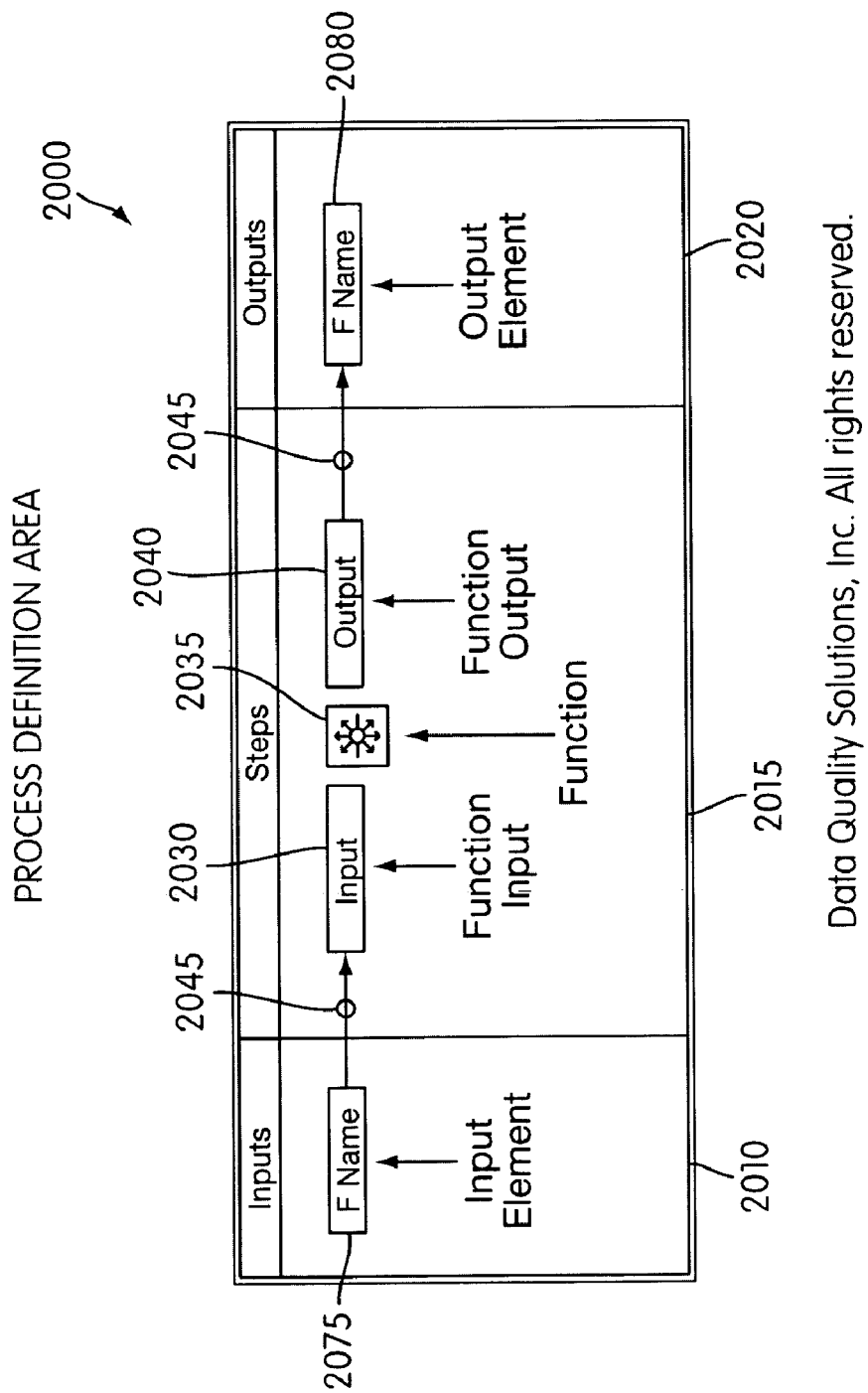
FIG. 26 shows an example of a process definition area portion of a process designer interactive page provided in an embodiment of the invention.

FIG. 26 shows an example of a process definition area portion of a process designer interactive page 2000 provided in an embodiment.

Each process step 2025 may represent a particular operation to be accomplished by the enterprise business process server when executing that process step 2025. In particular, a process step 2025 may include one or more function inputs 2030 and function outputs 2040. Furthermore, a function identifier 2035 may represent a particular operation to be performed using the function input(s) 2030 to produce the function output(s) 2040. In an embodiment, the enterprise business process management system 100 may perform many different process steps 2025 obtained from multiple application providers within a single business process. In at least one embodiment, the function identifier 2035 may serve to specify the functions and function elements of a particular application provider whose application(s) is used by the enterprise. Furthermore, multiple business processes may be supported by the enterprise business process management system 100.

Figure 27:
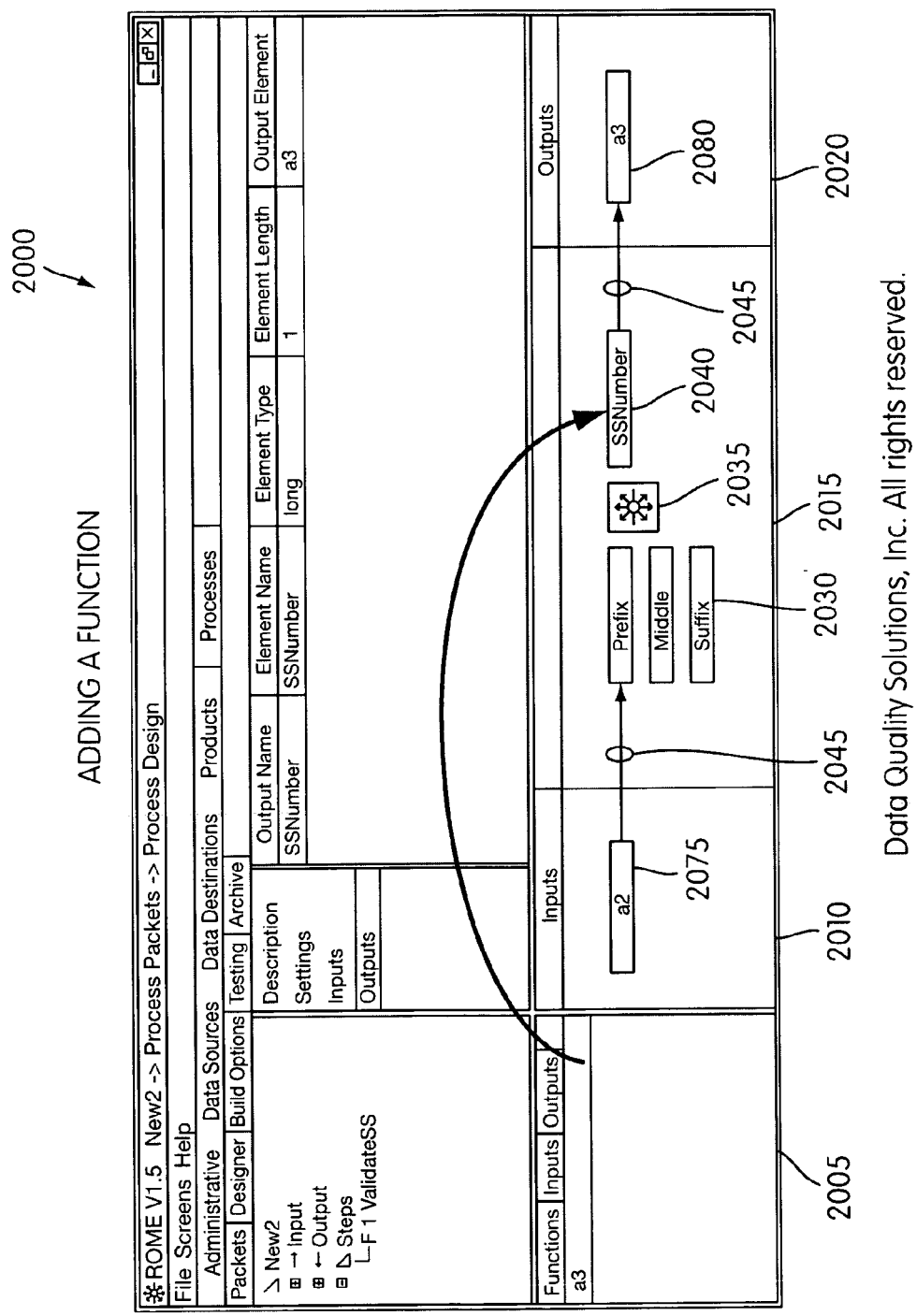
FIG. 27 shows an example interactive page illustrating adding an element of a process step from the function library in an embodiment of the invention.
Figure 28:
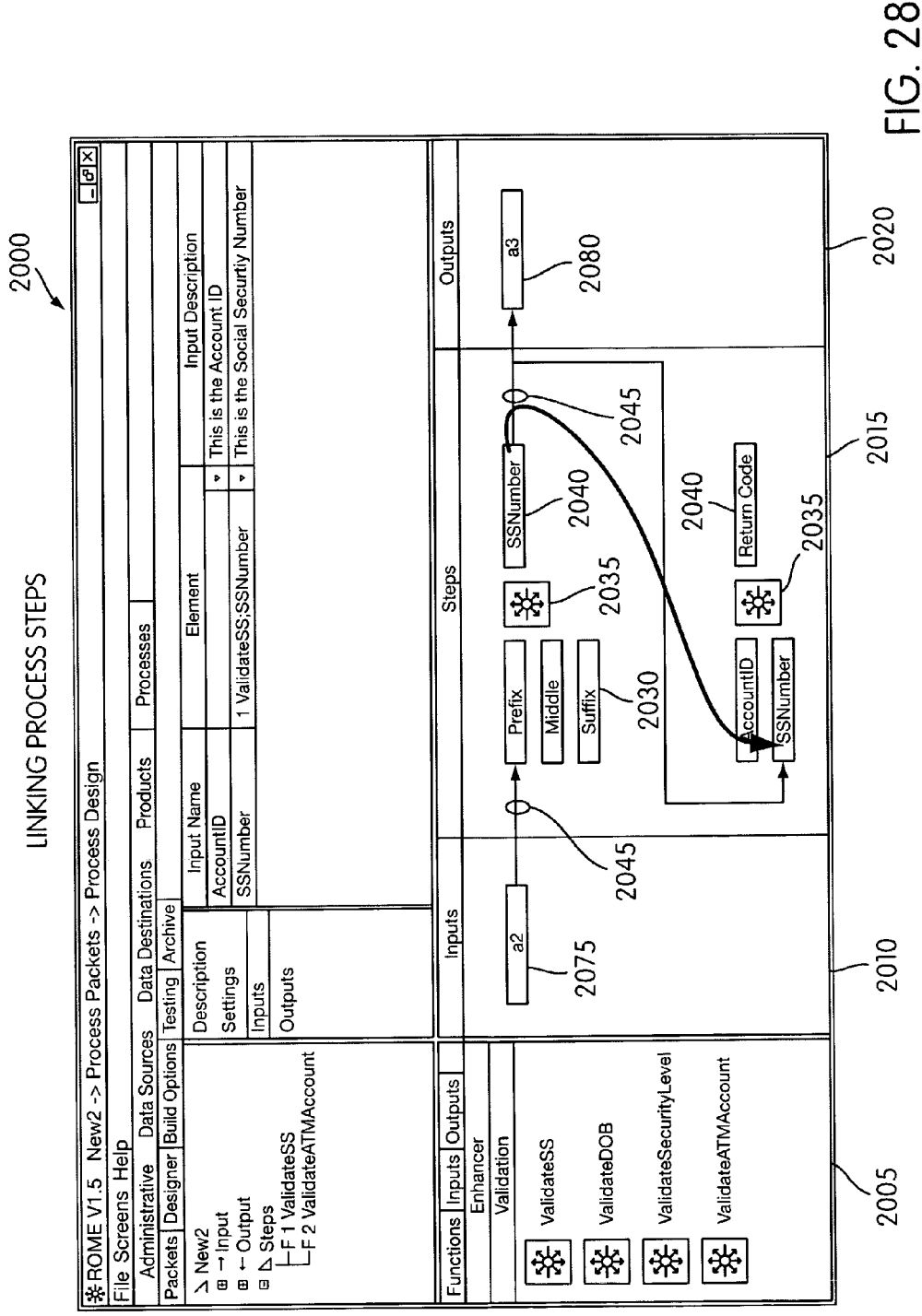
FIG. 28 shows an example interactive page illustrating linking of process steps in the process definition area of a process designer interactive page in an embodiment of the invention.

In at least one embodiment, a user of the enterprise business process management system 100 may interact with the process designer interactive display 2000 to create and modify process steps 2025 which make up a business process. In particular, the user may manipulate, move and link the display icons or symbols representing function inputs 2030, function outputs 2040, function identifiers 2035, input elements 2075, output elements 2080 and links 2045 using, for example, a pointing device of terminals 110–113. Alternatively, a keyboard device may be used for this purpose. For example, a new function input 2030 may be added to a process step 2025 by dragging and dropping (e.g., selecting) the new function input 2030 from the function library 2005 to the desired process step 2025 of the process step definition area 2015. FIG. 27 shows an example interactive page of the process designer 2000 illustrating adding an element of a process step 2025 from the function library 2005 in an embodiment. If the new function input 2030 requires an input element 2075, then the user may, for example, drag and drop the desired input element 2075 from the function library 2005 to the input area 2010 and add a link 2045 from the new input element 2075 to the new function input 2030. FIG. 28 shows an example interactive page of the process designer 2000 illustrating linking of process steps 2025 in the process definition area of a process designer interactive page in an embodiment.

In an embodiment, a function input 2030 may include a conditional statement to specify alternative actions to be taken upon the occurrence (or not) of a specified event. FIG. 29 shows an example interactive page portion 2900 by which a conditional statement may be defined for an element of a process step according to at least one embodiment.

FIG. 30 shows an example of a products definition interactive page 3000 provided in an embodiment similar to FIG. 17. FIG. 31 shows an example of a data destination definition interactive page 3100 provided in an embodiment similar to FIG. 18. FIG. 32 shows an example of a products selection interactive page 3200 provided in an embodiment similar to FIG. 16.

In at least one embodiment, the enterprise business process management system 100 may retrieve, build and compile from a data store such as, for example, the data store 106, a sequence of instructions implementing the business process defined by the interface module process designer. In an embodiment, the interface module 304 of the enterprise business process server 101 may obtain a sequence of instructions implementing one or more business processes defined using, for example, the interface module, from the data store 106 for execution by the enterprise business process server 101.

Figure 21:
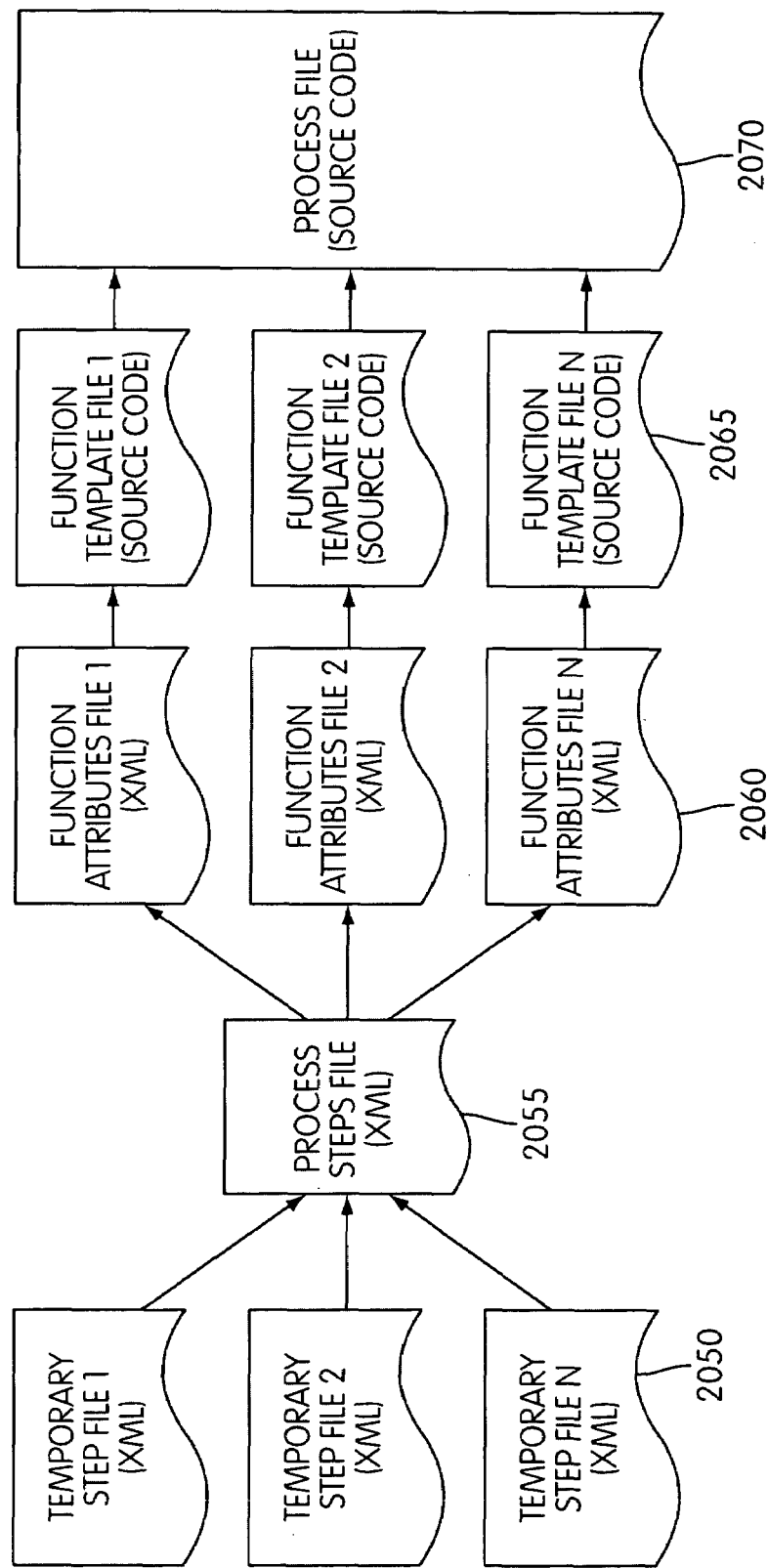
FIG. 21 shows a series of build files utilized in an embodiment of the invention by the enterprise business process server to build a code implementation of a business process.

In at least one embodiment, the interface module 304 may assemble (i.e., build) a sequence of instructions implementing the interface module process designer defined process steps 2025 in a series of build steps utilizing a number of build files. FIG. 21 shows a series of build files utilized in an embodiment by the enterprise business process server to build a code implementation of a business process. Referring to FIG. 21, a set of build files for a business process may, in an embodiment, include at least one temporary step build file(s) 2050, a process steps file 2055, one or more function attributes file(s) 2060, one or more associated function temporary files(s) 2065, and a process file 2070. The enterprise business process management system 100 may use these files in an embodiment to implement a business process defined by a business analyst, for example, using the interface module process designer in the following manner.

In an embodiment, all functions that have been added to the enterprise business process management system may appear in the function library 2005 (FIG. 20). Each function may be identified in the function library 2005 by a function name and an icon, for example. The function attributes file 2060 may contain all of the necessary information, in XML format, for example, so that when this function is added as a step in a process the function will be displayed on the interface module process designer 2000 with the correct number of function inputs 2030, function outputs 2040, and will have the associated settings defined by the content parameters of data fields used by or produced by the function. In an embodiment, every function in the enterprise business process management system 100 has its own function attributes file 2060. Function step 2025 shows an example of a function as is appears using the interface module process designer 2000 when added as a step to a business process. When a function is added to the business process, the interface module 304 first reads the function attributes file 2060 for that function. After reading the function attributes file 2060, the interface module 304 builds the necessary input and output elements for that function as they are defined in the function attributes file 2060.

Figure 33:
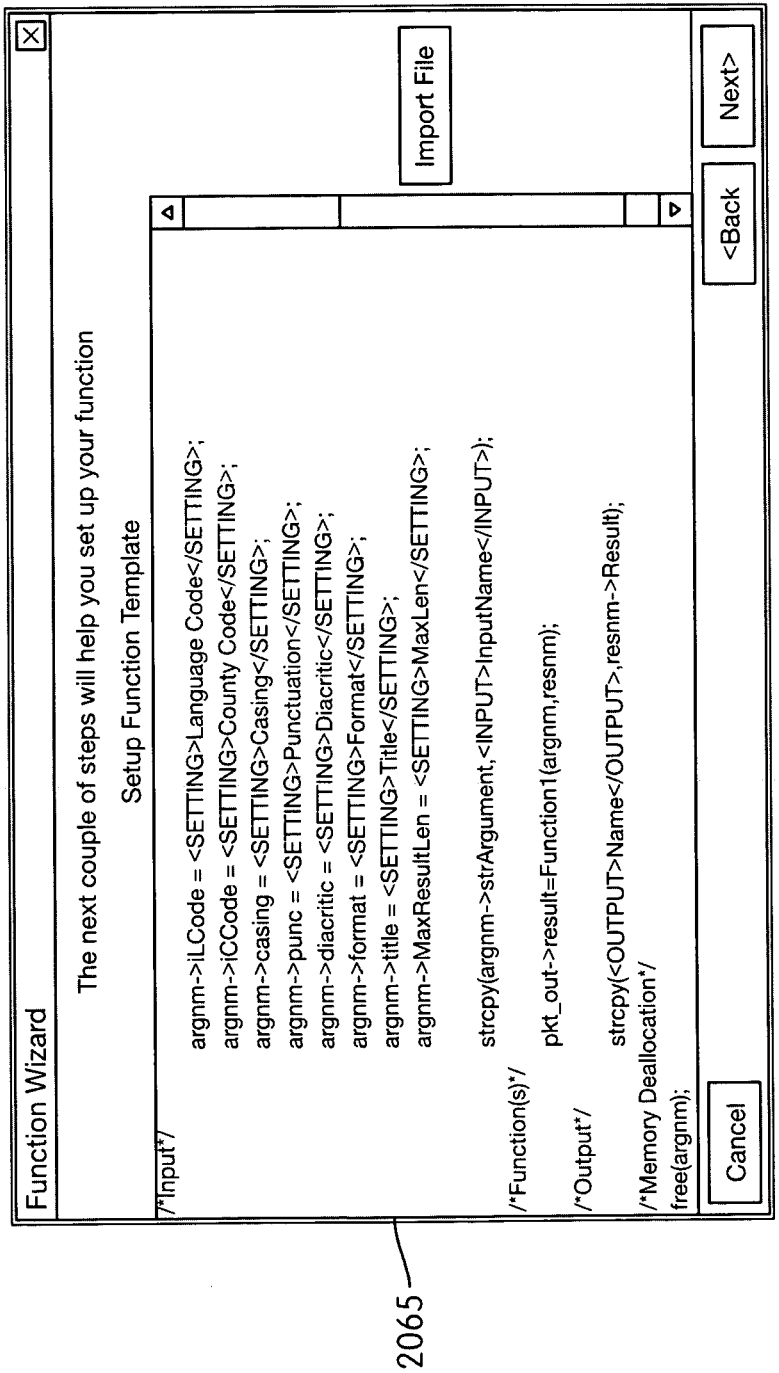
FIG. 33 shows an example of the content of a function template file page provided in an embodiment of the invention.

In an embodiment, the interface module 304 may include a function wizard that provides a sequence of interactive pages to the user operable to assist the user in importing a pre-built function into the library or modifying an existing function. The function wizard may include interactive fields of one or more interactive pages in which a user may enter a function name, choose a function icon, enter an associated product name, enter a function type, and add a function description. The function wizard may provide a function template in response to the user entered information. Function templates may be maintained using, for example, the function template files 2065. The function template may include a sequence of instructions that define various aspects of the function (e.g., variables). The actual values for each function variable may be determined by a function setting that corresponds to each function variable. FIG. 33 shows an example of the content of a function template file page 3300 provided in an embodiment.

After the function has been added to the business process, a temporary step file 2050 may be created. In an embodiment, the temporary step file 2050 may be provided in XML format. The temporary step file 2050 may contain all of the information about the function as it pertains to this step in the business process. It is important to note that the temporary steps file may be different for every step, even if it is from the same function.

Furthermore, as illustrated in FIG. 21, the interface module 304 may create the process steps file 2055 when the business process is to be built. In an embodiment, the process steps file 2055 may be the joined group of temporary step file(s) 2050 associated with this business process.

Finally, the interface module 304 may create the process instruction set file 2070 as follows. First, the interface module 304 may read the process steps file 2055. Since each step in may correspond to a function in the function library, the interface module may retrieve the function attributes file 2060 for each step in the process steps file 2055, and then map the data in the process steps file 2055 to the corresponding fields in the function attributes file 2060. Next, after the information from the process steps file 2055 has been linked to corresponding fields in the function attributes file 2055, the interface module 304 may then map each function attributes file 2060 to a function template file 2065. The function template file 2065 may, in an embodiment, contain source code instructions (e.g., 'C' source code) to be added to the sequence of instructions implementing the process. Furthermore, in at least one embodiment, the function template file 2065 may include XML tags that correspond to fields in the associated function attributes file 2060. As the function template file source code is being added to the source code in the process instruction set file 2070, the interface module 304 may replace the XML tags in the function template file 2065 with the data that was provided in the function attributes file 2060 which was in turn the data that was provided from the process steps file 2055.

Figure 22:
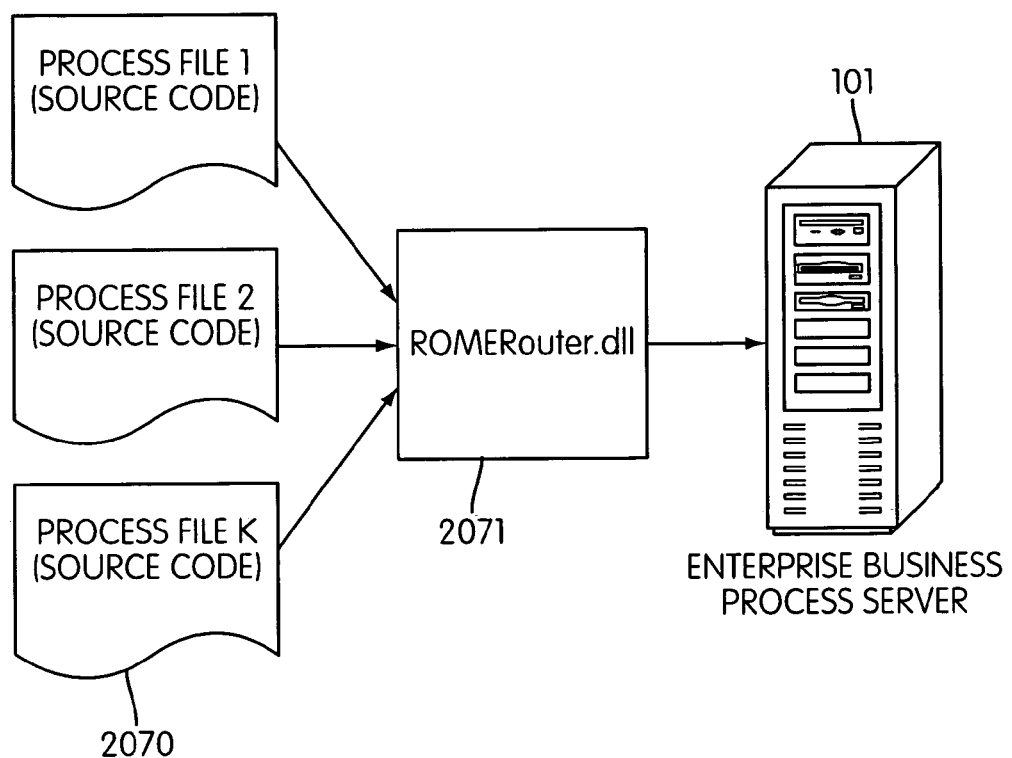
FIG. 22 illustrates a method of building a new router dynamic link library in an embodiment of the invention.

In an embodiment, following build of a new process instruction set file 2070, the enterprise data quality application 300 may build a new router DLL including the new process source code file 2070 as shown in FIG. 22. In at least one embodiment, the instruction set file 2070 may include source code instructions. Referring to FIG. 22, the enterprise data quality application 300 may build a new router DLL 2071 including the new process instruction set file 2070 (e.g, Process File 1) along with other process instruction set files (e.g., Process Files 2-K). The new router DLL 2071 may then be loaded by the enterprise business process server 101 and placed into service, at which point the new process may be executed.

FIGS. 23*a–d* provide a flow chart illustrating more particularly a method of implementing a business process in accordance with at least one embodiment. Referring to FIG. 23, a method may commence at 2300 and proceed to 2302. At 2302, a user may send a request to the enterprise business process server 101 to create or modify a business process. In an embodiment, the user request may be output by the terminal 110, 111, 112 or 113 to the enterprise business process server 101 using a network such as, for example, a packet-based network. An example of a packet-based network is the Internet. The user may be a business analyst, for example. In an embodiment, the request may be provided as an XML-formatted request. In response, the enterprise business process server 101 may output to the requesting terminal 110, 111, 112 or 113 an interactive page such as, for example, the interface module process designer interactive display 2000. In an embodiment, the interface module process designer interactive display 2000 may be provided in the form of an XML-formatted interactive page suitable for display at the terminal using a web browser application of the terminal.

Control may then proceed to 2304, at which the user may desire to add a process step to or modify a process step of the business process (reference FIG. 20). Control may then proceed to 2306, at which the user may determine that a function to be added to a process step, or for which a new process step is to be added, may need to be added to the function library. If so control may proceed to 2308. If not, control may proceed to 2312.

At 2308, the user may enter information defining a new function into the function library. Such information may include, but is not limited to, a function name and a function icon. The function name may provide a brief description of the operation provided by the function. The function icon may be a symbol representing the vendor or provider of the application from which the function is taken. In an embodiment, all functions used in process steps must be included in the function library.

Figure 34:
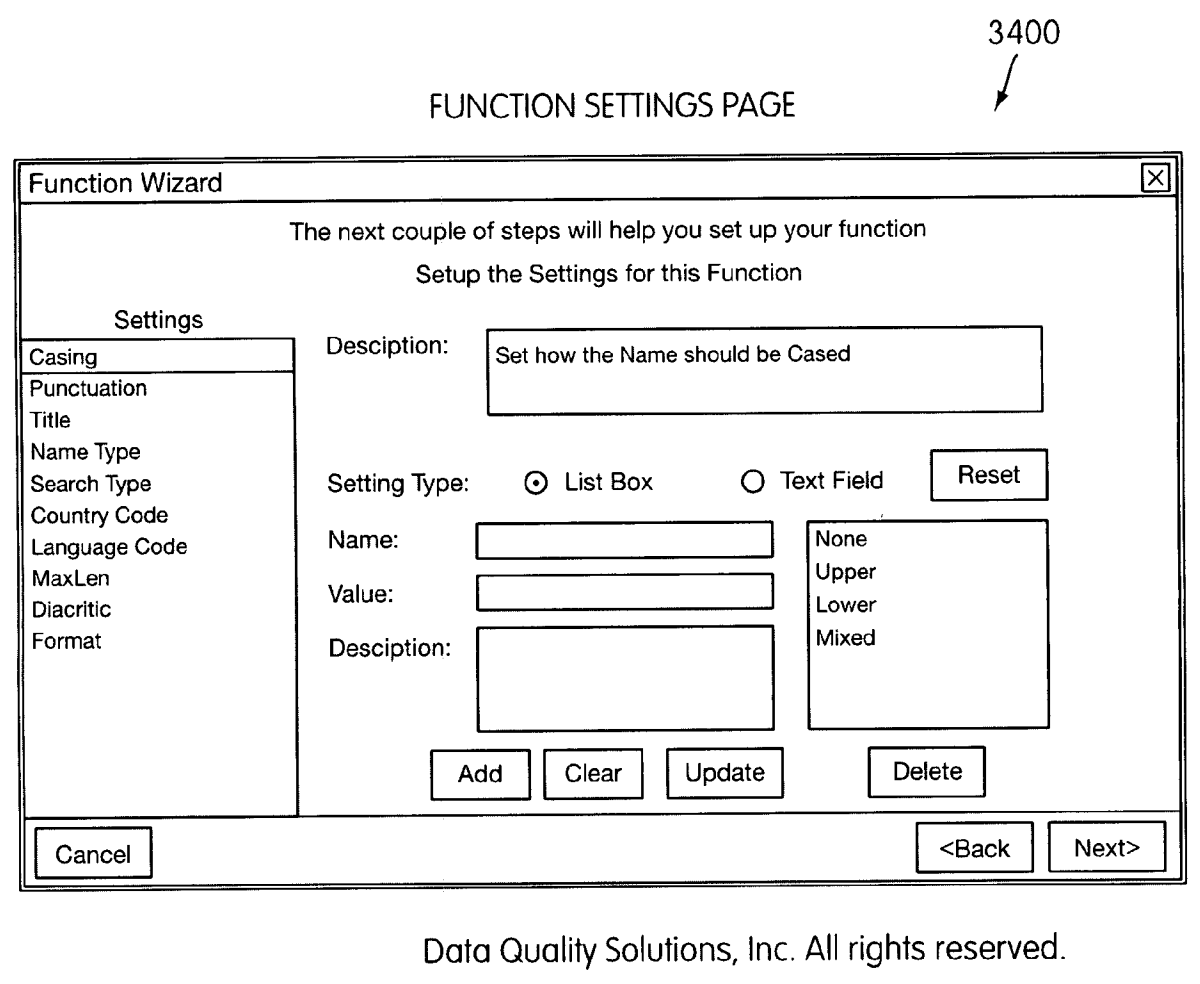

Control may then proceed to 2310, at which the user may define particular function attributes using the function attributes file. The function attributes file may include all information necessary to define a function information, in XML format, so that when this function is added as a step in a business process the function will be displayed on the interface module process designer with the correct number of function inputs and function outputs, as well as its associated function settings. In an embodiment, the function attributes file may be provided in accordance with the XML format. Also in an embodiment, every function in the function library may have an corresponding function attributes file. FIG. 34 shows an example of a function settings interactive page 3400 provided in an embodiment.

Control may then proceed to 2312, at which a temporary step file may be created as follows. When a function is added to the business process, the interface module may first read the function attributes file for that function. After reading the function attributes file, the interface module may build the necessary input and output elements for that function as they are defined in the function attributes file. In an embodiment, the temporary step file may be provided in XML format. The temporary step file may contain all of the information about the function as it pertains to this step in the business process. It is important to note that the temporary steps file may be different for every step, even if it is from the same function.

Control may then proceed to 2314, at which the interface module may create the process steps file. In an embodiment, the process steps file may be the joined or assembled group of temporary step file(s) associated with this business process.

Control may then proceed to 2316, at which the interface module may retrieve the function attributes file for each step in the process steps file. Control may then proceed to 2318, at which the interface module may map the data in the process steps file to the corresponding fields in the function attributes file. Control may then proceed to 2320, at which the interface module may map each function attributes file to a function template file. The function template file may, in an embodiment, contain source code instructions (e.g., 'C' source code) to be added to the sequence of instructions implementing the process. Furthermore, in at least one embodiment, the function template file may include XML tags that correspond to fields in the associated function attributes file.

Control may then proceed to 2322, at which the interface module may replace the XML tags in the function template file with the data that was provided in the function attributes file, which was in turn the data that was provided from the process steps file.

Control may then proceed to 2324, at which the interface module may assemble the data-populated function template files into a process instruction set file containing a sequence of program instructions implementing the process. Control may then proceed to 2326, at which the interface module may store the process instruction set file in a data store. The instruction set file may be, but is not limited to, a source code file.

Control may then proceed to 2328, at which the enterprise data quality application core application may determine if the user has specified the business process to be a test process or a production process. In an embodiment, the business analyst module 304 may provide an interactive page (not shown) for the user to specify whether a test build or a production build of the router is to be performed. If a test process, control may proceed to 2330 at FIG. 23*c*. If a production process, control may proceed to 2350 at FIG. 23*d*.

Figure 23A:
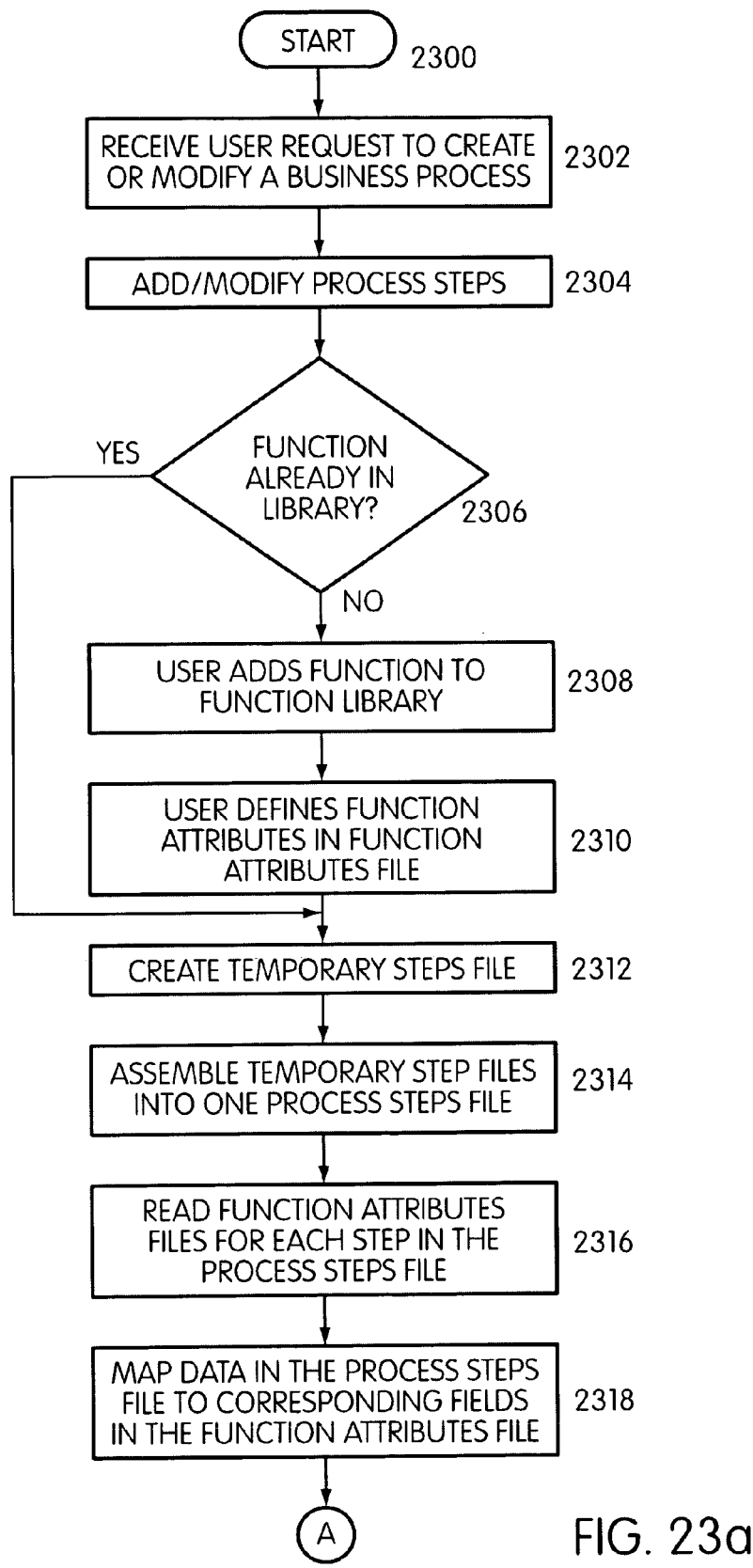
FIGS. 23*a–d* are a flow chart illustrating a method of implementing a business process in accordance with at least one embodiment of the invention.
Figure 23B:
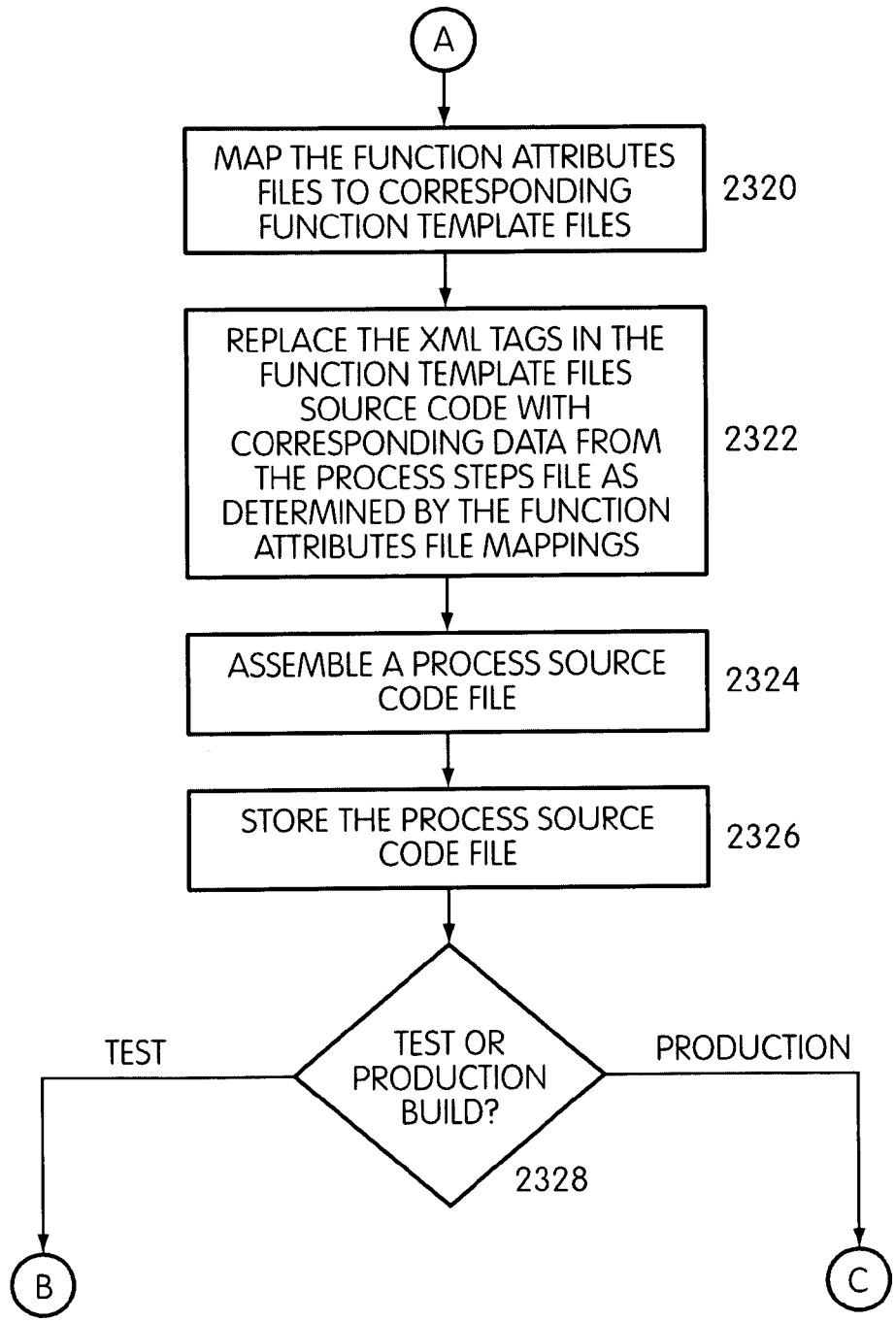
Figure 23C:
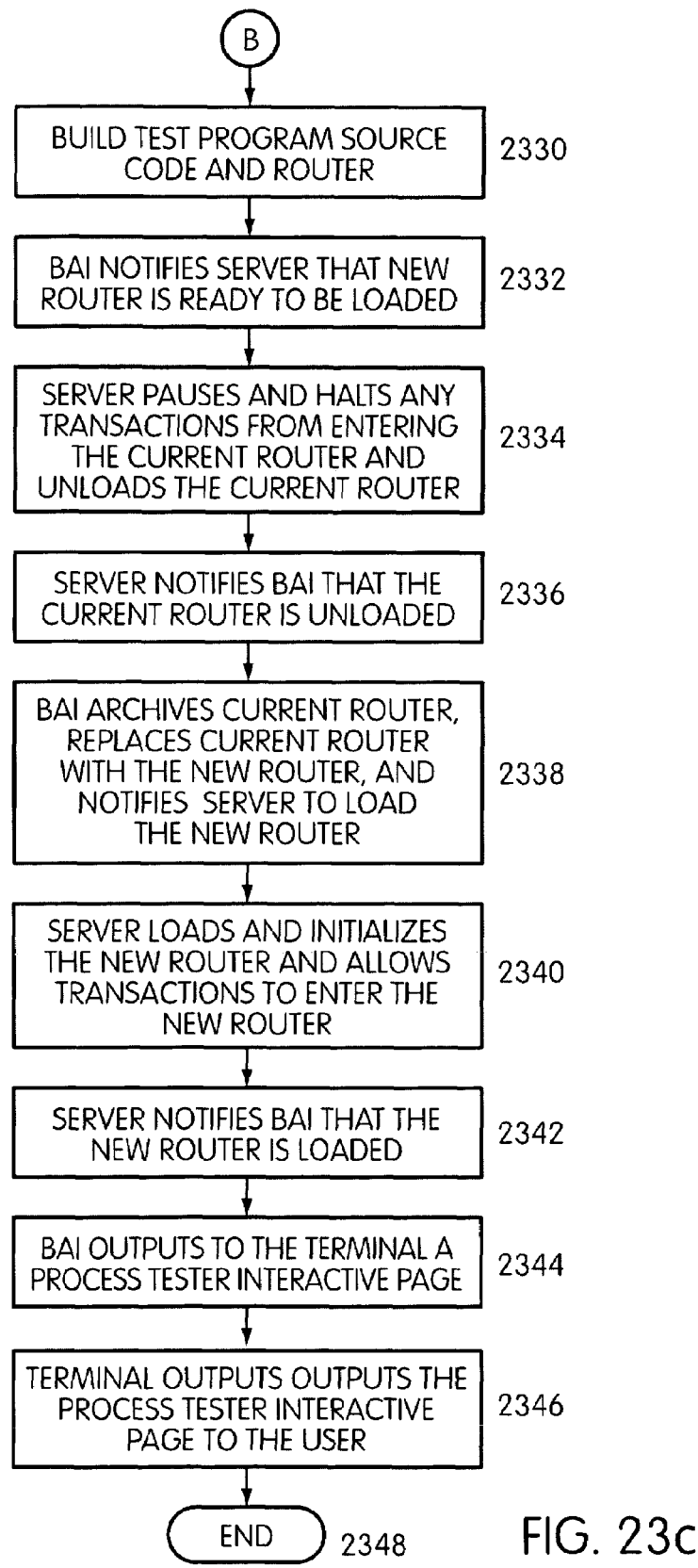

At 2330 of FIG. 23*c*, at which following the build of a new test process instruction set file, the enterprise data quality application core application may build a new router DLL including the new test process instruction set file (see FIG. 22). The test process instruction set may be optimized for production.

Control may then proceed to 2332, at which the interface module may notify the enterprise business process server that a new router is ready to be loaded. Control may then proceed to 2334, at which the enterprise business process server may pause and halt any transactions from entering the current router, allow all transactions currently in the router to finish processing, and unload the current router.

Control may then proceed to 2336, at which the enterprise business process server may notify the interface module that the current router has been unloaded.

Control may then proceed to 2338, at which, upon receiving notification that the current router has been unloaded, the interface module may archive the current (i.e., "old") router, replace it with the newly built router, and notify the enterprise business process server to load the new router.

Control may then proceed to 2340, at which the enterprise business process server may load and initialize the new router and allow transactions to enter the new router.

Control may then proceed to 2342, at which the enterprise business process server may notify the interface module that the new router has been loaded.

Figure 35:
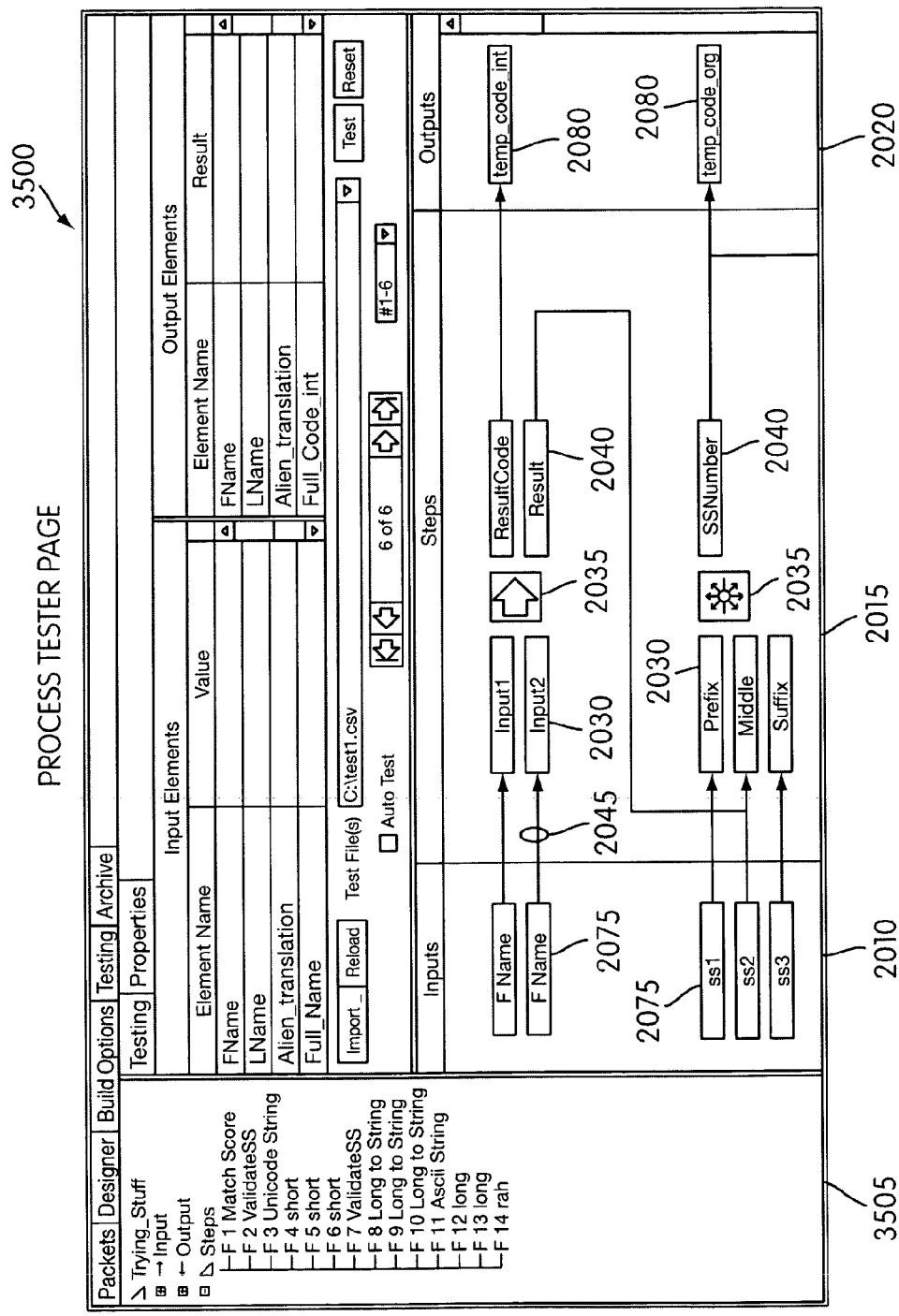
FIG. 35 shows an example process tester interactive page according to an embodiment of the invention.

Control may then proceed to 2344, at which, upon receiving notification that the new router has been loaded, the interface module may output to the terminal of the user a process tester interactive page. FIG. 35 shows an example process tester interactive page 3500 according to an embodiment. A process tester interactive page 3500 may include a process test steps listing 3505.

Figure 36:
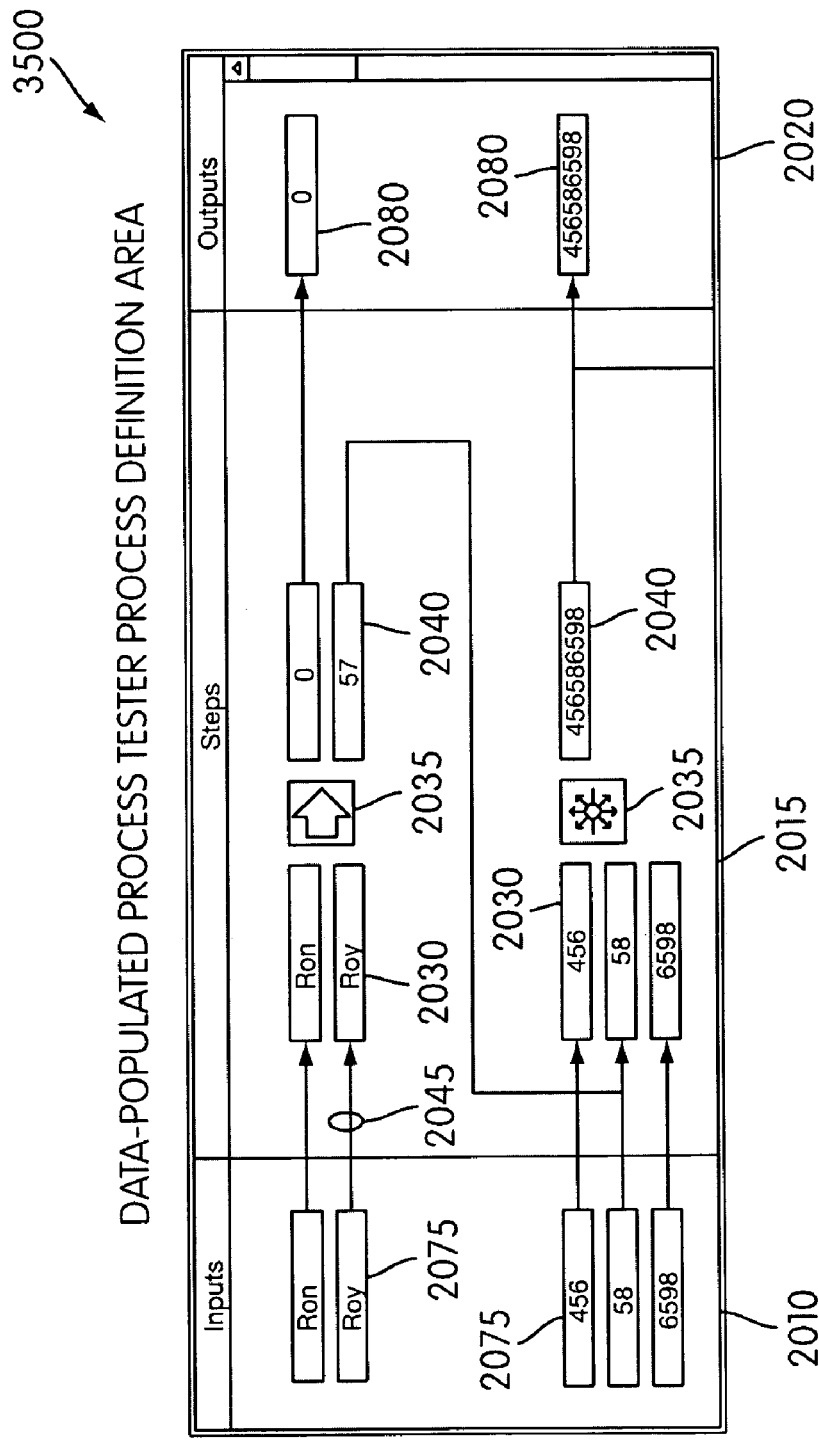
FIG. 36 shows an illustration of a data-populated design area of a process tester interactive page in an embodiment of the invention.

Control may then proceed to 2346, at which the terminal may output the process tester interactive page to the user via, for example, a display of a web browser application. FIG. 36 shows an illustration of a data-populated process definition area of a process tester interactive page 3500 in an embodiment in which the interface module has replaced the XML tags in the function template file with the data that was provided in the function attributes file.

Control may then proceed to 2348, at which a method may end.

Figure 23D:
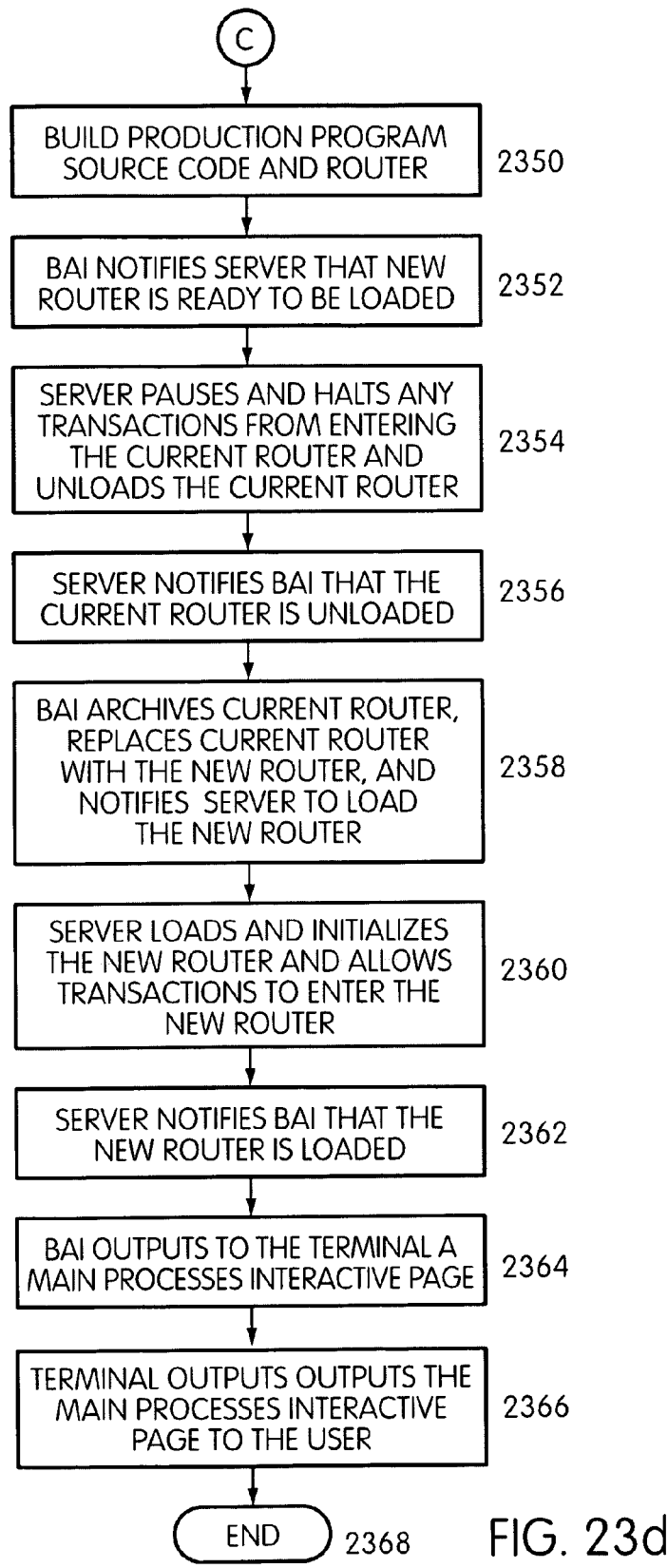

At 2350 of FIG. 23d, at which following the build of a new production process instruction set file, the enterprise data quality application core application may build a new router DLL including the new production process instruction set file (see FIG. 22). The production process instruction set may be optimized for production.

Control may then proceed to 2352, at which the interface module may notify the enterprise business process server that a new router is ready to be loaded. Control may then proceed to 2354, at which the enterprise business process server may pause and halt any transactions from entering the current router, allow all transactions currently in the router to finish processing, and unload the current router.

Control may then proceed to 2356, at which the enterprise business process server may notify the interface module that the current router has been unloaded.

Control may then proceed to 2358, at which, upon receiving notification that the current router has been unloaded, the interface module may archive the current (i.e., "old") router, replace it with the newly built router, and notify the enterprise business process server to load the new router.

Control may then proceed to 2360, at which the enterprise business process server may load and initialize the new router and allow transactions to enter the new router.

Control may then proceed to 2362, at which the enterprise business process server may notify the interface module that the current router has been unloaded.

Control may then proceed to 2364, at which, upon receiving notification that the new router has been loaded, the interface module may output to the terminal of the user a main processes interactive page.

Control may then proceed to 2366, at which the terminal may output the main processes interactive page to the user via, for example, a display of a web browser application.

Control may then proceed to 2368, at which a method may end.

In at least one embodiment, the enterprise business process server 101 may retrieve and execute a particular business process upon receiving a packet of input elements associated with that business process from a data source via a connection. In at least one embodiment, such a connection may be a compiled dynamic link library (DLL) file that maps the business application function input data and output data to corresponding information fields of functions of an associated business process. FIG. 37 shows an example of a connection definition interactive page 3700 by which a user may define a connection according to at least one embodiment. Each enterprise application may have a corresponding connection maintained using the data store 106, for example, that maps its functions to one or more business processes executed by the enterprise business process server 101. Upon receiving an associated packet of input elements, the enterprise business process server 101 may retrieve and execute the associated business process and produce its resultant output elements. In an embodiment, the enterprise business process server 101 may send a packet containing the output elements to a data destination via the connection for further processing. A connection may encapsulate data routing information specifying the path between to enterprise nodes. In an embodiment, the connection may be a socket connection for a packet-based network such as, for example, TCP/IP.

Thus, an interface module may provide the capability for a user, such as a business analyst for example, to define, create, modify, implement, test and execute a business process using the enterprise business process management system without having to undertake a lengthy requirements definition, general design, detailed design, coding and testing cycle involving software engineering or programming personnel. The interface module of the enterprise business process management system as shown herein allows rapid iterative development and implementation of business processes, reducing development costs and time, as well as reducing the need to periodically freeze functional requirements.

Thus, an enterprise business process management system has been described, embodiments of which may provide an integrated data quality management system capable of collecting, analyzing, and reporting information concerning qualitative and quantitative aspects of application or transactional data throughout an enterprise. It should be understood that the enterprise data quality management system described herein is but one aspect of the enterprise business process management system of the present invention. One skilled in the art would be capable of determining other embodiments of the present invention based on the disclosure herein. In particular, the enterprise business process server 101 may be more generally described as a server capable of providing or operating in conjunction with many different enterprise business process applications. In general, such an enterprise business process management system may provide the capability to collect, analyze, and report information concerning qualitative and quantitative aspects of application or transactional data throughout an enterprise across some or all of the computing nodes of the entire enterprise network, and is able to process application data output by heterogeneous computing platforms and applications. As a result, the enterprise business process management system may provide a variety of integrated views of data present throughout the enterprise. Such views may range from data associated with the total enterprise, to individual divisions or business functions/business units, down to individuals.

For example, an embodiment of the enterprise business process management system may be directed to biometric and homeland security applications such as, but not limited to, defining, building and executing business processes that include functions from business applications involving fingerprint analysis, retinal imaging/scanning, voice identification, and image matching and comparison. In a particular example of such a business process, an employee of a company may be required to pass a fingerprint identification scan in order to enter a company facility. When the employee places their fingerprint on a fingerprint pad or scanner, data representing the unique fingerprint scan may be sent to a process maintained by the enterprise business process management system. This process may include, for example, comparing the scanned fingerprint data to a set of valid fingerprints using one or more functions from different fingerprint software matching tools that attempt to validate the employee against the company employee fingerprint database. If the employee is validated as an employee then a signal may be sent from the enterprise business process management system to an access control device of the door so that the door will unlock and allow the employee ingress access.

In another example of such a business process, photographic imaging data may be input to a multiple step business process that attempts to match the photographic imaging data against multiple image databases to search for matching features. If a match is found, then a signal may be sent to another process maintained by the enterprise business process management system to output the image coordinates to a targeting or reporting system.

In another example, an embodiment of the enterprise business process management system may be directed to compliance assurance such as, for example, business compliance with applicable governmental regulations. Such applications are myriad. One example in particular may be a business process directed to ensuring that a healthcare enterprise operates in conformance with government mandated rules and regulations such as, for example, the Health Insurance Portability and Accountability Act of 1996 ("HIPAA"). In a particular example of such a business process, business rules applying HIPAA requirements may be maintained in the function library, and a business process defined and executed that includes a series of business rules that must be applied to particular patient information based upon government HIPAA requirements. In an embodiment, this process may be a multiple step process with each step representing a different HIPAA requirement. This arrangement may provide for easy modification of such rules based upon changing government requirements. In other words, after the roads to the business applications for HIPAA compliance have been established, the corresponding functions used to represent the requirements as process steps may be modified as described herein using, for example, the interface module process designer. In this way, new changes to regulations affecting a business may be accommodated with minimal impact to the business process.

As another example, an embodiment of the enterprise business process management system may be directed to ensuring that government data quality regulations are met for a data set. For example, data concerning child welfare provided to the federal government may be required to comply to a specified data accuracy, such as greater than 90% accuracy.

As another example, an embodiment of the enterprise business process management system may be directed to tax assignment applications such as, but not limited to, defining, building and executing business processes that include functions from business applications involving geographic coding software and tax assignment software. In a particular example of such a business process, an organization may need to correctly assign the appropriate tax to their client's bills during the billing process. Incorrect tax assignment during the billing process may result in lost customers. Therefore, in an embodiment, a business process may be created and executed (or, alternatively, a sequence of process steps in a billing process) in which customer information, such as address information, is checked for accuracy by multiple functions from different tax assignment business applications (e.g., software packages) prior to final processing and mailing of bills to customers. The results of the functions may then, for example, be compared against each other and based on those results a correct tax could then be assigned. Furthermore, after the correct tax is determined, the correct tax assignment and the customer identifier may be sent as input into another business process which may, for example, receive as input a tax assignment and a customer identifier, and then perform multiple steps in which each step would perform an SQL query against different databases. In an embodiment, each step may perform a data store lookup of the customer via the customer identifier and then update that customer's tax assignment so that the customer has the same tax assignment across multiple data stores.

Figure 38:
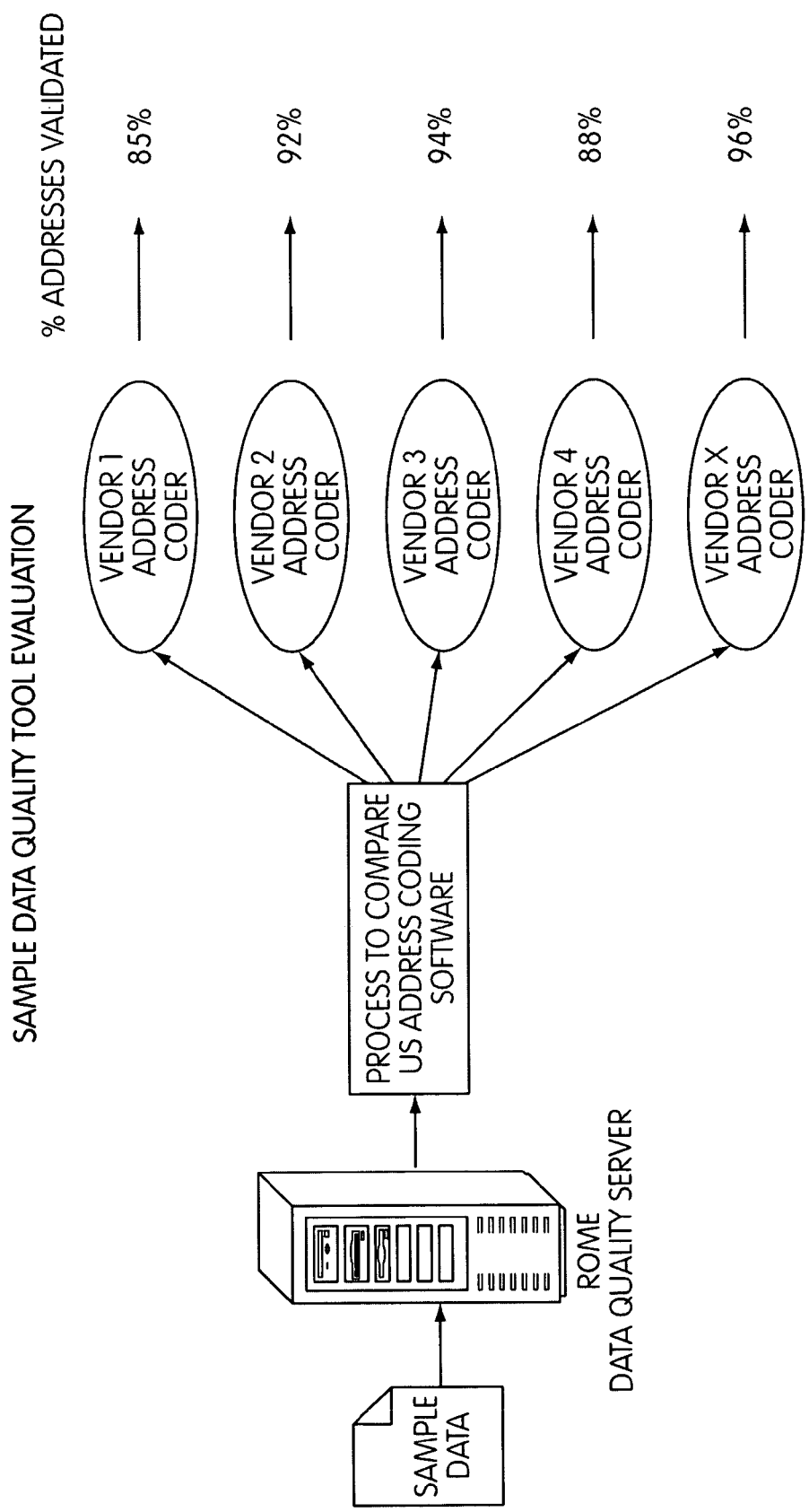
FIG. 38 illustrates a comparison business process in accordance with an embodiment of the invention.

As another example, an embodiment of the enterprise business process management system may be directed to product comparison applications such as, but not limited to, defining, building and executing business processes that include functions from business applications involving address validation. In a particular example of such a business process, a business process may be created and executed which receives as input an individual's address, and then performs a multiple step process. In an embodiment, each step in the business process may include, for example, a different software vendor's address coder. Each step may attempt to receive as input the address and then validate that address against its own postal database. In an embodiment, a comparison of each vendors capabilities may then be performed and statistics could be created to see exactly which product performs the best under certain data conditions. FIG. 38 illustrates the comparison business process in accordance with an embodiment.

More generally, if an organization is trying to decide which software application or vendor provides the best functionality, then those products may be integrated under the enterprise business process management system and comparatively tested. Furthermore, any business process that compares different software vendors API calls can be included in such a process.

As another example, an embodiment of the enterprise business process management system may be directed to data mapping or transformation applications such as, but not limited to, defining, building and executing business processes that include functions from business applications involving data store transformation software. In a particular example of such a business process, a business process could be created and executed in which there the input data is received in a first format associated with one data store (e.g., first database) and the output data is provided in another data store (e.g., second database) format. In an embodiment, each process step may be a mapping from one field type to another, for example.

Finally, as another example, an embodiment of the enterprise business process management system may be directed to software-based mapping applications such as, but not limited to, defining, building and executing business processes that include functions from business applications involving information matching and database retrieval software. In a particular example of such a business process, a business process may include information matching and data store lookups for information related to call center operations. In particular, a call center operator may take a call from a customer in which the customer provides the call center operator name and address information. The call center operator may input the information using, for example, and interactive page, and then initiate a search request. The search request may cause the name and address information to be sent to a business process maintained by the enterprise business process management system that may perform, for example, the following steps:

a. Standardize the Name and Address Data
   b. Create a Match Key
   c. Perform a series of database lookups using the match Key created in step b
   d. Each database lookup would return back some information that would be used to build a temporary record
   e. After all of the database lookups have been performed the Output would be sent back the Call Center Reps screen.

Users of the enterprise business process management system, including management and executive users, may be provided different levels of visibility into enterprise-level issues such as, but not limited to, data quality issues, so that appropriate corrective action may be taken. In at least one embodiment, the enterprise business process management system may automatically make corrections to incorrect or errored data based on a trusted source of data. Because of the integrated view provided by the enterprise business process management system of the present invention, the shortcomings of vendor-specific approaches such as, for example, application-specific data checking processes, are minimized. In addition, total acquisition costs for data quality tools, for example, may be minimized for the enterprise through use of the integrated approach described herein, because the need to acquire and maintain many individual independent data quality applications is reduced.

Furthermore, in at least one embodiment, the business process server may be further configured to select and execute a set of preferred functions, wherein each preferred function is obtained from one of multiple different business applications. The business process server may select one function from among multiple similar functions provided by business applications based on, for example, a selection heuristic. An example of such a selection heuristic may be the percentage of errors detected by a function in a comparison of multiple similar functions applied to a given set of business application output data. Each of the business applications may or may not be products from different vendors. Alternatively, the function selection criteria may be specified by a user via an interactive page of the interface module. In this way, the enterprise business process management system may select a set of preferred or "best of breed" functions from among those offered by different business applications.

It is also contemplated that a plurality of enterprise business process management systems 100 may be managed by another enterprise business process management system 100. This management system, which is depicted schematically in FIG. 40, will be designated as a global management system 4000 to distinguish it from the business process management system 100 described hereinbefore. It should be understood, however, that the functionality of the global management system 4000 is similar to the functionality of the business process management system 100. In fact, as will be detailed below, the global management system 4000 may be provided with all of the functionality of each of the individual business process management systems 100 to which it is connected. If not provided with all of the functionality of the individual business process management systems 100 to which it is connected, it is contemplated that the global management system 4000 will have at least some of the functionality of each of the individual enterprise business management systems 100 to which it is connected.

Figure 40:
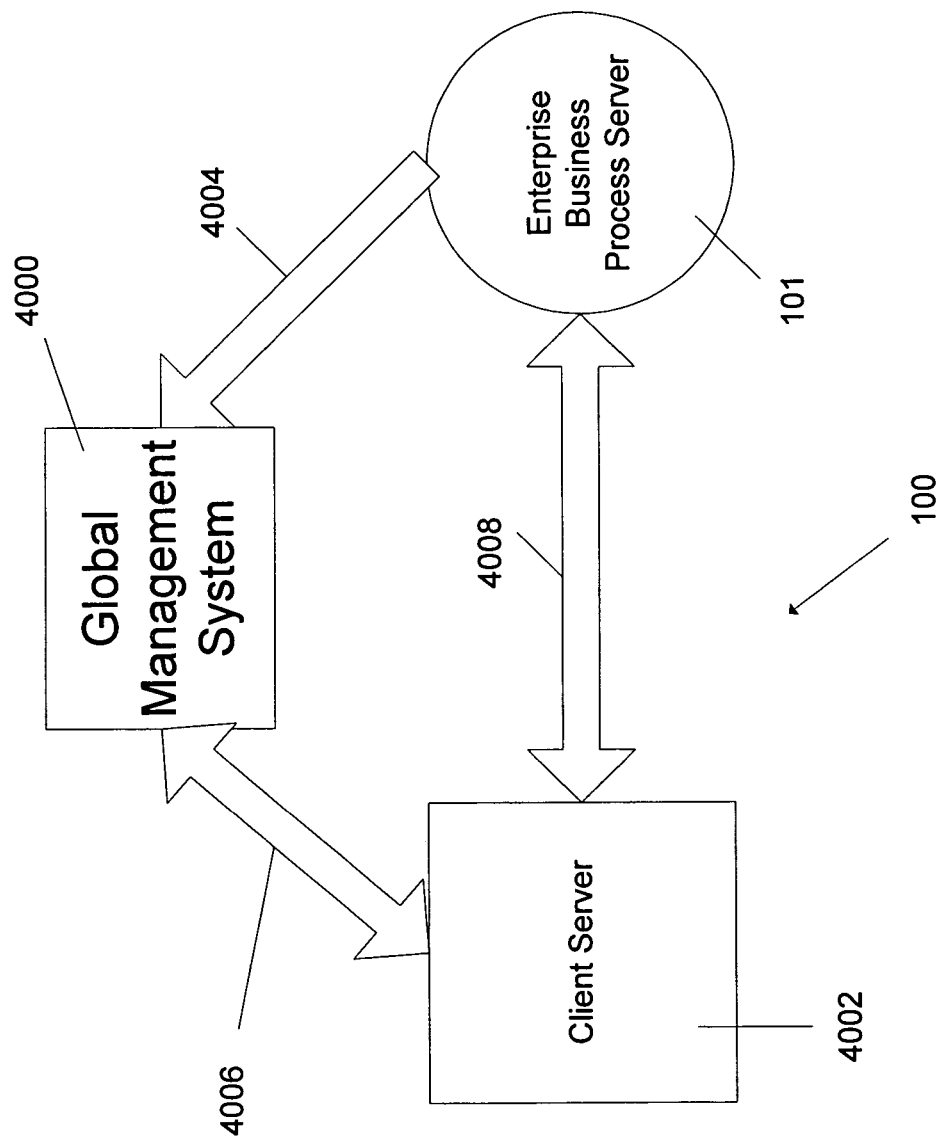
FIG. 40 is a schematic diagram illustrating the connection between a global management system and a local client server and enterprise business process server.

As illustrated in FIG. 40, the global management system 4000 connects to an enterprise business process management system 100 and to a client server 4002. The communicative connections to the client server 4002 and the enterprise business process server 101 may be, for example, via a LAN, WAN, intranet, the Internet, telephone lines, or wireless communication, as would be appreciated by those skilled in the art. As discussed above, the actual manner in which the components communicate with one another is not critical to the operation of the present invention and any type of communication link may be used.

In the schematic diagram provided by FIG. 40, the global management system 4000 is shown connected to a single enterprise business process management system 100. This simplified diagram illustrates the basic interaction between the global management system 4000 and the local business process management system 100. It should be noted, however, that it would be unlikely for a global management system 4000 to be connected to a single enterprise business management system 100, because the two systems would be redundant.

However, the present invention contemplates that one global management system 4000 may be connected to only one enterprise business management system 100. As discussed in greater detail below, it is contemplated that a global management system 4000 may be connected to a single enterprise business process management system 100 for the purpose of protecting the security of the data, executables and applications resident in the local management system 100. Other advantages are also possible through this arrangement, as would be appreciated by those skilled in the art.

For definitional purposes in the discussion that follows, the enterprise business process management system 100 will be referred to as the "local management system" 100. The reason for this is straightforward. It is contemplated that the enterprise business process management system 100 will be installed at a local client location. The local location could be an individual business unit of a company or a department of a local, state, or federal government. It is contemplated that the local management system 100 may be connected to a number of additional servers 102, 103, 104, 105 and/or mainframes 108 as discussed in connection with FIG. 1, for example. Where the enterprise business process management system 100 is resident at a local location, it may be desirable for that local management system 100 to be connected to the global management system 4000, which is expected to be resident at a higher level in the organization.

For example, taking the U.S. Federal Government as an example, it is contemplated that local management systems 100 may be installed in each of the following departments: the United States Patent and Trademark Office, the Department of Commerce, the Federal Aviation Administration, the Federal Communications Commission, the Department of Defense, etc. As may be appreciated by those skilled in the art, the number of possible permutations is considerably large. The local management systems 100 are contemplated to operate in one or more of the manners discussed above.

In the case of the United States Federal Government, there may be an additional need to cross-link each of the local management systems 100 through the global management system 4000 so that functionalities resident in the individual governmental branches may be shared with other branches of government.

This same structure may be overlaid onto a corporate entity. In the corporate context, the local management system 100 may be resident in a corporate division that manufactures a particular product or group of products. Other local systems 100 may also be resident in other corporate subsidiaries that manufacture different products or lines of products. The local management systems 100 may be used in the manner described above. The global management system 4000 may be resident at the head office level, which oversees each of the individual subsidiaries or business units and provide a coordinating function between the local management systems 100.

Referring back to FIG. 40, the enterprise business management server 101 is connected directly to the global management system 4000 via a one-way communications link 4004. As discussed above, and as would be apparent to those skilled in the art, the communications link may be any type of wired or wireless link. The communications link 4004 from the local management server 101 provides information to the global management system 4000. It is contemplated, however, that information from the global management system 4000 will not travel directly back to the local management server 101 via the communications link 4004. Instead, information and instructions from the global management system 4000 are provided to the local management server 101 indirectly through a two-way communications link 4006 to a client server 4002, which is also locally resident in the entity sub-unit. In turn, the client server 4002 communicates, through a two-way communications link 4008 to the local management server 101. With this arrangement, it is possible to protect the operation of the local management system 100 from corruption that may be present in the global management system 400 and vice versa.

Typically, the client server 4002 will be provided with a security system, also known as a "firewall." By connecting the local management server 101 with the global management system 4000 through the client server 4002, the firewall resident on the client server 4002 will protect the communications from the global management system 4000 so that the local management system 100 cannot be infected with viruses, etc., from the global management system 4000. In addition, by communicating through the client server 4002, the individual business processes 2025 and functions 2035 that are resident locally may be protected locally. In one example, by communicating through the client server 4002, the data, executables and applications that are resident on the local management server 100 are kept secure. Similarly protected are the information, executables and applications resident on any of the other servers 102, 103, 104, 105 or mainframes 108 to which the client server 4002 is connected. Moreover, the data located in data stores 106 or flat files 107, which are also connected to the local management server 100 may be protected as well.

Figure 41:
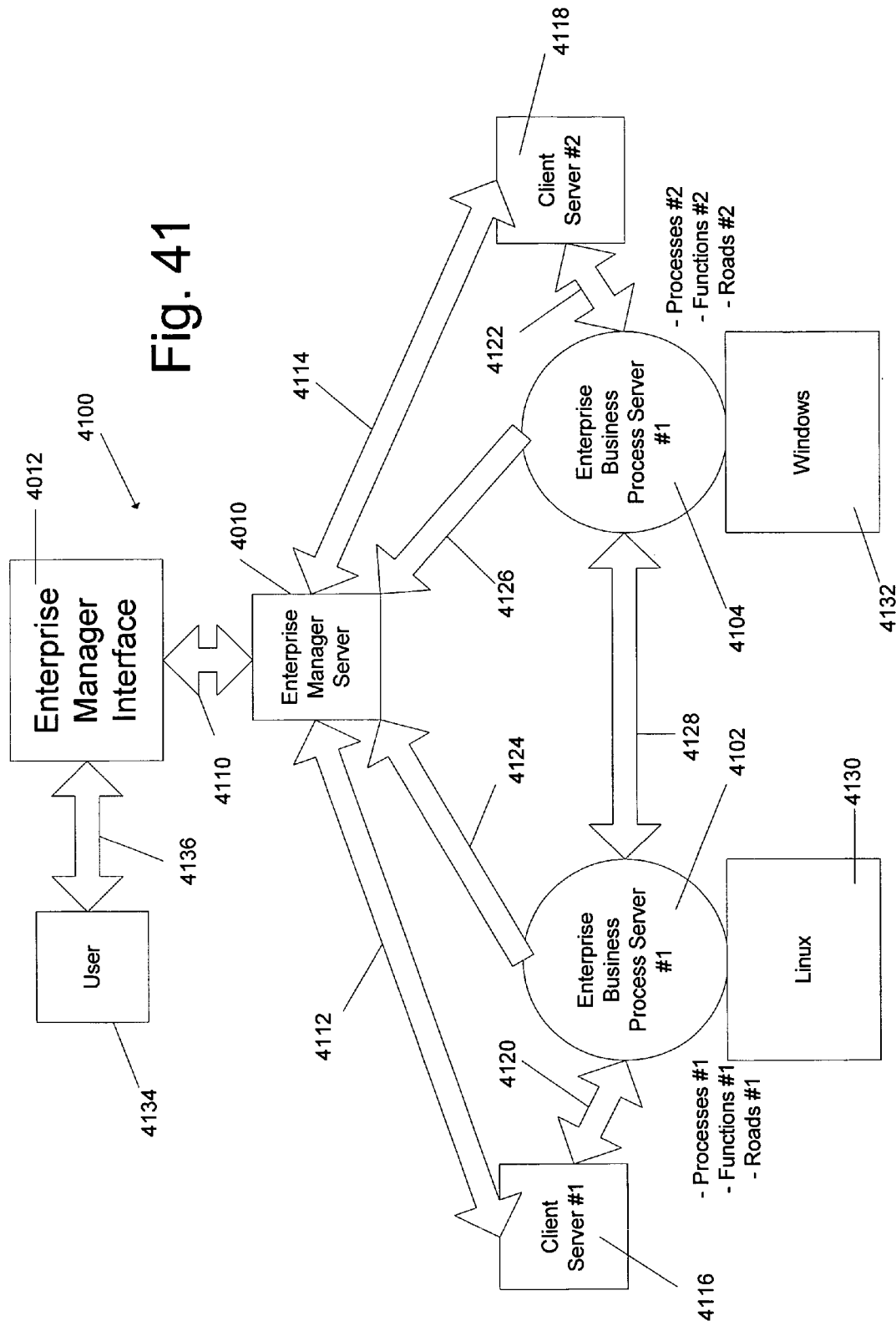
FIG. 41 is a schematic diagram of the connection between a global management system and two local management systems, illustrating the communication links therebetween.

FIG. 41 illustrates the operation of a global management system 4100 when connected to two local management servers, which are labeled 4102 and 4104 for convenience. As indicated above, the global management system 4100 is basically an enterprise business management system 100 that has been connected to a plurality of other enterprise business management systems 4102, 4104, except that the global management system 4100 sends and receives information and instructions to and from the local management systems 4102, 4104 via a client server 4002. The global management system 4100 encompasses an enterprise manager interface 4106 and an enterprise manager server 4108.

As illustrated, the enterprise manager interface 4106 and the enterprise manager server 4108 are connected by a two-way communications link 4110.

The enterprise manager server 4108 is connected via two-way communications links 4112, 4114 the local client servers 4116, 4118. The local client servers 4116, 4118, in turn, interact with the local management servers 4102, 4104 through two-way communications links 4120, 4122. The local management servers 4102, 4104 can send information and instructions to the enterprise manager server 4108 via one-way communications links 4124, 4126. In addition, the local management servers 4102, 4104 can communicate with one another via a two-way communications link 4128. This communications link 4128 permits the local management servers 4102, 4104 to cooperate with one another, at the direction of the global management system 4100, to carry out processes that neither of the local management servers 4102, 4104 could carry out alone.

In the example provided in FIG. 41, the local management server 4102, which is labeled "enterprise business process server #1," is a Linux®-based system 4130. The local management business server 4104, which is labeled "enterprise business process server #2" is a Windows®-based system 4132. Despite the fact that the two systems function with different operating systems, and possibly different hardware, they communicate with one another through the local management servers 4102, 4104 and the global management system 4100 to cooperate as instructed. As also shown in FIG. 41, the two local management servers 4102, 4104 have access to different libraries containing different processes 2025, functions 2035 and links 2045, which have been discussed above.

A user 4134 may access the processes 2025, functions 2035, and links 2045 in each of the local management servers 4102, 4104 via a two-way communications link 4136 to the global management system 4100. However, as discussed above, users may access the local management servers 4102, 4104 as well. When the local management servers 4102, 4104 are connected to the global management system 4100, users at the local level may also access the processes 2025, functions 2035 and links 2045 of other local management servers.

Figure 42:
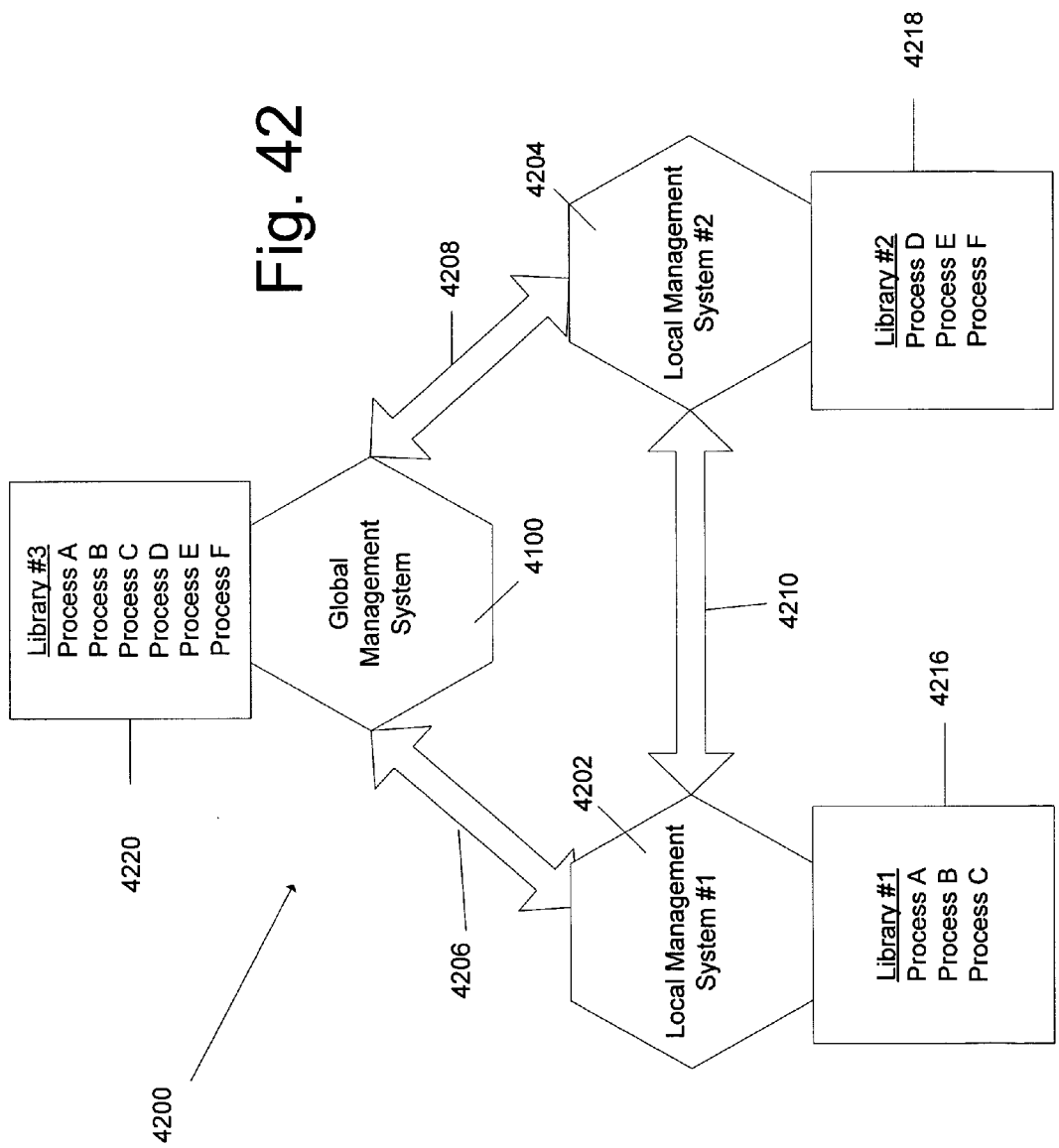
FIG. 42 is a schematic illustration showing the individual libraries within local management servers and the integrated library within the global management server.

FIG. 42 illustrates schematically the global enterprise process management system 4200 that is created when global management system 4100 is connected to two local management systems 4202, 4204. As discussed in connection with FIGS. 40 and 41, the global management system 4100 is connected via a two-way communications link 4206 with the local management system 4202. Similarly, the global management system 4100 is connected to the local management system 4204 via another two-way communications link 4208. The two local management systems 4202, 4204 are connected to one another via a third two-way communications link 4210.

As should be appreciated, FIG. 42 is a simplified schematic of the overall universal management system 4200 that was discussed in connection with FIGS. 40 and 41. The schematic has been simplified to facilitate a discussion of how the three management systems 4100, 4202, 4204 cooperate with one another.

As shown in FIG. 42, the first local management system 4202, labeled "Local Management System #1," has a library 2005 of processes 2025 resident therein. In this simplified example, there are three resident processes 2025: Process A, Process B, and Process C. Similarly, the second local management system 4204, which is labeled "Local Management System #2," has a library 2005 that includes three processes 2025: Process D, Process E, and Process F. For purposes of this example, while the libraries 2005 each include three processes 2025, the libraries 2005 could include a large number of processes 2025, functions 2035, and links or roads 2045.

As discussed above, in one embodiment of the invention, a user interacting with the first local management system 4202, wanting to design a business process combining individual processes A and B, interacts with the process designer interactive display 2000 to create and modify process steps 2025 which make up a business process. The process interactive display 2000 permits the user to design the business process via drop and drag functionality. The interface module 304 then assembles (or builds) a sequence of instructions implementing the interface module process designer defined process step 2025 in a series of build up steps using a number of build files. As may be appreciated, the process designer cannot access any of the processes D, E, or F that are present on the second local management system 4204 unless those processes are moved physically to the first local management system 4202. Therefore, the designer is limited to the development of business processes that combine only those discrete processes 2025 resident thereon. With the global management system 4100 connected to the two local management systems 4202, 4204, however, it is possible to build business process that combine all of processes A–F, in any manner that the user selects.

In operation, the global management system 4200 functions so that selected processes 2025, functions 2035, and links or roads 2045 may be uploaded from each of the local management servers 4202, 4204 to the global management system 4100, or the processes 2025, functions 2035, and links or roads 2045 may be transferred to the local management servers 4202, 4204 from the global management system 4100. Alternatively, all of the processes 2025, functions 2035, and links or roads 2045 may either be uploaded to the global management system 4100 from a local management system, or transferred from the global management system 4200 to the local management server 100. In such a case, the global management system 4100 creates a library that contains a combined list of all of the processes A–F that are present on the two local management servers 4202, 4204.

It should be noted that the data, executables and applications underlying the individual processes 2025, functions 2035, and links (or roads) 2045 do not have to be transferred to the global management system 4100. All that needs to be transmitted is the information, for example in XML format, that describes to the global management system 4100 process 2025, function 2035, or road 2045 located on the local management system 4202, 4204.

When a user accesses the library 2005 in the global management system 4100, the user gains access to all of the processes 2025, functions 2035, and links or roads 2045 (hereinafter referred to collectively as "tools") that have been uploaded thereto. This collection is referred to as the "toolkit." Since the toolkit combines the functions 2035 from multiple different local management systems 4202, 4204, the toolkit in the global management system 4100 is referred to as an "integrated toolkit." The user may then design a business process using one or more of the functions 2035 in the integrated toolkit in the same manner as the user would design a business process using only the functions 2035 available on a local management system 4202, 4204.

Next, the operation of the universal management system 4200 will be described. In a first example, the user designs a business process that incorporates the following process steps in the following order: Process A→Process B→Process C→Process D→Process E→Process F. The global management server 4100 assists the development of the business process in the manner described above. The process would be carried out in the following manner. First, instructions would be sent to both local management systems 4202, 4204 to assemble the steps in the order presented by the user. The first local management system 4202 would compile a set of instructions that permit data to be manipulated through the three steps A→B→C. The second local management system 4204 would compile a set of instructions that manipulate the data through the three steps D→E→F. Once compiled, the steps A→B→C on the first local management system 4202 are, for all intents and purposes, considered as a single process step. The process D→E→F compiled by the second local management system 4204 also appears as a single process step. Once the portions of the business process are prepared, the business process may be performed.

Data from a data source is first sent to the input of the first process step A→B→C, which generates an output set of data. That output data is then sent to the second local management server 4204, which performs the second process step D→E→F on the data to create a final data set. That data set is then returned to the user.

In this example, the methodology is fairly straight forward because the data passes through the portion of the process on the first local management system 4202 before being passed to the second local management system 4204 for final processing. While this is one possible route for the data, the present invention also contemplates the development of considerably more complex business processes where the data sets are passed back and forth, through the communication link 4210, multiple times before the process is completed. For example, if the user were to design a business process with steps in the following order, A→B→D→C→E→F, the data would pass back and forth between the two local management systems 4202, 4204 three times.

As may be apparent from the description provided above, the global management system 4100 does not receive any portion of the code that is resident on any of the local management servers 4202, 4204. Instead, the global management system 4100 receives the XML files that provide the information necessary to develop the business process desired. The global management system 4100 communicates with the local management systems 4202, 4204 that actually builds and runs the code associated with those instructions in the manner described above.

The operation of the universal management system 4200 described above is a "dynamic" system. For purposes of the present discussion, this means that the universal management system 4200 will change over time. For example, the universal management system 4200 may be connected to additional local management systems (akin to the local management systems 4204 and 4204). When new local management systems are added, not only may the geographical diversity of the entire system be changed, but also the technological diversity of the universal management system 4200 also may be changed. For example, the newly added local management system may operate on different hardware and operate via different software than others of the local management systems, such as 4202 and 4204.

As new local management systems 4202, 4204 are added to the universal management system 4200, the operation of the universal management system 4200 understandably will change. Not only does the addition of a new local management system increase the total computing power and resources of the universal management system 4200, but the universal management system 4200 may gain access to additional functionality (e.g., information, executables, and applications) that were not previously available to the universal management system 4200. Accordingly, when a new local management system is added to the universal management system 4200, the operation of the universal management system 4200 may be altered, especially since the universal management system 4200 permits the development of tools, processes, functions, etc. based on available technology, information, executables, applications, functions, tools, codes, and other aspects of both hardware and software.

Another aspect of the invention that should be mentioned is that the universal management system 4200 may operate differently, even if required to perform the same business process time and time again. This functionality is also a part of the dynamic operation of the universal management system 4200. Many factors may contribute to the dynamic operation of the universal management system 4200. One factor may be the available computing resources. Assume that a request is made to execute a business process, which will be called Process 1. When executed the first time, the universal management system 4200 will select those local management systems (such as 4202 and 4204) that may assist with the execution of Process 1. Upon a second request to execute Process 1, the same resources may not be available to the universal management system 4200, which may then require reliance on different local management systems that are available to execute Process 1.

A further aspect of the invention, as may be apparent from the discussion above, lies in the virtual operation of the universal management system 4200 (or any of its subcomponents). The universal management system 4200 may download the business process, for example Process 1, to a number of local management systems (such as 4202 and 4204) for execution of the business process. The instructions, however, do not need to be located on any of the hard drives (or stored in any manner, for that matter) on any of the local management systems. The instructions and the data may be supplied by the universal management system 4200 to the local management systems so that the local management systems may execute the business process and return the result to the universal management system 4200. Upon completion of the executables in the business process, the instructions and data can be deleted from the active memories of the local management systems so that the local management systems are freed for further operations, processes, and executables, for example.

While the invention has been described with reference to the certain illustrated embodiments, the words which have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the claims thereto.

What is claimed is:

1. A global enterprise business process management system, comprising:
   a first enterprise business process server capable of receiving data from at least one client;
   at least one second enterprise business process server in communication with the first enterprise business process server, the second enterprise business process server being capable of receiving data from at least one other client;
   at least one first router accessible by the first enterprise business process server;
   at least one first business process accessible by the at least one first router,
   wherein the first enterprise business process server is configured to access the at least one first business process via the first router, to execute the at least one first business process on at least a portion of the client data, and to generate business process output data as a function of the at least one first business process;
   a first interface accessible by the first enterprise business process server,
   wherein the first interface operates with the enterprise business process server to output a process designer interactive page,
   wherein the process designer interactive page is configured to accept instructions concerning the at least one first business process, to generate process information data, and to provide the process information data to the first enterprise business process server,
   wherein the first enterprise business process server builds an instruction set for the first business process based upon the process information data, and
   wherein the first enterprise business process server has access to at least some of business processes available on the second enterprise business process server.

2. The global enterprise business process management system of claim 1, wherein the first and second enterprise business process servers are in disparate geographic locations.

3. The global enterprise business process management system of claim 1, wherein the first and second enterprise business process servers operate via different operating systems.

4. The global enterprise business process management system of claim 3, wherein the first enterprise business process server operates via a Linux-based operating system.

5. The global enterprise management system of claim 4, wherein the second enterprise business process server operates via a Windows-based operating system.

6. The global enterprise business process management system of claim 1, further comprising:
   at least one second router accessible by the second enterprise business process server;
   at least one second business process accessible by the at least one second router,
   wherein the second enterprise business process server is configured to access the at least one second business process via the second router, to execute the at least one second business process on at least a portion of the client data, and to generate business process output data as a function of the at least one second business process;
   a second interface accessible by the second enterprise business process server,
   wherein the second interface operates with the enterprise business process server to output a process designer interactive page,
   wherein the process designer interactive page is configured to accept instructions concerning the at least one second business process, to generate process information data, and to provide the process information data to the second enterprise business process server, and
   wherein the second enterprise business process server builds an instruction set for the second business process based upon the process information data.

7. The global enterprise business process management system of claim 1, wherein the at least one first business process is executable on at least one of the first and second enterprise business process servers.

8. The global enterprise business process management system of claim 1, wherein at least one of the first and second enterprise business process servers dynamically establishes the execution sequence of the at least one business process on at least one of the first and second enterprise business process servers.

9. The global enterprise business process management system of claim 8, wherein the decision of how the at least one business process is executed changes based upon priority of at least one of network traffic, operating system capacity, and the availability of at least one of the first and second enterprise business process servers to execute the at least one first business process.

10. The global enterprise business process management system of claim 1, wherein the at least one first business process may be distributed to the second enterprise business process server from the first enterprise business process server.

11. The global enterprise business process management system of claim 1, wherein the execution of the at least one first business process may be monitored.

12. A global enterprise business process management system, comprising:
    a plurality of enterprise business process servers capable of receiving data from at least one client;
    a router accessible by at least one of the enterprise business process servers;
    a business process accessible by the router; and
    an interface accessible by one of the plurality of enterprise business process servers,
    wherein the interface operates with the enterprise business process server to output a process designer interactive page,
    wherein the process designer interactive page is configured to accept instructions concerning the business process, to generate process information data, and to provide the process information data to the enterprise business process server,
    wherein the enterprise business process server builds an instruction set for the business process based upon the process information data,
    wherein the enterprise business process server has access to at least some of business processes available on others of the plurality of enterprise business process servers, and
    wherein one of the enterprise business process servers is configured to access the business process via the router, to execute the business process on at least a portion of the client data, and to generate business process output data as a function of the business process.

13. The global enterprise business process management system of claim 12, wherein the enterprise business process is loaded dynamically from one of the plurality of enterprise business process servers into at least one other of the enterprise business process servers.

14. The global enterprise business process management system of claim 13, wherein, after providing the process information data, the business process is unloaded from the at least one of the plurality of enterprise business process servers.

15. The global enterprise business process management system of claim 12, wherein at least one function is loaded dynamically from one of the plurality of enterprise business process servers into at least one other of the enterprise business process servers.

16. The global enterprise business process management system of claim 15, wherein, after providing the process information data, the at least one function is unloaded from the at least one of the plurality of enterprise business process servers.

17. The global enterprise business process management system of claim 12, wherein data may be converted from one format to another depending upon the format required by the enterprise business process server processing the data.

18. The global enterprise business process management system of claim 17, wherein the business process converts the data from format to another.

19. The global enterprise business process management system of claim 17, wherein a function converts the data from format to another.

* * * * *